(12) United States Patent
Munoz

(10) Patent No.: US 11,750,998 B2
(45) Date of Patent: *Sep. 5, 2023

(54) CONTROLLING RENDERING OF AUDIO DATA

(71) Applicant: QUALCOMM Incorporated, San Diego, CA (US)

(72) Inventor: Isaac Garcia Munoz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,421

(22) Filed: Sep. 8, 2021

(65) Prior Publication Data

US 2022/0103962 A1 Mar. 31, 2022

Related U.S. Application Data

(60) Provisional application No. 63/085,437, filed on Sep. 30, 2020.

(51) Int. Cl.
*H04S 7/00* (2006.01)
*H04R 3/00* (2006.01)
(Continued)

(52) U.S. Cl.
CPC .......... *H04S 7/303* (2013.01); *H04S 2400/01* (2013.01); *H04S 2420/11* (2013.01)

(58) Field of Classification Search
None
See application file for complete search history.

(56) References Cited

U.S. PATENT DOCUMENTS

| 10,405,126 B2 | 9/2019 | Peters et al. |
| 2011/0249821 A1 | 10/2011 | Jaillet et al. |

(Continued)

FOREIGN PATENT DOCUMENTS

| EP | 3410747 A1 | 12/2018 |
| EP | 3506082 A1 | 7/2019 |
| WO | 2019197403 A1 | 10/2019 |

OTHER PUBLICATIONS

Audio: "Call for Proposals for 3D Audio", International Organisation for Standardisation Organisationale Internationale De Normalisation, ISO/IEC JTC1/SC29/WG11, Coding of Moving Pictures and Audio, ISO/IEC JTC1/SC29/WG11/N13411, Geneva, Jan. 2013, pp. 1-20.

(Continued)

*Primary Examiner* — Qin Zhu
(74) *Attorney, Agent, or Firm* — Shumaker & Sieffert, P.A.

(57) ABSTRACT

Example devices, systems and methods for processing audio data are disclosed. An example device includes a memory configured to store one or more speaker feeds and one or more processors implemented in circuitry and communicatively coupled to the memory. The one or more processors are configured to determine whether a boundary separating an interior area from an exterior area exists, and based on the boundary existing, determine a transition distance value, the transition distance value being indicative of a size of a transition zone. The one or more processors are configured to obtain a listener location indicative of a virtual location of the device relative to the interior area and obtain, based at least in part on the boundary and the listener location, a current renderer. The one or more processors are configured to apply, to the audio data, the current renderer to obtain the one or more speaker feeds.

31 Claims, 23 Drawing Sheets

(51) Int. Cl.
*H04R 5/033* (2006.01)
*G06F 3/16* (2006.01)

(56) References Cited

U.S. PATENT DOCUMENTS

| | | |
|---|---|---|
| 2015/0117664 A1 | 4/2015 | Mossner et al. |
| 2017/0188170 A1 | 6/2017 | Prins et al. |
| 2018/0206057 A1 | 7/2018 | Kim et al. |
| 2018/0332420 A1 | 11/2018 | Salume et al. |
| 2019/0007781 A1 | 1/2019 | Peters et al. |
| 2019/0180509 A1 | 6/2019 | Laaksonen et al. |
| 2019/0200158 A1 | 6/2019 | Verbeke et al. |
| 2020/0068335 A1 | 2/2020 | Eronen et al. |
| 2020/0264006 A1 | 8/2020 | Sommer et al. |
| 2021/0004452 A1 | 1/2021 | Swaminathan |
| 2021/0006922 A1 | 1/2021 | Swaminathan et al. |
| 2021/0092546 A1 | 3/2021 | Terentiv et al. |
| 2021/0099825 A1 | 4/2021 | Salehin et al. |
| 2021/0160645 A1 | 5/2021 | Olivieri et al. |
| 2021/0168550 A1 | 6/2021 | Terentiv et al. |
| 2021/0297780 A1* | 9/2021 | Zotkin .................. H04R 1/326 |
| 2022/0070606 A1* | 3/2022 | Falk ....................... H04R 3/005 |

OTHER PUBLICATIONS

ETSI TS 103 589 V1.1.1, "Higher Order Ambisonics (HOA) Transport Format", Jun. 2018, 33 pages.
Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.
Hollerweger F., "An Introduction to Higher Order Ambisonic", Oct. 2008, pp. 1-13, http://decoyiki.fi/dsound/ambisonic/motherlode/source/HOA_intro.pdf.
"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.
"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.
International Search Report and Written Opinion—PCT/US2021/049661—ISA/EPO—Dec. 13, 2021 (1616-061WO01/208799WO) 14 Pages.
ISO/IEC/JTC: ISO/IEC JTC 1/SC 29 N ISO/IEC CD 23008-3 "Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Peterson J., et al., "Virtual Reality, Augmented Reality, and Mixed Reality Definitions", EMA, version 1.0, Jul. 7, 2017, 4 Pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Salehin S.M.A., et al., "Thoughts on Rendering Interior Ambisonic Sound Fields", Coding of Moving Pictures and Audio, ISO/IEC JTC1/SC29/WG11 MPEG2019/M49394, Jul. 2019, Gothenburg, Sweden, 3 Pages.
Schonefeld V., "Spherical Harmonics", Jul. 1, 2005, XP002599101, 25 Pages, Accessed online [Jul. 9, 2013] at URL:http://limbicsoft.com/volker/prosem_paper.pdf.
Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11, MPEG2014/M31827), No. M31827, Jan. 11, 2014 (Jan. 11, 2014), San Jose, USA, XP030060280, 83 Pages.
Sen D., et al., "Technical Description of the Qualcomm's HOA Coding Technology for Phase II", 109th MPEG Meeting Jul. 7, 2014-Nov. 7, 2014, Sapporo, Japan, (Motion Picture Expert Group or ISO/IEC JTC1/SC29/WG11), MPEG2014, No. M34104, Jul. 2, 2014 (Jul. 2, 2014), XP030062477, 4 Pages, figure 1.
Prosecution History from U.S. Appl. No. 01/195,817, dated Sep. 7, 2021 through Feb. 3, 2022, 28 pp.

* cited by examiner

CONTROLLING RENDERING OF AUDIO DATA

This application claims priority to U.S. Provisional Application Ser. No. 63/085,437, entitled "CONTROLLING RENDERING OF AUDIO DATA," filed Sep. 30, 2020, the entire contents of which are hereby incorporated by reference. Additionally, this application is related to U.S. patent application Ser. No. 17/038,618, entitled "CONTROLLING RENDERING OF AUDIO DATA," filed Sep. 30, 2020 and U.S. Provisional Application Ser. No. 62/909,104, entitled "CONTROLLING RENDERING OF AUDIO DATA," filed Oct. 1, 2019.

TECHNICAL FIELD

This disclosure relates to processing of audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly import factor in ensuring a realistically immersive experience, particularly as the video experience improves to permit better localization of video objects that enable the user to better identify sources of audio content.

SUMMARY

This disclosure generally relates to techniques for controlling audio rendering at the audio playback system. The techniques may enable an audio playback system to perform flexible rendering in terms of complexity (as defined by processor cycles, memory, and/or bandwidth consumed), while also permitting interior and exterior rendering for XR experiences as defined by a boundary separating an interior area from an exterior area. Furthermore, the audio playback system may utilize metadata or other indications specified in a bitstream representative of audio data to configure the audio renderer while also referencing a listener location relative to the boundary to generate the audio renderer to account for the interior area or the exterior area. This boundary may also be referred to herein as an extent or a spatial extent.

As such, the techniques may improve operation of the audio playback system as, when configured to perform low complexity rendering, the audio playback system may reduce a number of processor cycles, memory, and/or bandwidth consumed. When performing high complexity rendering, the audio playback system may provide a more immersive XR experience, which may result in more realistic placement of a user of the audio playback system in the XR experience.

In one example, the techniques are directed to a device configured to process audio data, the device comprising: a memory configured to store one or more speaker feeds; and one or more processors implemented in circuitry and communicatively coupled to the memory, the one or more processors being configured to: determine whether a boundary separating an interior area from an exterior area exists; based on determining that the boundary exists, determine a transition distance value, the transition distance value being indicative of a size of a transition zone; obtain a listener location indicative of a virtual location of the device relative to the interior area; obtain, based at least in part on the boundary and the listener location, a current renderer; apply, to the audio data, the current renderer to obtain the one or more speaker feeds.

In another example, the techniques are directed to a method of processing audio data, the method comprising: determining whether a boundary separating an interior area from an exterior area exists; based on determining that the boundary exists, determining a transition distance value, the transition distance value being indicative of a size of a transition zone; obtaining a listener location indicative of a virtual location of the device relative to the interior area; obtaining, based at least in part on the boundary and the listener location, a current renderer; applying, to the audio data, the current renderer to obtain one or more speaker feeds; and storing the one or more speaker feeds.

In another example, the techniques are directed to a non-transitory computer-readable storage medium having stored thereon instructions that, when executed, cause one or more processors to: determine whether a boundary separating an interior area from an exterior area exists; based on determining that the boundary exists, determine a transition distance value, the transition distance value being indicative of a size of a transition zone; obtain a listener location indicative of a virtual location of the device relative to the interior area; obtain, based at least in part on the boundary and the listener location, a current renderer; apply, to audio data, the current renderer to obtain one or more speaker feeds; and store the one or more speaker feeds.

In one example, the techniques are directed to a device configured to process one or more audio streams, the device comprising: one or more processors configured to: determine whether a boundary separating an interior area from an exterior area exists; based on the boundary existing, determine a transition distance value, the transition distance value being indicative of a size of a transition zone, wherein the transition distance value is 0; obtain a listener location indicative of a location of the device relative to the interior area; obtain, based on the boundary, the listener location and the transition distance value being 0, a current renderer as either an interior renderer configured to render audio data for the interior area or an exterior renderer configured to render the audio data for the exterior area; apply, to the audio data, the current renderer to obtain one or more speaker feeds; and a memory coupled to the one or more processors, and configured to store the one or more speaker feeds.

In one example, the techniques are directed to a device configured to process one or more audio streams, the device comprising: one or more processors configured to: determine whether a boundary separating an interior area from an exterior area exists; based on the boundary existing, determine a transition distance value, the transition distance value being indicative of a size of a transition zone, wherein the transition distance value is greater than 0; obtain a listener location indicative of a location of the device relative to the interior area; obtain, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; apply, to the audio data, the current renderer to obtain one or more speaker feeds; and a memory coupled to the one or more processors, and configured to store the one or more speaker feeds.

In another example, the techniques are directed to a method of processing one or more audio streams, the method comprising: determining whether a boundary separating an interior area from an exterior area exists; based on the boundary existing, determining a transition distance value, the transition distance value being indicative of a size of a transition zone, wherein the transition distance value is 0; obtaining a listener location indicative of a location of the device relative to the interior area; obtaining, based on the boundary, the listener location and the transition distance value being 0, a current renderer as either an interior renderer configured to render audio data for the interior area or an exterior renderer configured to render the audio data for the exterior area; applying, to the audio data, the current renderer to obtain one or more speaker feeds; and storing the one or more speaker feeds.

In another example, the techniques are directed to a method of processing one or more audio streams, the method comprising: determining whether a boundary separating an interior area from an exterior area exists; based on the boundary existing, determining a transition distance value, the transition distance value being indicative of a size of a transition zone, wherein the transition distance value is greater than 0; obtaining a listener location indicative of a location of the device relative to the interior area; obtaining, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; applying, to the audio data, the current renderer to obtain one or more speaker feeds; and storing the one or more speaker feeds.

In another example, the techniques are directed to a device configured to process one or more audio streams, the device comprising: means for determining whether a boundary separating an interior area from an exterior area exists; means for determining a transition distance value, based on the boundary existing, the transition distance value being indicative of a size of a transition zone, wherein the transition distance value is 0; means for obtaining a listener location indicative of a location of the device relative to the interior area; means for obtaining, based on the boundary, the listener location and the transition distance value being 0, a current renderer as either an interior renderer configured to render audio data for the interior area or an exterior renderer configured to render the audio data for the exterior area; means for applying, to the audio data, the current renderer to obtain one or more speaker feeds; and means for storing the one or more speaker feeds.

In another example, the techniques are directed to a device configured to process one or more audio streams, the device comprising: determine whether a boundary separating an interior area from an exterior area exists; based on the boundary existing, determine a transition distance value, the transition distance value being indicative of a size of a transition zone, wherein the transition distance value is greater than 0; obtain a listener location indicative of a location of the device relative to the interior area; obtain, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; apply, to the audio data, the current renderer to obtain one or more speaker feeds; and store the one or more speaker feeds.

In another example, the techniques are directed to a non-transitory computer-readable storage medium having stored thereon instructions that, when executed, cause one or more processors to: determine whether a boundary separating an interior area from an exterior area exists; based on the boundary existing, determine a transition distance value, the transition distance value being indicative of a size of a transition zone, wherein the transition distance value is 0; obtain a listener location indicative of a location of the device relative to the interior area; obtain, based on the boundary, the listener location and the transition distance value being 0, a current renderer as either an interior renderer configured to render audio data for the interior area or an exterior renderer configured to render the audio data for the exterior area; apply, to the audio data, the current renderer to obtain one or more speaker feeds; and store the one or more speaker feeds.

In another example, the techniques are directed to a non-transitory computer-readable storage medium having stored thereon instructions that, when executed, cause one or more processors to: determine whether a boundary separating an interior area from an exterior area exists; based on the boundary existing, determine a transition distance value, the transition distance value being indicative of a size of a transition zone, wherein the transition distance value is greater than 0; obtain a listener location indicative of a location of the device relative to the interior area; obtain, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; apply, to the audio data, the current renderer to obtain one or more speaker feeds; and store the one or more speaker feeds.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
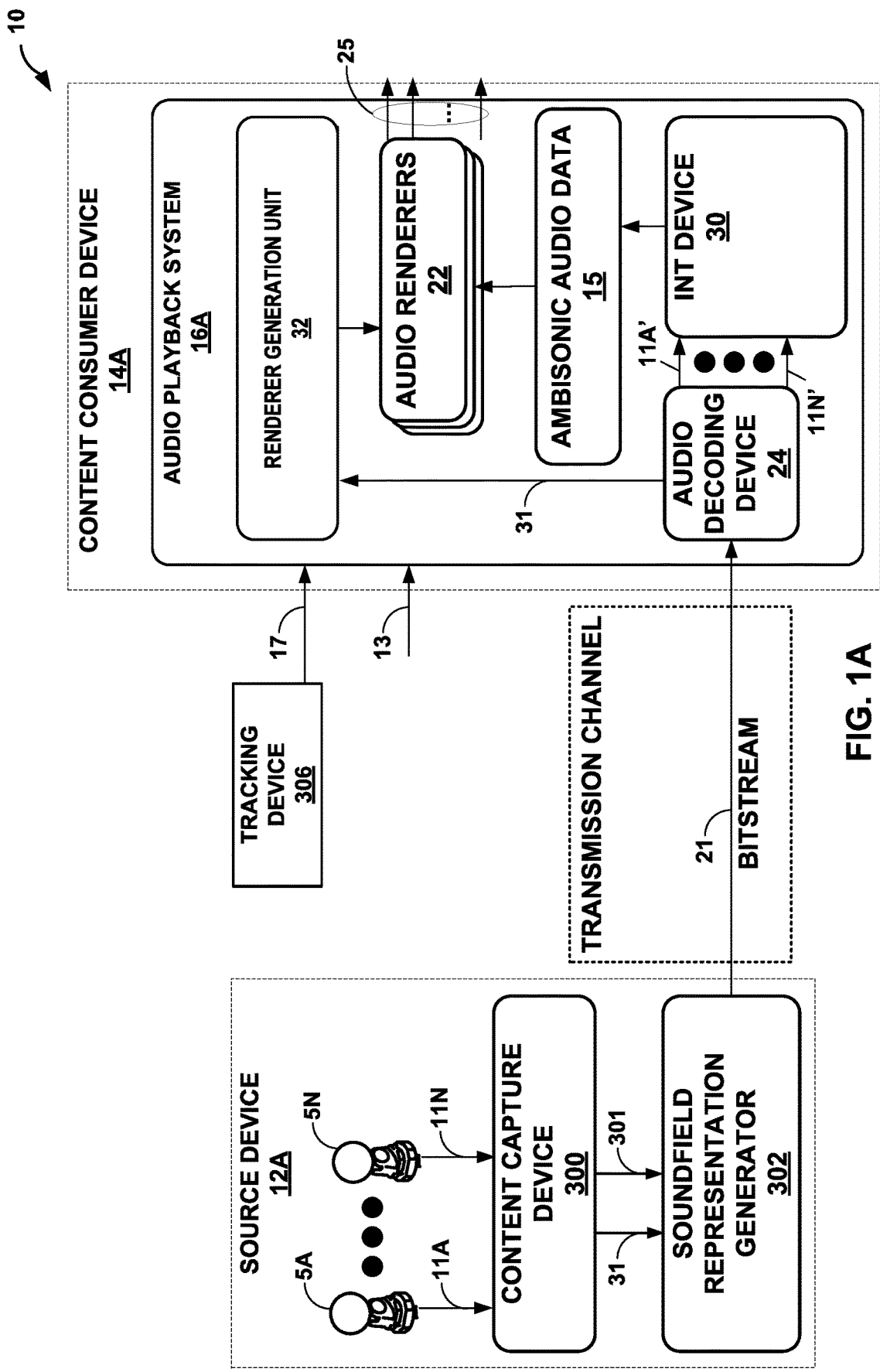
FIGS. 1A and 1B are diagrams illustrating systems that may perform various aspects of the techniques described in this disclosure.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi ik) h_n^{(2)}(kr_s) Y_n^{m*}(\theta_s, \varphi_s),$$

where i is $\sqrt{-1}$, $h_n^{(2)}(\bullet)$ is the spherical Hankel function (of the second kind) of order n, and $\{r_s, \theta_s, \varphi_s\}$ is the location of the object. Knowing the object source energy g(w) as a function of frequency (e.g., using time-frequency analysis techniques, such as performing a fast Fourier transform on the pulse code modulated—PCM—stream) may enable conversion of each PCM object and the corresponding location into the SHC $A_n^m(k)$ Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate three-dimensional (3D) localization of sound sources within the soundfield. As such, XR devices may render the ambisonic coefficients to speaker feeds that, when played via one or more speakers, accurately reproduce the soundfield.

The use of ambisonic coefficients for XR may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A and 1B.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

This disclosure may provide for various combinations of an opacity attribute and a interpolation distance attribute for rendering of interior ambisonic sound fields for 6 DoF (and other) use cases. Additionally, the disclosure discusses examples of a low complexity and high complexity rendering solution for interior ambisonic fields, which can be specified by a single binary bit. In one example Encoder Input Format (EIF), an attribute may be present that indicates whether an ambisonic sound field description is an interior or an exterior field. In an interior sound field the sound sources are within a specified boundary described by a mesh or simple geometric object and for an exterior sound field, the sound sources are described to be outside the boundary. The opacity attribute for an interior sound field may specify whether the contributions that do not have direct line of sight to the listener contributes to the rendering of the sound field for the listener when outside the boundary. Furthermore, an attribute for distance may specify a buffer region surrounding the boundary where interpolation between rendering of the interior field for an outside listener to an interior listener is used. As used herein, the buffer region may also be referred to as a transition distance.

As such, various aspects of the techniques described herein may enable determination of a listener location of a user while navigating in a VR or other XR setting, determination of whether the listener location is located within a geometrical boundary where all sound sources are radiating without obstruction within the geometrical boundary towards the listener, and determination of whether the listener location is located outside of the geometric boundary. Various aspects of the techniques may also enable assignment of an opacity attribute for each sound source that is obstructed relative to the listener when the listener location is determined to be outside of the geometrical boundary, and performing interpolation, based on the opacity attribute, of the soundfield within the geometrical boundary when the listener location indicates the listener is outside the geometrical boundary, and rendering the interpolated soundfield.

Figure 1B:
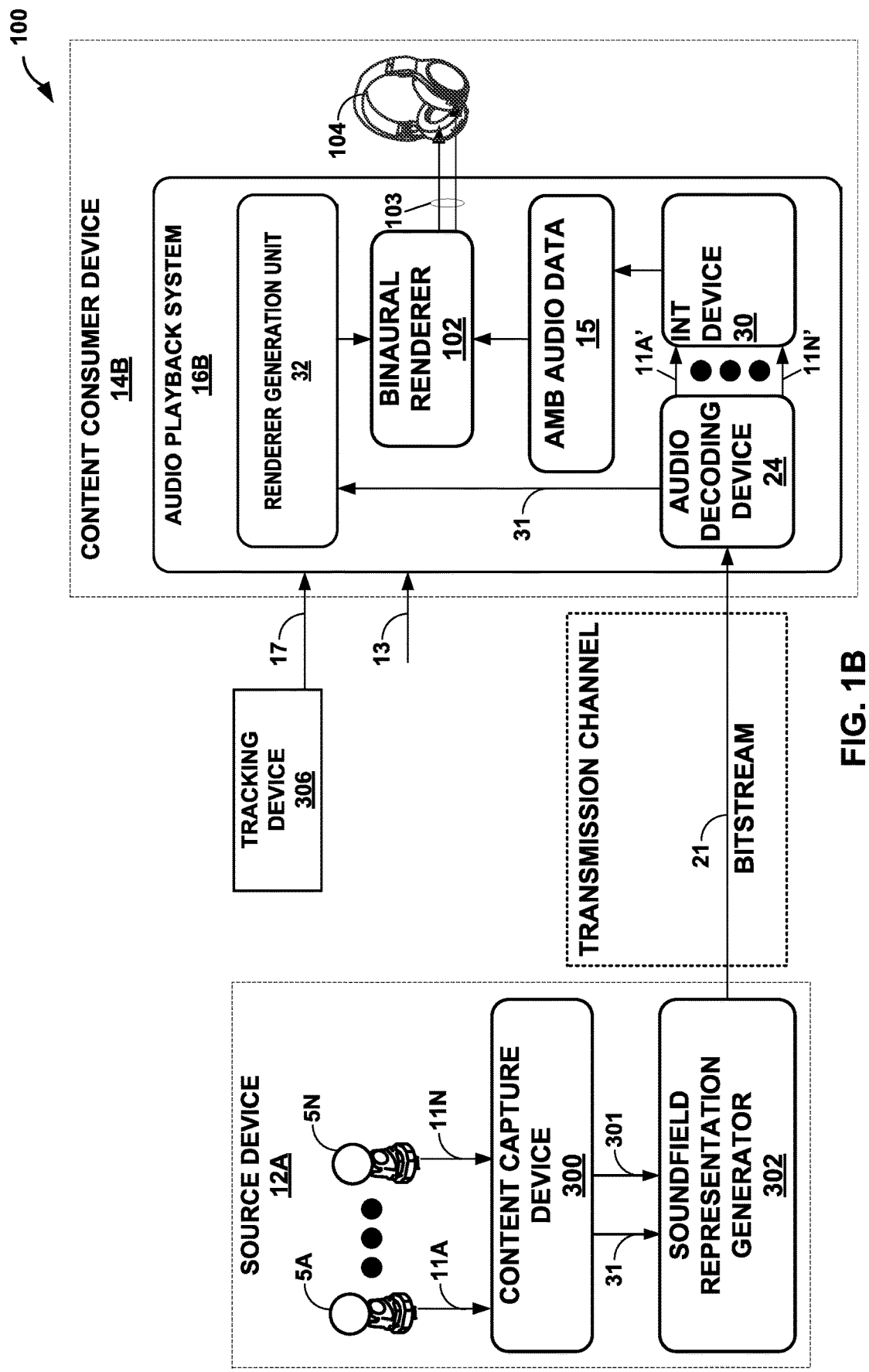

FIGS. 1A and 1B are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any hierarchical representation of a soundfield is encoded to form a bitstream representative of the audio data. Moreover, the source device 12A may represent any form of computing device capable of generating hierarchical representation of a soundfield, and is generally described herein in the context of being a VR content creator device. Likewise, the content consumer device 14A may represent any form of computing device capable of implementing the audio stream interpolation techniques described in this disclosure as well as audio playback, and is generally described herein in the context of being a VR client device.

The source device 12A may be operated by an entertainment company or other entity that may generate multichannel audio content for consumption by operators of content consumer devices, such as the content consumer device 14A. In many VR scenarios, the source device 12A generates audio content in conjunction with video content. The source device 12A includes a content capture device 300 and a content soundfield representation generator 302.

The content capture device 300 may be configured to interface or otherwise communicate with one or more microphones 5A-5N ("microphones 5"). The microphones 5 may represent an Eigenmike® or other type of 3D audio microphone capable of capturing and representing the soundfield as corresponding scene-based audio data 11A-11N (which may also be referred to as ambisonic coefficients 11A-11N or "ambisonic coefficients 11"). In the context of scene-based audio data 11 (which is another way to refer to the ambisonic coefficients 11"), each of the microphones 5 may represent a cluster of microphones arranged within a single housing according to set geometries that facilitate generation of the ambisonic coefficients 11. As such, the term microphone may refer to a cluster of microphones (which are actually geometrically arranged transducers) or a single microphone (which may be referred to as a spot microphone).

The ambisonic coefficients 11 may represent one example of an audio stream. As such, the ambisonic coefficients 11 may also be referred to as audio streams 11. Although described primarily with respect to the ambisonic coefficients 11, the techniques may be performed with respect to other types of audio streams, including pulse code modulated (PCM) audio streams, channel-based audio streams, object-based audio streams, etc.

The content capture device 300 may, in some examples, include an integrated microphone that is integrated into the housing of the content capture device 300. The content capture device 300 may interface wirelessly or via a wired connection with the microphones 5. Rather than capture, or in conjunction with capturing, audio data via the microphones 5, the content capture device 300 may process the ambisonic coefficients 11 after the ambisonic coefficients 11 are input via some type of removable storage, wirelessly, and/or via wired input processes, or alternatively or in conjunction with the foregoing, generated or otherwise created (from stored sound samples, such as is common in gaming applications, etc.). As such, various combinations of the content capture device 300 and the microphones 5 are possible.

The content capture device 300 may also be configured to interface or otherwise communicate with the soundfield representation generator 302. The soundfield representation generator 302 may include any type of hardware device capable of interfacing with the content capture device 300. The soundfield representation generator 302 may use the ambisonic coefficients 11 provided by the content capture device 300 to generate various representations of the same soundfield represented by the ambisonic coefficients 11.

For instance, to generate the different representations of the soundfield using ambisonic coefficients (which again is one example of the audio streams), the soundfield representation generator 302 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 302 may generate a partial subset of the full set of ambisonic coefficients. For instance, each MOA representation generated by the soundfield representation generator 302 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 302 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representations, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 300 may, in some examples, be configured to wirelessly communicate with the soundfield representation generator 302. In some examples, the content capture device 300 may communicate, via one or both of a wireless connection or a wired connection, with the soundfield representation generator 302. Via the connection between the content capture device 300 and the soundfield representation generator 302, the content capture device 300 may provide content in various forms of content, which, for purposes of discussion, are described herein as being portions of the ambisonic coefficients 11.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 300 may not include the psychoacoustic audio encoder dedicated hardware or specialized software and instead provide audio aspects of the content 301 in a non-psychoacoustic audio coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content (e.g., MOA representations, third order ambisonic representations, and/or first order ambisonic representations) generated from the ambisonic coefficients 11. The bitstream 21 may represent a compressed version of the ambisonic coefficients 11 (and/or the partial subsets thereof used to form MOA representations of the soundfield) and any other different types of the content 301 (such as a compressed version of spherical video data, image data, or text data).

The soundfield representation generator 302 may generate the bitstream 21 for transmission, as one example, across a transmission channel, which may be a wired or wireless channel, a data storage device, or the like. The bitstream 21 may represent an encoded version of the ambisonic coefficients 11 (and/or the partial subsets thereof used to form MOA representations of the soundfield) and may include a primary bitstream and another side bitstream, which may be referred to as side channel information. In some instances, the bitstream 21 representing the compressed version of the ambisonic coefficients 11 may conform to bitstreams produced in accordance with the MPEG-H 3D audio coding standard.

The content consumer device 14A may be operated by an individual, and may represent a VR client device. Although described with respect to a VR client device, content consumer device 14A may represent other types of devices, such as an augmented reality (AR) client device, a mixed reality (MR) client device (or any other type of head-mounted display device or extended reality—XR—device), a standard computer, a headset, headphones, or any other device capable of tracking head movements and/or general translational movements of the individual operating the content consumer device 14A. As shown in the example of FIG. 1A, the content consumer device 14A includes an audio playback system 16A, which may refer to any form of audio playback system capable of rendering ambisonic coefficients (whether in form of first order, second order, and/or third order ambisonic representations and/or MOA representations) for playback as multi-channel audio content.

The content consumer device 14A may retrieve the bitstream 21 directly from the source device 12A. In some examples, the content consumer device 14A may interface with a network, including a fifth generation (5G) cellular network, to retrieve the bitstream 21 or otherwise cause the source device 12A to transmit the bitstream 21 to the content consumer device 14A.

While shown in FIG. 1A as being directly transmitted to the content consumer device 14A, the source device 12A may output the bitstream 21 to an intermediate device positioned between the source device 12A and the content consumer device 14A. The intermediate device may store the bitstream 21 for later delivery to the content consumer device 14A, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14A, requesting the bitstream 21.

Alternatively, the source device 12A may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 1A.

As noted above, the content consumer device 14A includes the audio playback system 16A. The audio playback system 16A may represent any system capable of playing back multi-channel audio data. The audio playback system 16A may include a number of different audio renderers 22. The renderers 22 may each provide for a different form of audio rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 24. The audio decoding device 24 may represent a device configured to decode bitstream 21 to output reconstructed ambisonic coefficients 11A'-11N' (which may form the full first, second, and/or third order ambisonic representation or a subset thereof that forms an MOA representation of the same soundfield or decompositions thereof, such as the predominant audio signal, ambient ambisonic coefficients, and the vector based signal described in the MPEG-H 3D Audio Coding Standard and/or the MPEG-I Immersive Audio standard).

As such, the ambisonic coefficients 11A'-11N' ("ambisonic coefficients 11") may be similar to a full set or a partial subset of the ambisonic coefficients 11, but may differ due to lossy operations (e.g., quantization) and/or transmission via the transmission channel. The audio playback system 16A may, after decoding the bitstream 21 to obtain the ambisonic coefficients 11', obtain ambisonic audio data 15 from the different streams of ambisonic coefficients 11', and render the ambisonic audio data 15 to output speaker feeds 25. The speaker feeds 25 may drive one or more speakers (which are not shown in the example of FIG. 1A for ease of illustration purposes). Ambisonic representations of a soundfield may be normalized in a number of ways, including N3D, SN3D, FuMa, N2D, or SN2D.

To select the appropriate renderer or, in some instances, generate an appropriate renderer, the audio playback system 16A may obtain loudspeaker information 13 indicative of a number of loudspeakers and/or a spatial geometry of the loudspeakers. In some instances, the audio playback system 16A may obtain the loudspeaker information 13 using a reference microphone and outputting a signal to activate (or, in other words, drive) the loudspeakers in such a manner as to dynamically determine, via the reference microphone, the loudspeaker information 13. In other instances, or in conjunction with the dynamic determination of the loudspeaker information 13, the audio playback system 16A may prompt a user to interface with the audio playback system 16A and input the loudspeaker information 13.

The audio playback system 16A may select one of the one or more audio renderers 22 based on the loudspeaker information 13. In some instances, the audio playback system 16A may, when none of the one or more audio renderers 22 are within some threshold similarity measure (in terms of the loudspeaker geometry) to the loudspeaker geometry specified in the loudspeaker information 13, generate the one of one or more audio renderers 22 based on the loudspeaker information 13. The audio playback system 16A may, in some instances, generate one of the one or more audio renderers 22 based on the loudspeaker information 13 without first attempting to select an existing one of the one or more audio renderers 22.

When outputting the speaker feeds 25 to headphones, the audio playback system 16A may utilize one of the renderers 22 that provides for binaural rendering using head-related transfer functions (HRTF) or other functions capable of rendering to left and right speaker feeds 25 for headphone speaker playback. The terms "speakers" or "transducer" may generally refer to any speaker, including loudspeakers, headphone speakers, etc. One or more speakers may then playback the rendered speaker feeds 25.

Although described as rendering the speaker feeds 25 from the ambisonic audio data 15, reference to rendering of the speaker feeds 25 may refer to other types of rendering, such as rendering incorporated directly into the decoding of the ambisonic audio data 15 from the bitstream 21. An example of the alternative rendering can be found in Annex G of the MPEG-H 3D audio coding standard, where rendering occurs during the predominant signal formulation and the background signal formation prior to composition of the soundfield. As such, reference to rendering of the ambisonic audio data 15 should be understood to refer to both rendering of the actual ambisonic audio data 15 or decompositions or representations thereof of the ambisonic audio data 15 (such as the above noted predominant audio signal, the ambient ambisonic coefficients, and/or the vector-based signal—which may also be referred to as a V-vector).

Figure 4A:
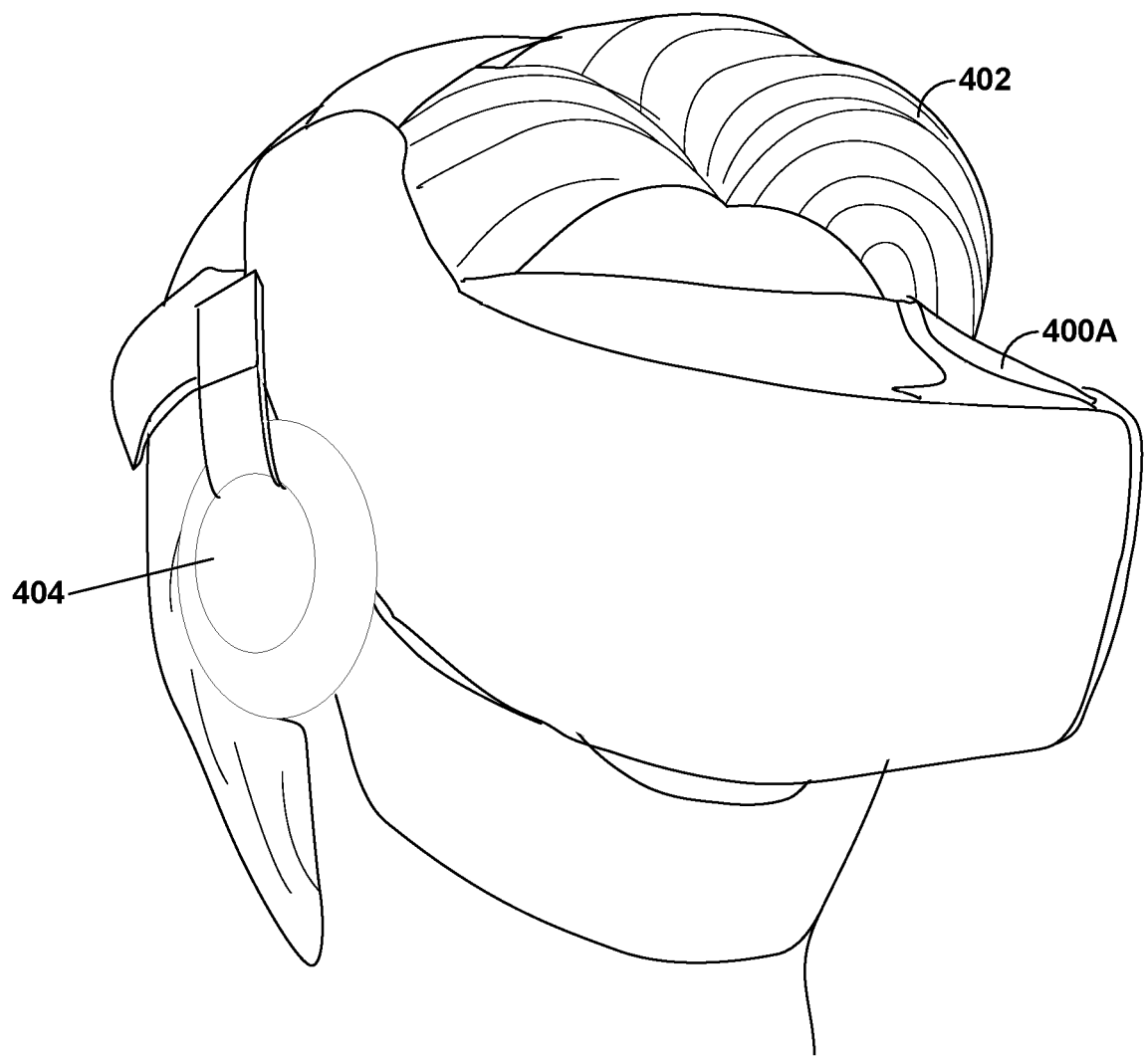
FIGS. 4A and 4B are diagrams illustrating examples of VR devices.
Figure 4B:
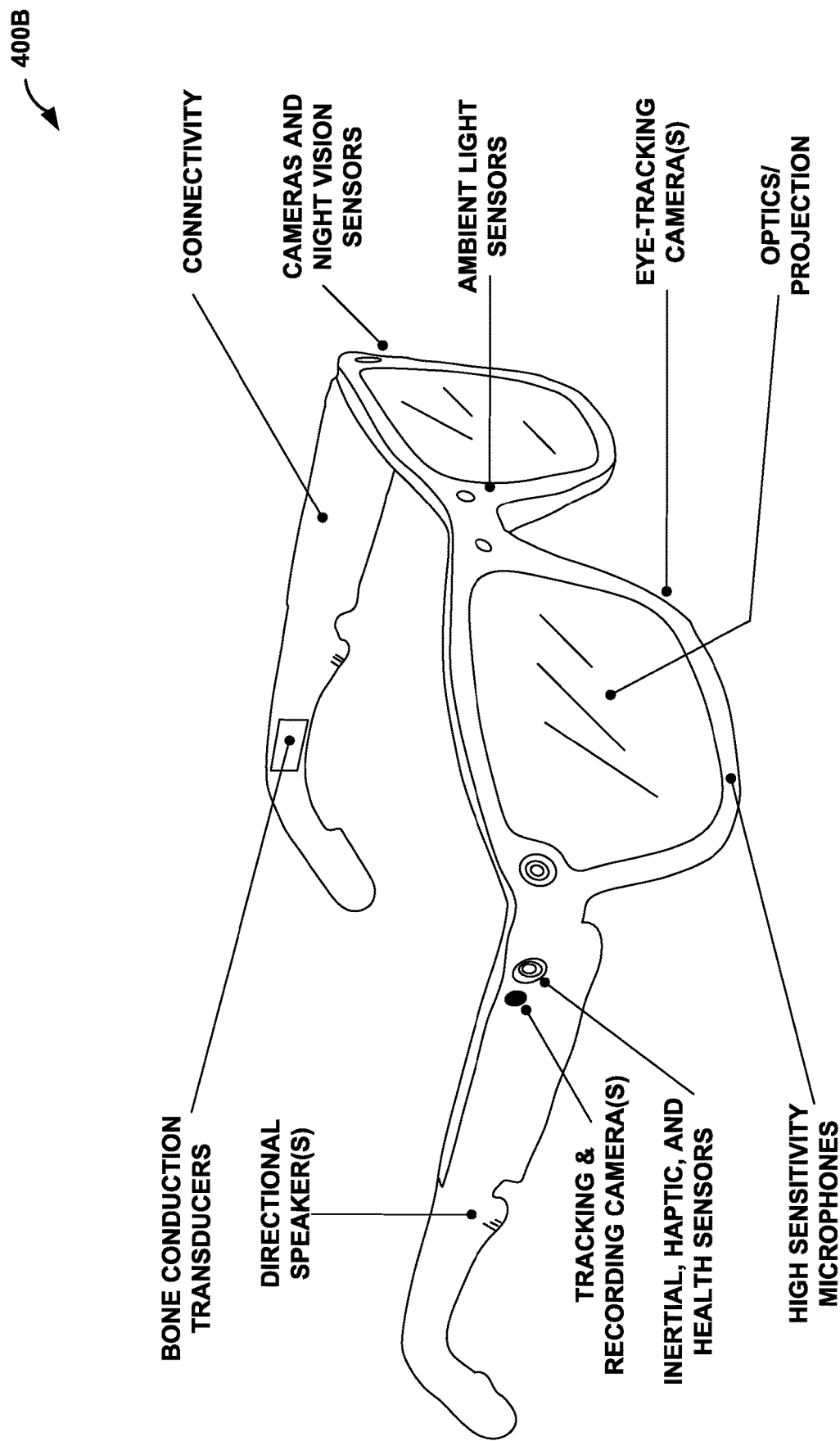

As described above, the content consumer device 14A may represent a VR device in which a human wearable display is mounted in front of the eyes of the user operating the VR device. FIGS. 4A and 4B are diagrams illustrating examples of VR devices 400A and 400B. In the example of FIG. 4A, the VR device 400A is coupled to, or otherwise includes, headphones 404, which may reproduce a soundfield represented by the ambisonic audio data 15 (which is another way to refer to ambisonic coefficients) through playback of the speaker feeds 25. The speaker feeds 25 may represent an analog or digital signal capable of causing a membrane within the transducers of headphones 404 to vibrate at various frequencies. Such a process is commonly referred to as driving the headphones 404.

Video, audio, and other sensory data may play important roles in the VR experience. To participate in a VR experience, a user 402 may wear the VR device 400A (which may also be referred to as a VR headset 400A) or other wearable electronic device. The VR client device (such as the VR headset 400A) may track head movement of the user 402, and adapt the video data shown via the VR headset 400A to account for the head movements, providing an immersive experience in which the user 402 may experience a virtual world shown in the video data in visual three dimensions.

While VR (and other forms of AR and/or MR, which may generally be referred to as a computer mediated reality device) may allow the user 402 to reside in the virtual world visually, often the VR headset 400A may lack the capability to place the user in the virtual world audibly. In other words, the VR system (which may include a computer responsible for rendering the video data and audio data—that is not shown in the example of FIG. 4A for ease of illustration purposes, and the VR headset 400A) may be unable to support full three dimension immersion audibly.

FIG. 4B is a diagram illustrating an example of a wearable device 400B that may operate in accordance with various aspect of the techniques described in this disclosure. In various examples, the wearable device 400B may represent a VR headset (such as the VR headset 400A described above), an AR headset, an MR headset, or any other type of XR headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 400B may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 400B may communicate with the computing device supporting the wearable device 400B via a wired connection or a wireless connection.

In some instances, the computing device supporting the wearable device 400B may be integrated within the wearable device 400B and as such, the wearable device 400B may be considered as the same device as the computing device supporting the wearable device 400B. In other instances, the wearable device 400B may communicate with a separate computing device that may support the wearable device 400B. In this respect, the term "supporting" should not be understood to require a separate dedicated device but that one or more processors configured to perform various aspects of the techniques described in this disclosure may be integrated within the wearable device 400B or integrated within a computing device separate from the wearable device 400B.

For example, when the wearable device 400B represents an example of the VR device 400B, a separate dedicated computing device (such as a personal computer including the one or more processors) may render the audio and visual content, while the wearable device 400B may determine the translational head movement upon which the dedicated computing device may render, based on the translational head movement, the audio content (as the speaker feeds) in accordance with various aspects of the techniques described in this disclosure. As another example, when the wearable device 400B represents smart glasses, the wearable device 400B may include the one or more processors that both determine the translational head movement (by interfacing within one or more sensors of the wearable device 400B) and render, based on the determined translational head movement, the speaker feeds.

As shown, the wearable device 400B includes one or more directional speakers, and one or more tracking and/or recording cameras. In addition, the wearable device 400B includes one or more inertial, haptic, and/or health sensors, one or more eye-tracking cameras, one or more high sensitivity audio microphones, and optics/projection hardware. The optics/projection hardware of the wearable device 400B may include durable semi-transparent display technology and hardware.

The wearable device 400B also includes connectivity hardware, which may represent one or more network interfaces that support multimode connectivity, such as 4G communications, 5G communications, Bluetooth, etc. The wearable device 400B also includes one or more ambient light sensors, and bone conduction transducers. In some instances, the wearable device 400B may also include one or more passive and/or active cameras with fisheye lenses and/or telephoto lenses. Although not shown in FIG. 4B, the wearable device 400B also may include one or more light emitting diode (LED) lights. In some examples, the LED light(s) may be referred to as "ultra bright" LED light(s). The wearable device 400B also may include one or more rear cameras in some implementations. It will be appreciated that the wearable device 400B may exhibit a variety of different form factors.

Furthermore, the tracking and recording cameras and other sensors may facilitate the determination of translational distance. Although not shown in the example of FIG. 4B, wearable device 400B may include other types of sensors for detecting translational distance.

Although described with respect to particular examples of wearable devices, such as the VR device 400B discussed above with respect to the examples of FIG. 4B and other devices set forth in the examples of FIGS. 1A and 1B, a person of ordinary skill in the art would appreciate that descriptions related to FIGS. 1A-4B may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

In any event, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for audio aspects of VR. As such, the audio aspects of VR are less immersive than the video aspects, thereby potentially reducing the overall immersion experienced by the user, and introducing localization errors (e.g., such as when the auditory playback does not match or correlate exactly to the visual scene).

Although 3DOF rendering is the current state, more immersive audio rendering, such as 3DOF+ and 6DOF rendering, may result in higher complexity in terms of processor cycles expended, memory and bandwidth consumed, etc. In an effort to reduce complexity, the audio playback system 16A may include an interpolation device 30 ("INT DEVICE 30") that may select a subset of the ambisonic coefficients 11' as the ambisonic audio data 15. The interpolation device 30 may then interpolate the selected subset of the ambisonic coefficients 11', applying various weights (as defined by measured importance to the auditory scene—e.g., as a function of gain analysis or other analysis, such as directionality analysis, etc.) before summing the weighted ambisonic coefficients 11' to form the ambisonic audio data 15. The interpolation device 30 may select a subset of the ambisonic coefficients thereby reducing a number of operations performed when rendering the ambisonic audio data 15 (as increasing the number of ambisonic coefficients 11' likewise increases a number of operations performed to render the speaker feeds 25 from the ambisonic audio data 15).

As such, there may be instances in which high complexity audio rendering may be important in providing an immersive experience and other instances in which low complexity audio rendering may be adequate to provide the same immersive experience. Furthermore, having the capability to provide high complexity audio rendering while also supporting low complexity audio rendering may enable devices with different processing capabilities to performing audio rendering, thereby potentially accelerating the adoption of XR devices as low cost devices (with possibly lower processing capabilities compared to higher host devices) may allow more people to purchase and experience XR.

In accordance with the techniques described in this disclosure, various ways are described by which to enable low complexity audio rendering while providing the option for high complexity audio rendering with additional metadata or other indications for controlling audio rendering at the audio playback system 16A. The techniques may enable the audio playback system 16A to perform flexible rendering in terms of complexity (as defined by processor cycles, memory, and/or bandwidth consumed), while also permitting interior and exterior rendering for XR experiences as defined by a boundary separating an interior area from an exterior area. As used herein, "area" may refer to a 2-dimensional space, a 3-dimensional space, or a volume. Furthermore, the audio playback system 16A may utilize metadata or other indications specified in a bitstream representative of audio data to configure the one or more audio renderers 22 while also referencing a listener location 17 relative to the boundary to generate the one or more audio renderers 22 to account for the interior area or the exterior area.

As such, the techniques may improve operation of the audio playback system as, when configured to perform low complexity rendering, the audio playback system 16A may reduce a number of processor cycles, memory, and/or bandwidth consumed. When performing high complexity rendering, the audio playback system 16A may provide a more immersive XR experience, which may result in more realistic placement of a user of the audio playback system 16A in the XR experience.

As shown in the example of FIG. 1A, the audio playback system 16A may include a renderer generation unit 32, which represent a unit configured to generate or otherwise obtain one or more of the audio renderers 22 in accordance with various aspects of the techniques described in this disclosure. The renderer generation unit 32 may, in some examples, perform the above noted processes to generate the one or more audio renderers 22 based on the listener location 17 and the speaker geometry in loudspeaker information 13.

In addition, however, the renderer generation unit 32 may obtain various indications 31 (e.g., syntax elements or other types of metadata) from the bitstream 21 (which may be parsed by the audio decoding device 24). As such, the soundfield representation generator 302 may specify the indications 31 in the bitstream 21 prior to transmitting the bitstream 21 to the audio playback system 16A. The soundfield representation generator 302 may receive, as one example, the indications 31 from the content capture device 300. An operator, editor or other individual may specify the indications 31 through interactions with the content capture device 300 or some other device, such as a content editing device.

The one or more indications 31 may include an indication indicating a complexity of the rendering to be performed by the audio playback system 16A, an indication of opacity for rendering secondary sources present in the ambisonic coefficients s, and/or an indication of a buffer distance around the interior area in which rendering is interpolated between interior rendering and exterior rendering. The indication indicating a complexity may indicate the complexity as low complexity or high complexity (as a Boolean where true is for low complexity while false is for high complexity). The indication indicating opacity may either indicate opaque or not opaque (as a Boolean value where true indicates opaque and false indicates not opaque, although opacity may be defined as a float with a value of zero through one). The indication indicating the transition distance may indicate the distance as a value.

The soundfield representation generator 302 may also specify, in the bitstream 21, a boundary separating the interior area from the exterior area. The soundfield representation generator 302 may, as noted above, also specify the one or more indications 31 that control rendering of the ambisonic coefficients 11 for either the interior area and the exterior area. The soundfield representation generator 302 may output the bitstream 21 for delivery (either in near-real time via network streaming, etc. or for later delivery as noted above).

The audio playback system 16A may obtain the bitstream 21 and invoke the audio decoding device 24 to decompress the bitstream to obtain the ambisonic audio coefficients 11' along with parsing the indications 31 from the bitstream 21. The audio decoding device 24 may output the indications 31 to the renderer generation unit 32 along with the indication of the boundary. The audio playback system 16A may also interface with the tracking device 306 to obtain the listener location 17, where the boundary, the listener location 17, and the indications 31 are provided to the renderer generation unit 32.

As such, the renderer generation unit 32 may obtain the indication of a boundary separating an interior area from an exterior area. The renderer generation unit 32 may also obtain the listener location 17 indicating of a virtual location of the content consumer device 14A relative to the interior area.

The renderer generation unit 32 may then obtain, based on the boundary and the listener location 17, a current renderer of the one or more audio renders 22 to be used when rendering the ambisonic audio data 15 to the one or more speaker feeds 25. The current renderer may be configured to render the ambisonic audio data 25 for the interior area (and thereby operate as an interior renderer) or configured to render the audio data for the exterior area (and thereby operate as an exterior render).

Determining whether to configure the current renderer as either an interior rendering or an exterior render (or an interpolation or crossfading therebetween) may depend on where the content consumer device 14A resides relative to the boundary in the XR scene. For example, when the content consumer device 14A is, in the XR scene and per the listener location 17, outside of the interior area defined by the boundary, the renderer generation unit 32 may configure the current renderer to operate as an exterior renderer. When the content consumer device 14A is, in the XR scene and per the listener location 17, inside of the interior area defined by the boundary, the renderer generation unit 32 may configure the current renderer to operate as an interior renderer. The renderer generation unit 32 may output the current renderer, where the audio playback system 16A may apply, to the ambisonic audio data 15, the current renderer to obtain the speaker feeds 25.

More information regarding the indication of the complexity, the indication of the opacity, and the indication of transition distance are described below with respect to the examples of FIGS. 2 and 3.

FIG. 1B is a block diagram illustrating another example system 100 configured to perform various aspects of the techniques described in this disclosure. The system 100 is similar to the system 10 shown in FIG. 1A, except in audio playback system 16B of content consumer device 14B the one or more audio renderers 22 shown in FIG. 1A are replaced with a binaural renderer 102 capable of performing binaural rendering using one or more HRTFs or the other functions capable of rendering to left and right speaker feeds 103. Thus, in some examples, the current renderer may be a binaural renderer.

The audio playback system 16B may output the left and right speaker feeds 103 to headphones 104, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 104 may couple wirelessly or via wired connection to the additional wearable devices.

Additionally, the headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the ambisonic coefficients 11. The headphones 104 may include a left headphone speaker and a right headphone speaker which are powered (or, in other words, driven) by the corresponding left and right speaker feeds 103.

Figure 2:
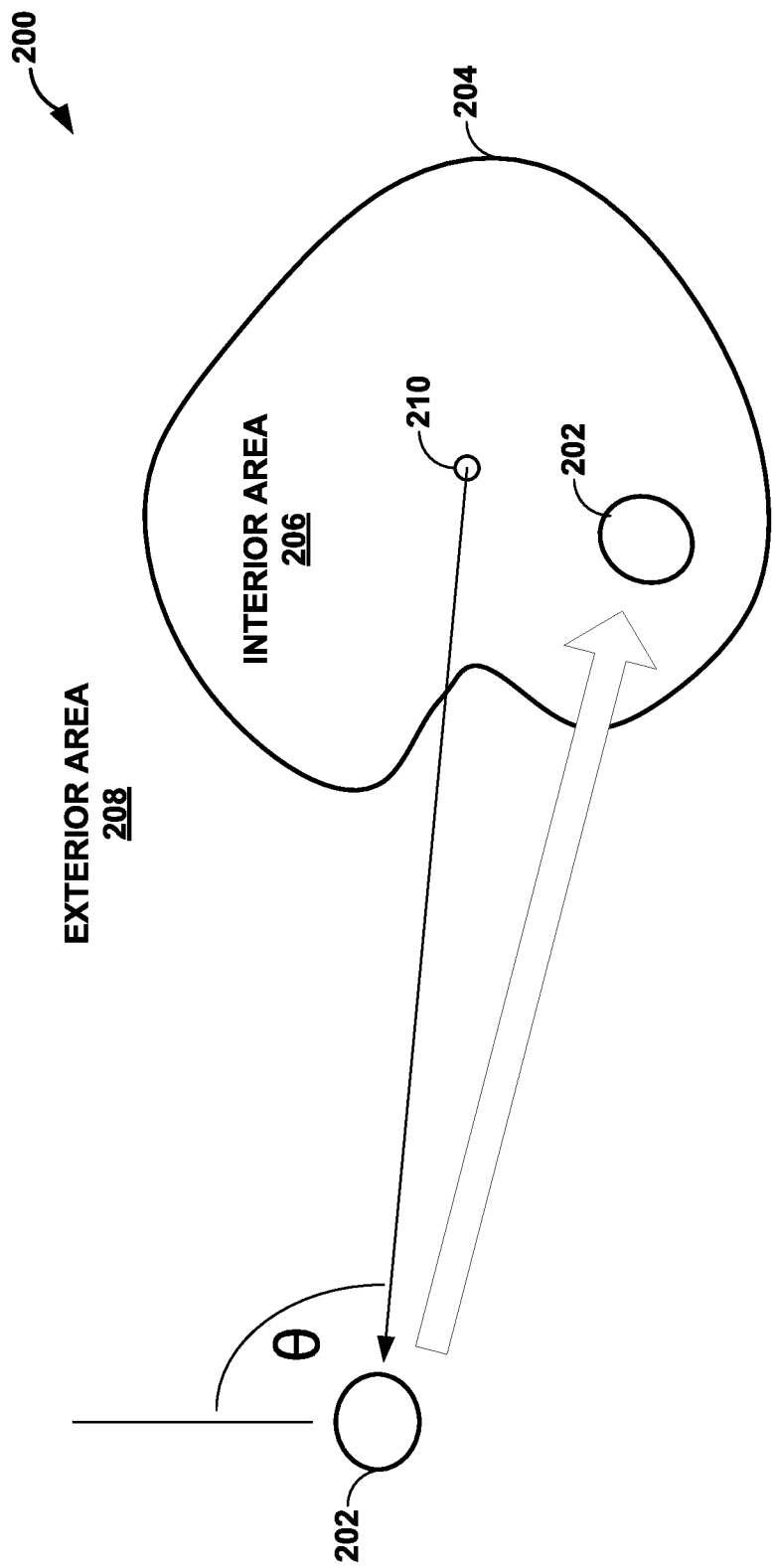
FIG. 2 is a diagram illustrating an example of low complexity rendering for an extended reality (XR) scene in accordance with various aspects of the techniques described in this disclosure.

FIG. 2 is a diagram illustrating an example of low complexity rendering for an extended reality (XR) scene in accordance with various aspects of the techniques described in this disclosure. As shown in the example of FIG. 2, an XR scene 200 includes an operator 202 that operates the content consumer device 14A (which is not shown for ease of illustration purposes). The XR scene 200 also includes a boundary 204 separating an interior area 206 from an exterior area 208.

Although a single boundary 204 is shown in the example of FIG. 2, the XR scene 200 may include multiple boundaries separating different interior areas from the exterior area 208. Furthermore, although shown as a single boundary 204, boundaries may exist within other boundaries, overlap with other boundaries and the like. When boundaries exist within other boundaries, the interior area defined by the larger boundary may operate as an exterior boundary (for purposes of rendering) relative to rendering for the interior area defined by the boundary within the outer boundary.

In any event, assuming first that the operator 202 is in the exterior area 208 relative to the boundary 204, the renderer generation unit 32 (of the content consumer device 14A) may first determine whether the indication of complexity indicates a high complexity or a low complexity. Assuming for purposes of illustration that the indication of complexity indicates a low complexity, the renderer generation unit 32 may determine a first distance between the listener location 17 and a center 210 of the interior area 206 (as computed, as one example, based on the boundary 204, which may be denoted as a shape, point listing, a spline, or any other geometrical representation). The renderer generation unit 32 may next determine a second distance between the boundary 204 and the center 210.

The renderer generation unit 32 may then compare the first distance to the second distance to determine that the operator 202 resides outside of the boundary 204. That is, when the first distance is greater than the second distance, the renderer generation unit 32 may determine that the operator 202 is located outside of the boundary 204. The renderer generation unit 32 may, for the low complexity configuration, generate the current renderer to render the ambisonic audio data 15 for the interior area 206 such that the soundfield represented by the ambisonic audio data 15 originates from the center 210 of the interior area 206. The renderer generation unit 32 may render the ambisonic audio data 15 to be located theta (θ) degrees from the direction the operator 202 is facing.

Making the soundfield appear to originate from a single point, e.g., the center 210 in this example, may reduce complexity in terms of processing cycles, memory, and bandwidth consumption because it may result in fewer speaker feeds used to represent the soundfield (and potentially reduce panning, mixing, and other audio operations) while also potentially preserving the immersive experience. Further reduction in processor cycle, memory, and bandwidth consumption may occur when the renderer generation unit 32 only utilizes a single ambisonic coefficient of the ambisonic audio data 15 (e.g., the ambisonic coefficient corresponding to a spherical basis function having an order of zero, the ambisonic coefficient corresponding to a spherical basis function having an order of zero represents the gain of the soundfield and does not provide much if any spatial information and therefore does not require complex rendering), rather than process multiple ambisonic coefficients from the ambisonic audio data 15.

Next, assume that the operator 202 moves into the interior area 206. The renderer generation unit 32 may receive an updated listener location 17 and perform the same process described above to determine (as the first distance is less than the second distance) that the operator 202 is located in the interior area 206. For the low complexity indication and responsive to determining that the operator 202 resides in the interior area, the renderer generation unit 206 may output an updated current renderer configured to render the ambisonic audio data 15 such that the soundfield represented by the ambisonic audio data 15 occurs throughout the interior area 206 (which may be referred to a full or normal rendering, as all of the ambisonic audio data 15 may be rendered such that the audio sources within the soundfield are accurately placed around the operator 202).

In this way, when the interior field is specified to be rendered using low complexity renderer for low latency applications or for artistic intent, then an attribute for buffer region distance or opacity is not utilized when generating the current renderer. In this case, when the listener 202 (which is another way to refer to the operator 202) is outside the interior field region 206 (which is another way to refer to the interior area 206), the W ambisonic channel (audio data corresponding to the zeroth order and sub order of the spherical harmonics, $\alpha_{00}(t)$) is played coming from the center 210 of the interior field region 206 to the listener 202. When the listener 202 is within the interior field region 206, the ambisonics sound field is played back normally coming from all directions.

Figure 3:
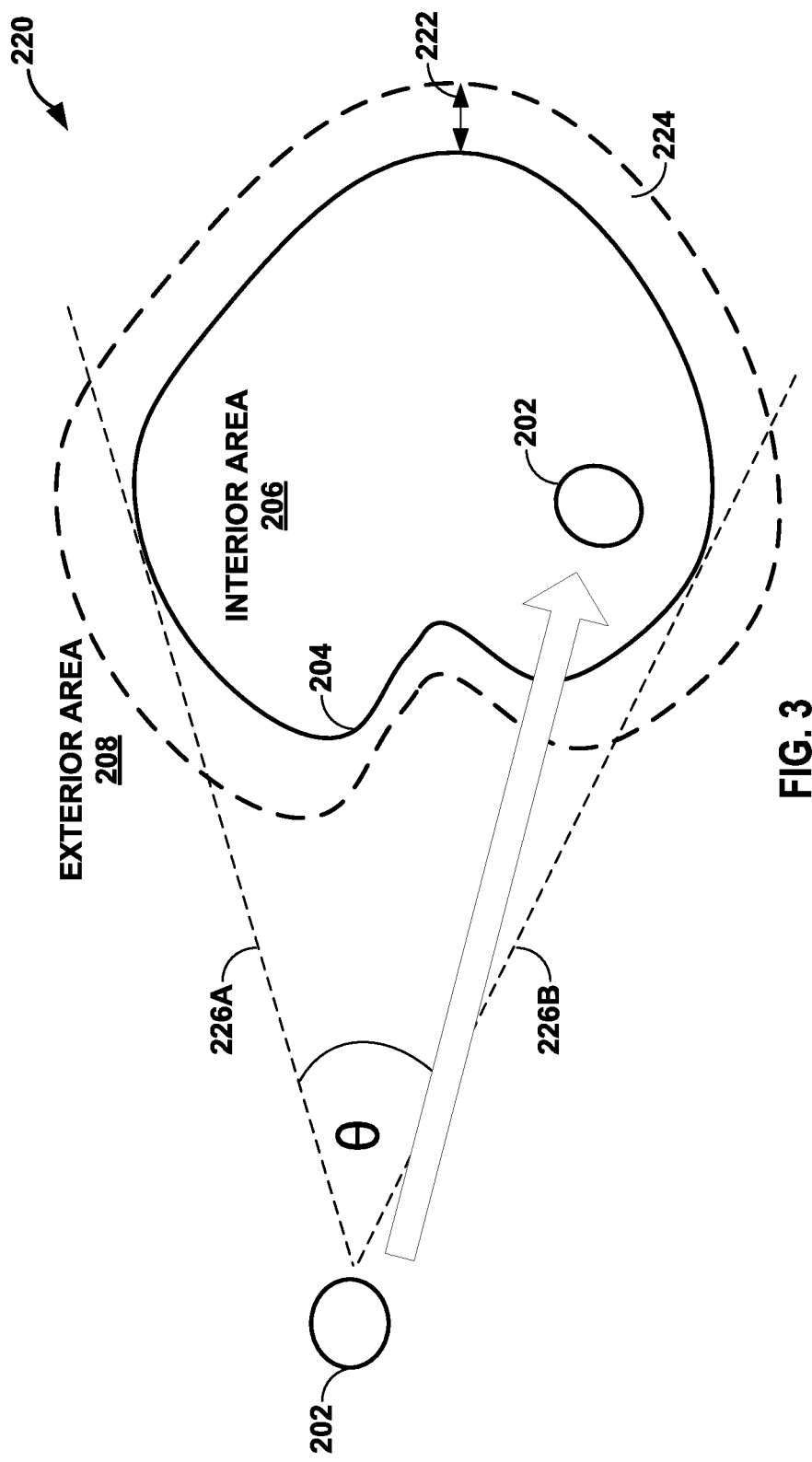
FIG. 3 is a diagram illustrating an example of high complexity rendering that includes a transition distance for an XR scene in accordance with various aspects of the techniques described in this disclosure.

FIG. 3 is a diagram illustrating an example of high complexity rendering, for an XR scene, that includes a transition distance in accordance with various aspects of the techniques described in this disclosure. The XR scene 220 is similar to the XR scene 200 shown in the example of FIG. 2, accept that it is assumed that the indication of complexity indicates high complexity. Responsive to the indication indicating high complexity, the renderer generation unit 32 may utilize the indication of the transition distance 222 resulting in a transition zone 224 (which may also be referred to as an "interpolation zone 224"). In some examples, the transition distance 222 may be a configurable threshold or may be defined as small value relative to the exterior area 208 or the interior area 206, such as 20% of percentage of the distance to the center of interior area 206.

Assuming first that the operator 202 resides in the exterior area 208, the renderer generation unit 32 may determine, in the manner described above with respect to the example of FIG. 2, that the operator 202 resides in the exterior area 208. Responsive to determining that the operator 202 resides in the exterior area 208, the renderer generation unit 32 may next determine whether the indication of complexity indicates high complexity or low complexity. Assuming that the indication of complexity indicates high complexity for purposes of illustration, the renderer generation unit 32 may determine whether the indication of opacity indicates opaque or not opaque.

When the indication of opacity indicates opaque, the renderer generation unit 32 may configure the current renderer to discard secondary audio sources present in the soundfield represented by the ambisonic audio data 15 that are not directly in the line of sight of the operator 202. In other words, the renderer generation unit 32 may configure, based on the listener location 17 and the boundary 204, the current renderer to exclude addition of the secondary audio sources to which the listener location 17 indicates as not being directly in the line of sight. When the indication of opacity indicates not opaque, the renderer generation unit 32 reverts to normal rendering that considers all secondary sources.

When configuring the current renderer for external rendering using high complexity, the renderer generation unit 32 may configure, in all cases (e.g., opaque or not opaque), the current renderer to render the ambisonic audio data 15 such that the soundfield represented by the ambisonic audio data 15 is spread out depending on a distance between the listener location 17 and the boundary 204. The spread out degree is denoted as theta (θ) degrees in the example of FIG. 3. The distance is shown by the two dashed lines 226A and 226B, resulting in the theta degrees of spread.

As the operator 202 moves into the translation zone 224, the renderer generation unit 32 may update, responsive to determining the listener location 17 is within the transition distance 222 of the boundary 204, the current renderer to interpolate or crossfade between the exterior renderer and the interior renderer. Example of interpolation may be (1−a)*internal_rendering+a*external_rendering, where a is a fraction based on how close the listener 202 is to the sound field boundary 204 (which is another way to refer to the boundary 204). If the exterior renderer and the interior renderer include different order ambisonics, for example, if the exterior renderer renders $1^{st}$ order ambisonics and the interior renderer renders $4^{th}$ order ambisonics, the current renderer may interpolate or crossfade to $2^{nd}$ order ambisonics and to $3^{rd}$ order ambisonics as operator 202 moves from exterior area 208 through transition zone 224 towards interior area 206. Similarly, the current renderer may interpolate or crossfade to $3^{rd}$ order ambisonics and to $2^{nd}$ order ambisonics as operator 202 moves from interior area 206 through transition zone 224 back to exterior area 208.

The audio playback system 16A may then apply the updated current renderer to obtain one or more updated speaker feeds 25. For example, the current renderer may crossfade between the exterior renderer and the interior renderer.

When the operator 202 moves fully within interior area 206, the renderer generation unit 32 may generate the current renderer to render normally. That is, the renderer generation unit 32 may generate the current renderer to fully render the ambisonic audio data 15 residing within the interior area 206 using all of the ambisonic coefficients of the ambisonic audio data 15 and in a manner that correctly places each of the audio sources in the soundfield (e.g., not locating all of the sources in the same location, such as the center 210 of the interior area 206 shown in the example of FIG. 2).

In other words, the interior sound field of the interior field region 206 represented in the ambisonic format allows secondary sources on the boundary and these contribute to the sound at the listener 202 according to Huygen's principle. When the opacity attribute is true, the renderer generation unit 32 may not add contributions of secondary sources to which the listener 202 does not have a direct line of sight.

In the high complexity renderer, the listener 202 may hear the interior sound field of interior field region 206 as a spread out source depending on their distance from the interior sound field 206. As the listener 202 moves from the outside sound field 208 (which is another way to refer to the exterior area 208) to the inside sound field 206 (which is another way to refer to the interior area 206), the rendering may change and this shift may be done smoothly. The Buffer_Distance attribute specifies the distance when the interpolation between rendering for an external to an internal listener 202 is performed. One example interpolation scheme includes (1−a)*internal_rendering+a*external_rendering. The variable may denote a fraction based on how close the listener is to the sound field boundary 204.

For example, an orchestra may be represented as an interior ambisonic sound field. In this case, the listener 202 should have a contribution from all the instruments hence Opacity is false. In a case, where the interior field represents a crowd and the intent is to change the listening experience as the listener moves around the outside of the boundary 204, the Opacity may be set to true.

As such, the addition of an opacity attribute, an interpolation buffer distance attribute and a complexity attribute (which are another way of referring to the indications 31) may be specified to support the rendering of interior ambisonic sound fields to the MPEG-I Encoder Input Format. Several usage scenarios may exemplify the usefulness of these attributes. These attributes may facilitate control of the rendering of interior sound fields at the listener location for 6DoF (and other) use cases.

Although described with respect to a VR device as shown in the example of FIGS. 4A and 4B, the techniques may be performed by other types of wearable devices, including watches (such as so-called "smart watches"), glasses (such as so-called "smart glasses"), headphones (including wireless headphones coupled via a wireless connection, or smart headphones coupled via wired or wireless connection), and any other type of wearable device. As such, the techniques may be performed by any type of wearable device by which a user may interact with the wearable device while worn by the user.

Figure 5A:
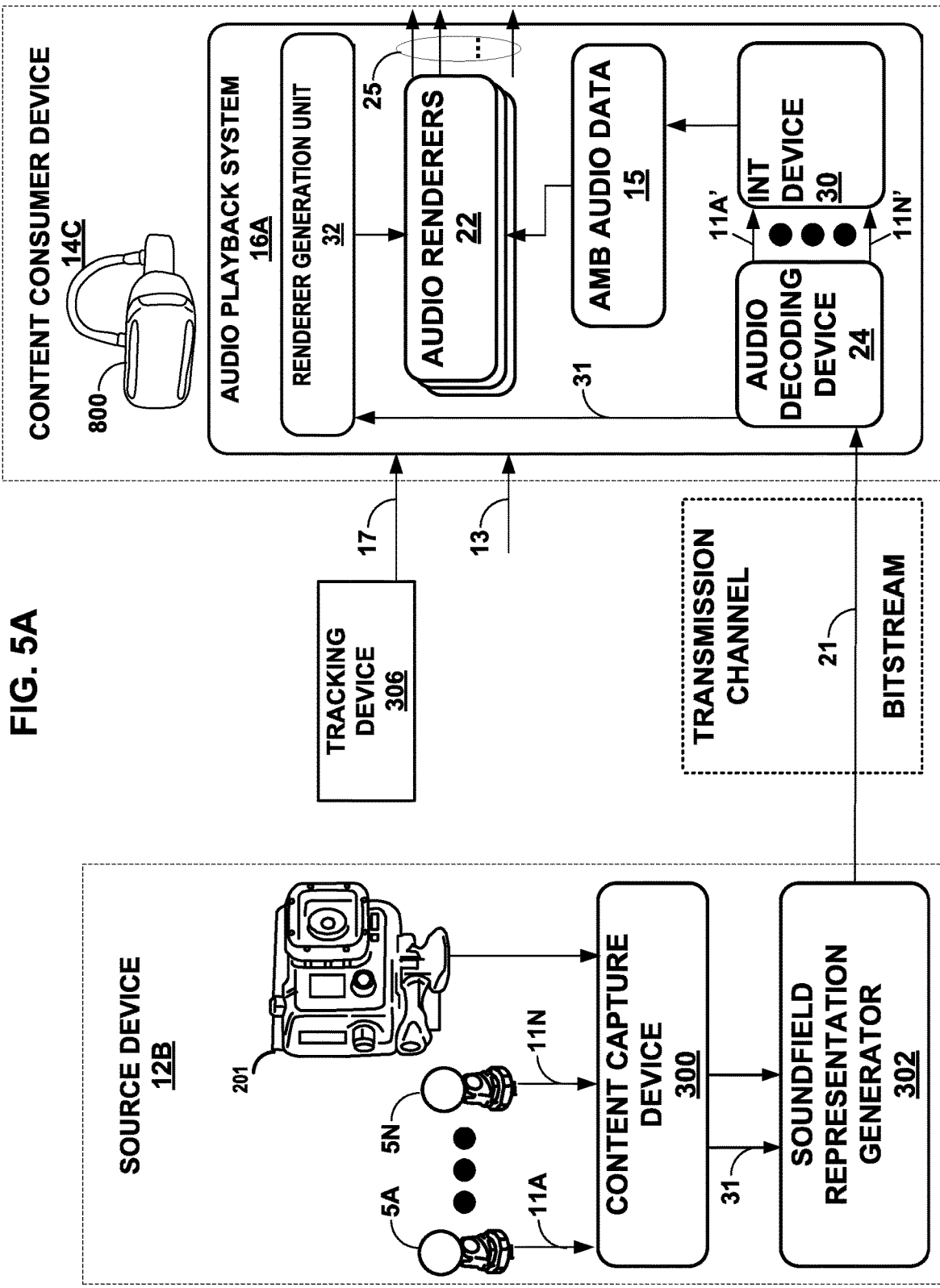
FIGS. 5A and 5B are diagrams illustrating example systems that may perform various aspects of the techniques described in this disclosure.
Figure 5B:
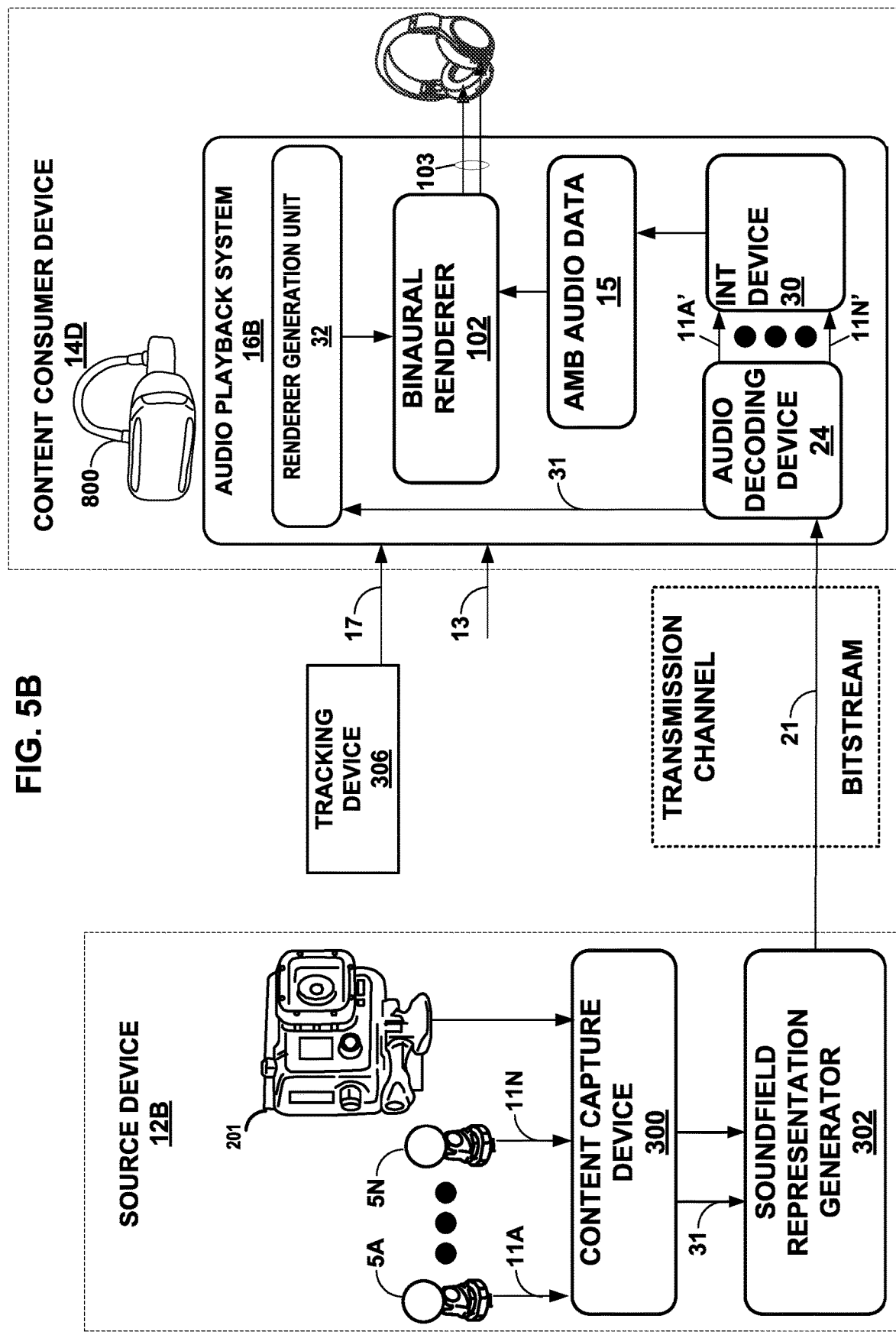

FIGS. 5A and 5B are diagrams illustrating example systems that may perform various aspects of the techniques described in this disclosure. FIG. 5A illustrates an example in which the source device 12B further includes a camera 201. The camera 201 may be configured to capture video data, and provide the captured raw video data to the content capture device 300. The content capture device 300 may provide the video data to another component of the source device 12B, for further processing into viewport-divided portions.

In the example of FIG. 5A, the content consumer device 14C also includes the wearable device 800. It will be understood that, in various implementations, the wearable device 800 may be included in, or externally coupled to, the content consumer device 14C. As discussed above with respect to FIGS. 4A and 4B, the wearable device 800 includes display hardware and speaker hardware for outputting video data (e.g., as associated with various viewports) and for rendering audio data.

FIG. 5B illustrates an example similar that illustrated by FIG. 5A, except that the one or more audio renderers 22 shown in FIG. 5A are replaced with a binaural renderer 102 capable of performing binaural rendering using one or more HRTFs or the other functions capable of rendering to left and right speaker feeds 103. The audio playback system 16 may output the left and right speaker feeds 103 to headphones 104.

The headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the ambisonic coefficients 11. The headphones 104 may include a left headphone speaker and a right headphone speaker which are powered (or, in other words, driven) by the corresponding left and right speaker feeds 103.

Figure 6A:
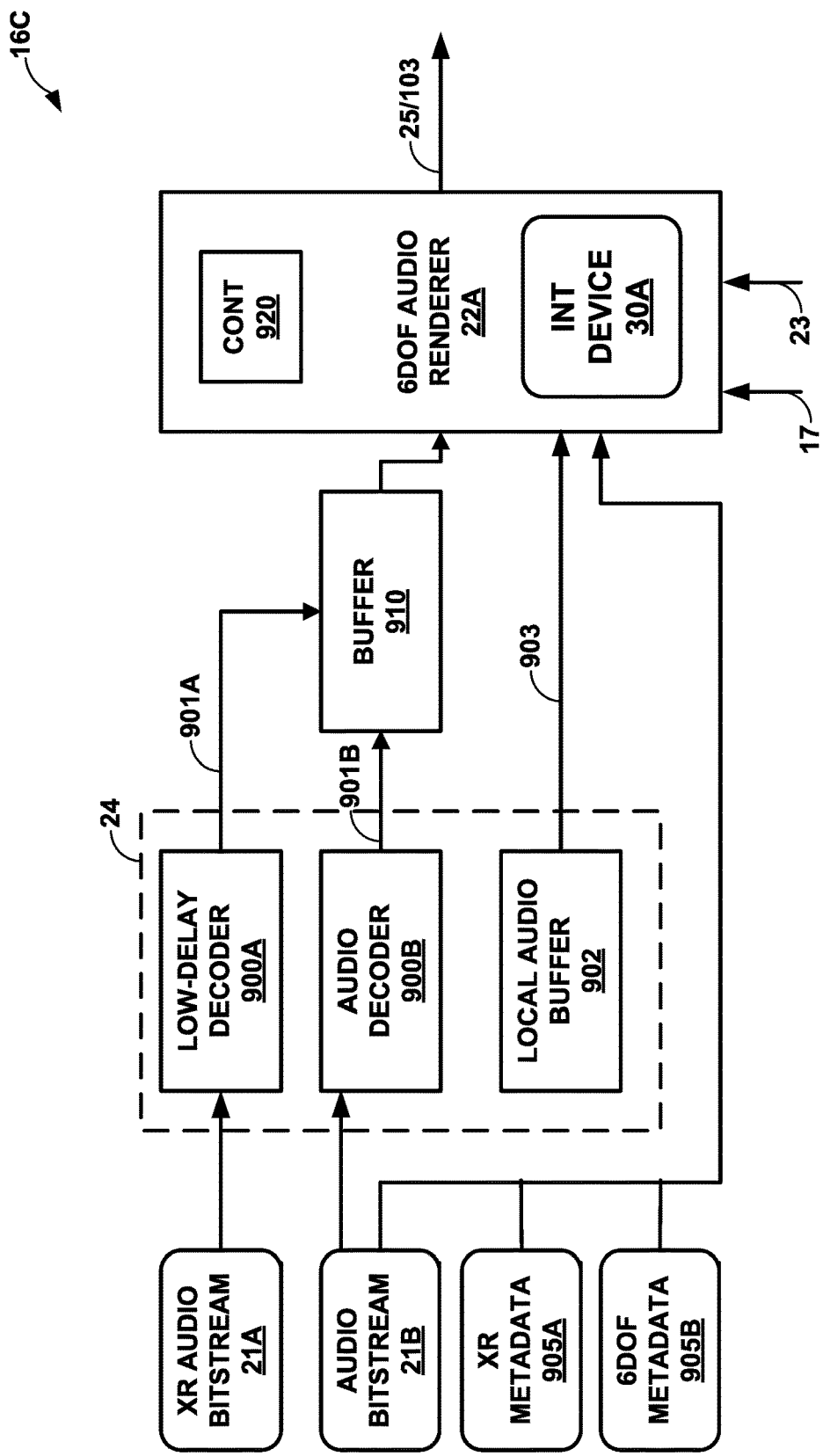
FIGS. 6A-6G are block diagrams of example audio playback systems shown in the examples of FIGS. 1A and 1B in performing various aspects of the techniques described in this disclosure.

FIG. 6A is a block diagram of the audio playback system shown in the examples of FIGS. 1A and 1B in performing various aspects of the techniques described in this disclosure. The audio playback system 16C may represent an example of the audio playback system 16A and/or the audio playback system 16B. The audio playback system 16 may include the audio decoding device 24 in combination with a 6DOF audio renderer 22A, which may represent one example of the one or more audio renderers 22 shown in the example of FIG. 1A.

The audio decoding device 24 may include a low delay decoder 900A, an audio decoder 900B, and a local audio buffer 902. The low delay decoder 900A may process XR audio bitstream 21A to obtain audio stream 901A, where the low delay decoder 900A may perform relatively low complexity decoding (compared to the audio decoder 900B) to facilitate low delay reconstruction of the audio stream 901A. The audio decoder 900B may perform relatively higher complexity decoding (compared to the audio decoder 900A) with respect to the audio bitstream 21B to obtain audio stream 901B. The audio decoder 900B may perform audio decoding that conforms to the MPEG-H 3D Audio coding standard. The local audio buffer 902 may represent a unit configured to buffer local audio content, which the local audio buffer 902 may output as audio stream 903.

The bitstream 21 (comprised of one or more of the XR audio bitstream 21A and/or the audio bitstream 21B) may also include XR metadata 905A (which may include the microphone location information noted above) and 6DOF metadata 905B (which may specify various parameters related to 6DOF audio rendering). The 6DOF audio renderer 22A may obtain the audio streams 901A and/or 901B from buffer 910, and/or 903 along with the XR metadata 905A, the 6DOF metadata 905B, listener location 17, and HRTF 23 and render the speaker feeds 25 and/or 103 based on the listener locations and the microphone positions. In the example of FIG. 6A, the 6DOF audio renderer 22A includes the interpolation device 30A, which may perform various aspects of the audio stream selection and/or interpolation techniques described in more detail above to facilitate 6DOF audio rendering. In the example of FIG. 6A, the 6DOF audio renderer 22A also includes controller 920 which may pass the appropriate metadata and audio signals to interpolation device 30A. Interpolation device 30A may interpolate ambisonic coefficients from two or more sources in buffer 910 or interpolate binauralized audio from an audio object renderer and/or 6DOF audio renderer 22A. While shown as part of 6DOF, in some examples, controller 920 may be located elsewhere in audio playback system 16C. In some examples, any of low-delay decoder 900A, audio decoder 900B, local audio buffer 902, buffer 910, and 6DOF audio renderer 22A may be implemented in one or more processors.

Figure 6B:
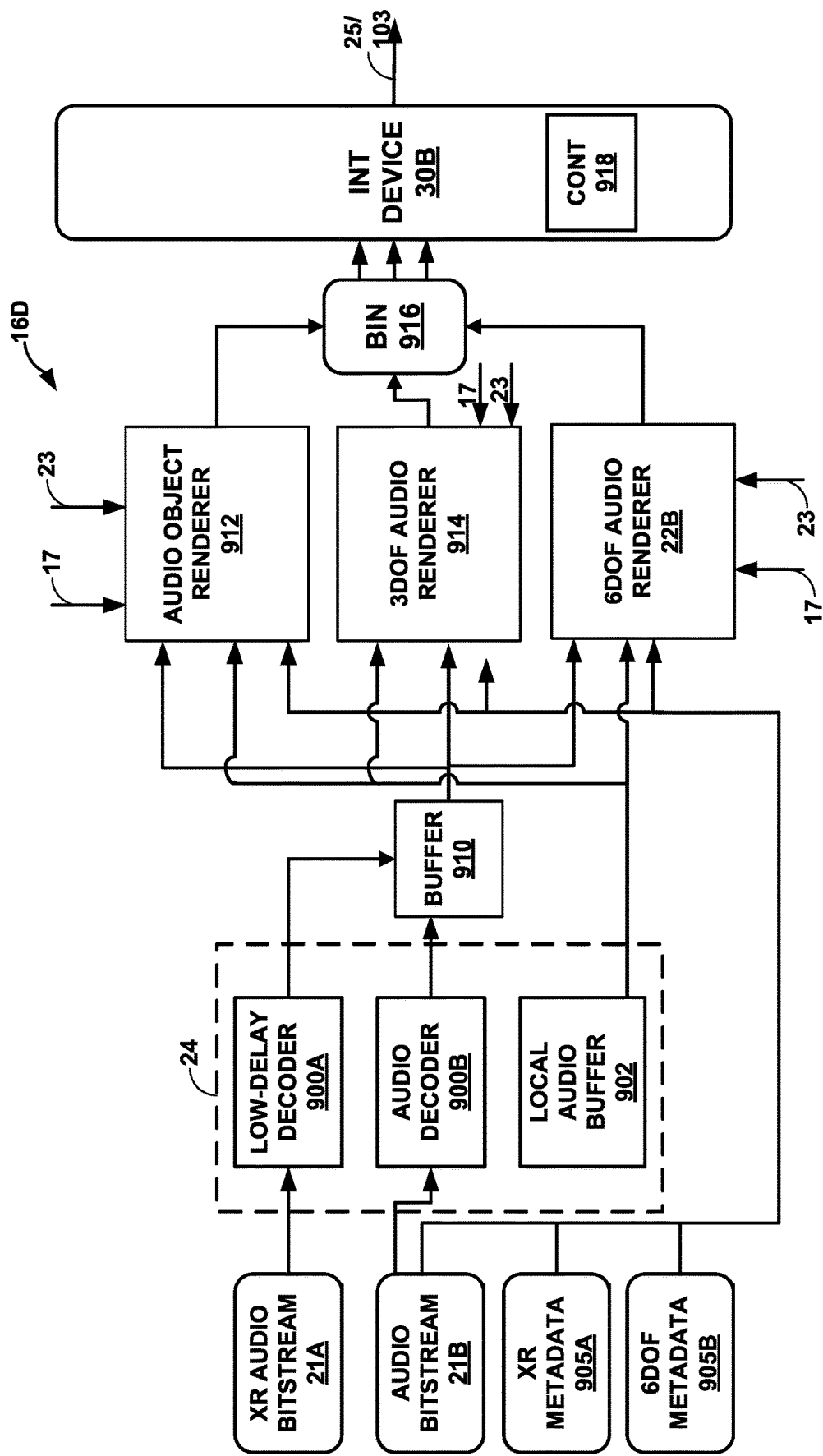

FIG. 6B is a block diagram of the audio playback system shown in the examples of FIGS. 1A and 1B in performing various aspects of the techniques described in this disclosure. The example audio playback system 16D of FIG. 6B is similar to audio playback system 16C of FIG. 6A, however audio playback system 16D further includes audio object renderer 912 and 3DOF audio renderer 914. Each of audio object renderer 912, 3DOF audio renderer 914, and 6DOF audio renderer 22B may receive listener location 17 and HRTF 23. In this example, the output of audio object renderer 912, 3DOF audio renderer 914, or the output of 6DOF audio renderer may be sent to binauralizer 916 which may perform a binaural rendering. In some examples, each of audio object renderer 912, 3DOF audio renderer 914, and 6DOF audio renderer 22B may output ambisonics. The output of binauralizer 916 may be sent to interpolation device 30B. Interpolation device 30B may include controller 918. While a single output from audio decoding device 24 is shown, in some examples, low-delay decoder 900A, audio decoder 900B and local audio buffer 902 may each have separate connections to each of audio object renderer 912, 3DOF audio renderer 914 and 6DOF audio renderer 22A. In the example of FIG. 6B, interpolation device 30B may interpolate binauralized audio from binauralizer 916. In the example of FIG. 6B, the interpolation device 30B also includes controller 918 which may control the functions of interpolation device 30B. While shown as part of interpolation device 30, in some examples, controller 918 may be located elsewhere in audio playback system 16D. In some examples, any of low-delay decoder 900A, audio decoder 900B, local audio buffer 902, buffer 910, audio object renderer 912, 3DOF audio renderer 914, 6DOF audio renderer 22B, binauralizer 916 and interpolation device 30B may be implemented in one or more processors.

Figure 6C:
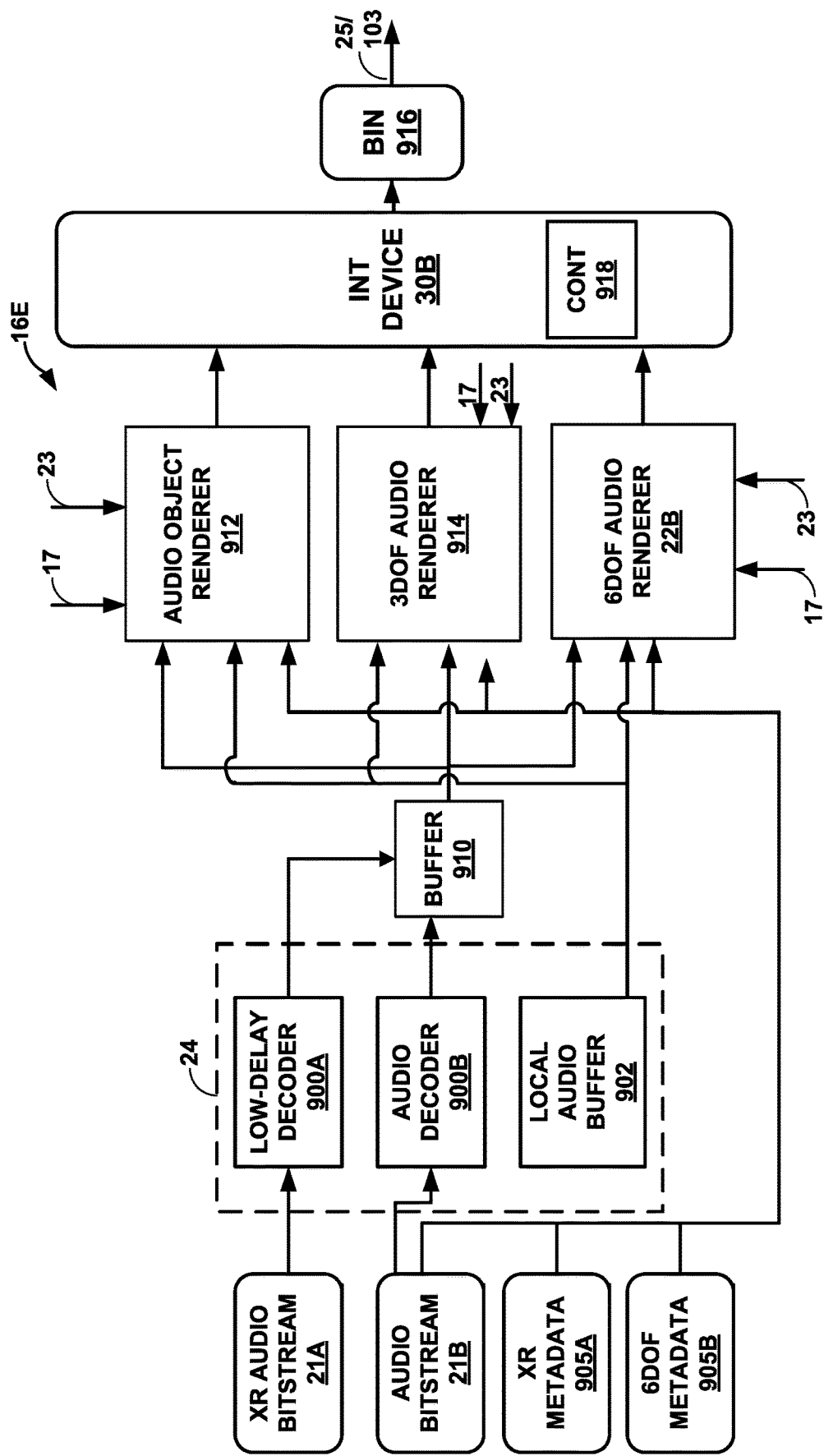

FIG. 6C is a block diagram of the audio playback system shown in the examples of FIGS. 1A and 1B in performing various aspects of the techniques described in this disclosure. The example audio playback system 16E of FIG. 6C is similar to audio playback system 16D of FIG. 6B, however rather than audio object renderer 912, 3DOF audio renderer 914 or 6DOF audio renderer 22A sending their output to binauralizer 916, audio object renderer 912, 3DOF audio renderer 914 or 6DOF audio renderer 22A send their output to interpolation device 30B which in turn sends an output to binauralizer 916. In some examples, each of audio object renderer 912, 3DOF audio renderer 914, and 6DOF audio renderer 22B may output ambisonics. In the example of FIG. 6C, interpolation device 30B may interpolate ambisonic coefficients from two or more of audio object renderer 912, 3DOF audio renderer 914, or 6DOF audio renderer 22B. In the example of FIG. 6C, the interpolation device 30B also includes controller 918 which may control the functions of interpolation device 30B. While shown as part of interpolation device 30B, in some examples, controller 918 may be located elsewhere in audio playback system 16E. In some examples, any of low-delay decoder 900A, audio decoder 900B, local audio buffer 902, buffer 910, audio object renderer 912, 3DOF audio renderer 914, 6DOF audio renderer 22B, binauralizer 916 and interpolation device 30B may be implemented in one or more processors.

Figure 6D:
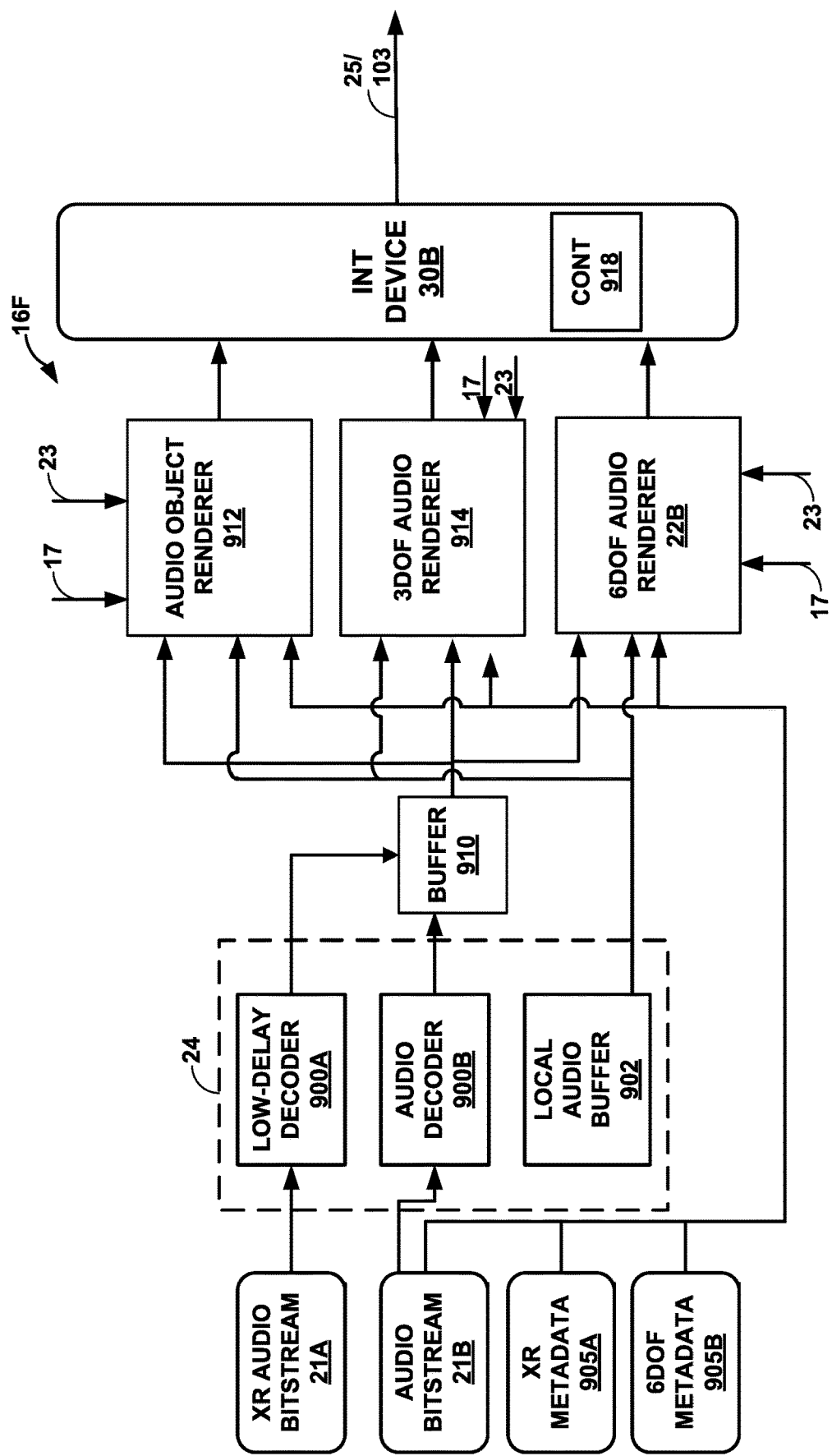

FIG. 6D is a block diagram of the audio playback system shown in the examples of FIGS. 1A and 1B in performing various aspects of the techniques described in this disclosure. The example audio playback system 16F of FIG. 6D is similar to audio playback system 16E of FIG. 6C, however audio playback system 16F does not include binauralizer 916. In some examples, each of audio object renderer 912, 3DOF audio renderer 914, and 6DOF audio renderer 22B may output ambisonics. In the example of FIG. 6D, interpolation device 30B may interpolate ambisonic coefficients from two or more of audio object renderer 912, 3DOF audio renderer 914, or 6DOF audio renderer 22B or interpolate binauralized audio from audio object renderer 912, 3DOF audio renderer 914 and/or 6DOF audio renderer 22B. In the example of FIG. 6D, the interpolation device 30B also includes controller 918 which may control the functions of interpolation device 30B. While shown as part of interpolation device 30, in some examples, controller 918 may be located elsewhere in audio playback system 16F. In some examples, any of low-delay decoder 900A, audio decoder 900B, local audio buffer 902, buffer 910, audio object renderer 912, 3DOF audio renderer 914, 6DOF audio renderer 22B, binauralizer 916 and interpolation device 30B may be implemented in one or more processors.

Figure 6E:
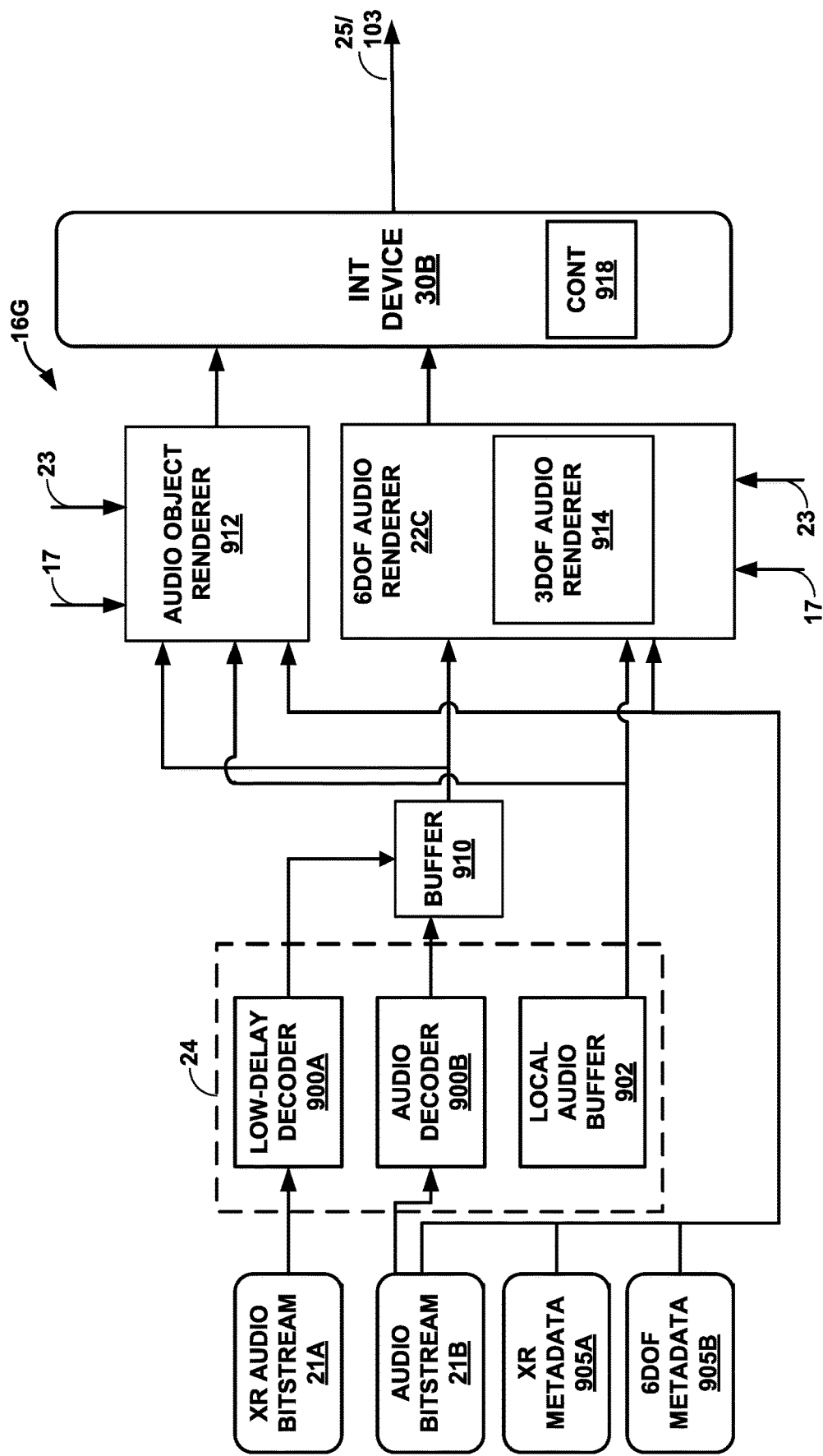

FIG. 6E is a block diagram of the audio playback system shown in the examples of FIGS. 1A and 1B in performing various aspects of the techniques described in this disclosure. The example audio playback system 16G of FIG. 6E is similar to audio playback system 16F of FIG. 6D, however 3DOF audio renderer 914 is part of 6DOF audio renderer 22C, rather than a separate device. In some examples, each of audio object renderer 912, 3DOF audio renderer 914, and 6DOF audio renderer 22C may output ambisonics. In the example of FIG. 6E, interpolation device 30B may interpolate ambisonic coefficients from two or more of audio object renderer 912, 3DOF audio renderer 914, or 6DOF audio renderer 22B or interpolate binauralized audio from audio object renderer 912, 3DOF audio renderer 914 and/or 6DOF audio renderer 22B. In the example of FIG. 6E, the interpolation device 30B also includes controller 918 which may control the functions of interpolation device 30B. While shown as part of interpolation device 30B, in some examples, controller 918 may be located elsewhere in audio playback system 16G. In some examples, any of low-delay decoder 900A, audio decoder 900B, local audio buffer 902, buffer 910, audio object renderer 912, 6DOF audio renderer 22C, and interpolation device 30B may be implemented in one or more processors.

Figure 6F:
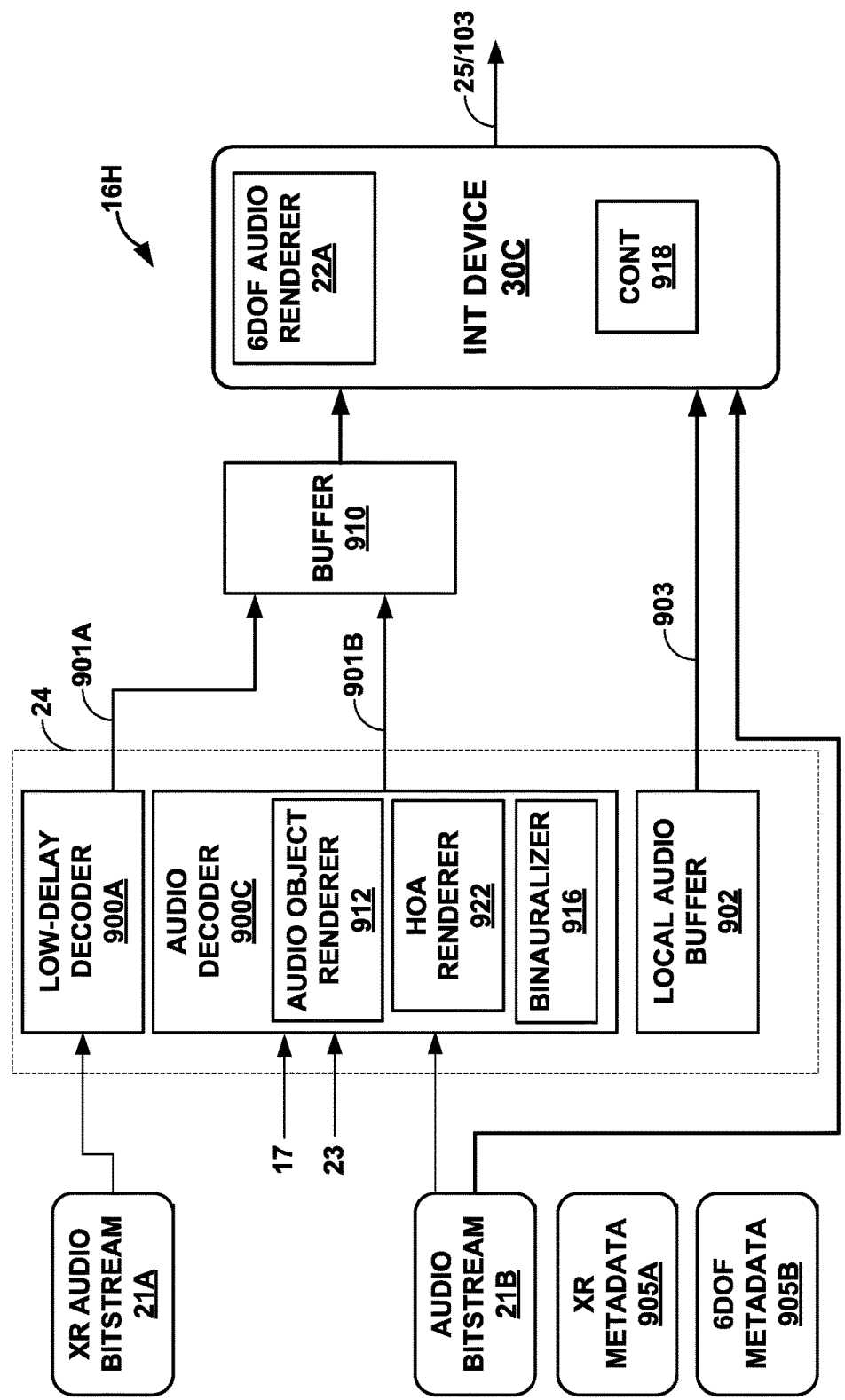

FIG. 6F is a block diagram of the audio playback system shown in the examples of FIGS. 1A and 1B in performing various aspects of the techniques described in this disclosure. The example audio playback system 16H of FIG. 6F is similar to audio playback system 16C of FIG. 6A, however audio decoder 900C includes audio object renderer 912, higher order ambisonic (HOA) renderer 922 and binauralizer 916 and interpolation device 30C is a separate device and includes controller 918 and 6DOF audio renderer 22A. As referred to herein, HOA may include ambisonics of order greater than 1. In the example of FIG. 6F, interpolation device 30C may interpolate ambisonic coefficients from two or more sources in buffer 910 or interpolate binauralized audio from binauralizer 916. In the example of FIG. 6F, the interpolation device 30C also includes controller 918 which may control the functions of interpolation device 30C. While shown as part of interpolation device 30C, in some examples, controller 918 may be located elsewhere in audio playback system 16H. While several examples of an audio playback system have been set forth in FIGS. 6A-6F, other examples, including other combinations of the various elements of FIGS. 6A-6F, may fall within the scope of this disclosure. In some examples, any of low-delay decoder 900A, audio decoder 900C, local audio buffer 902, buffer 910, and interpolation device 30B may be implemented in one or more processors.

Figure 6G:
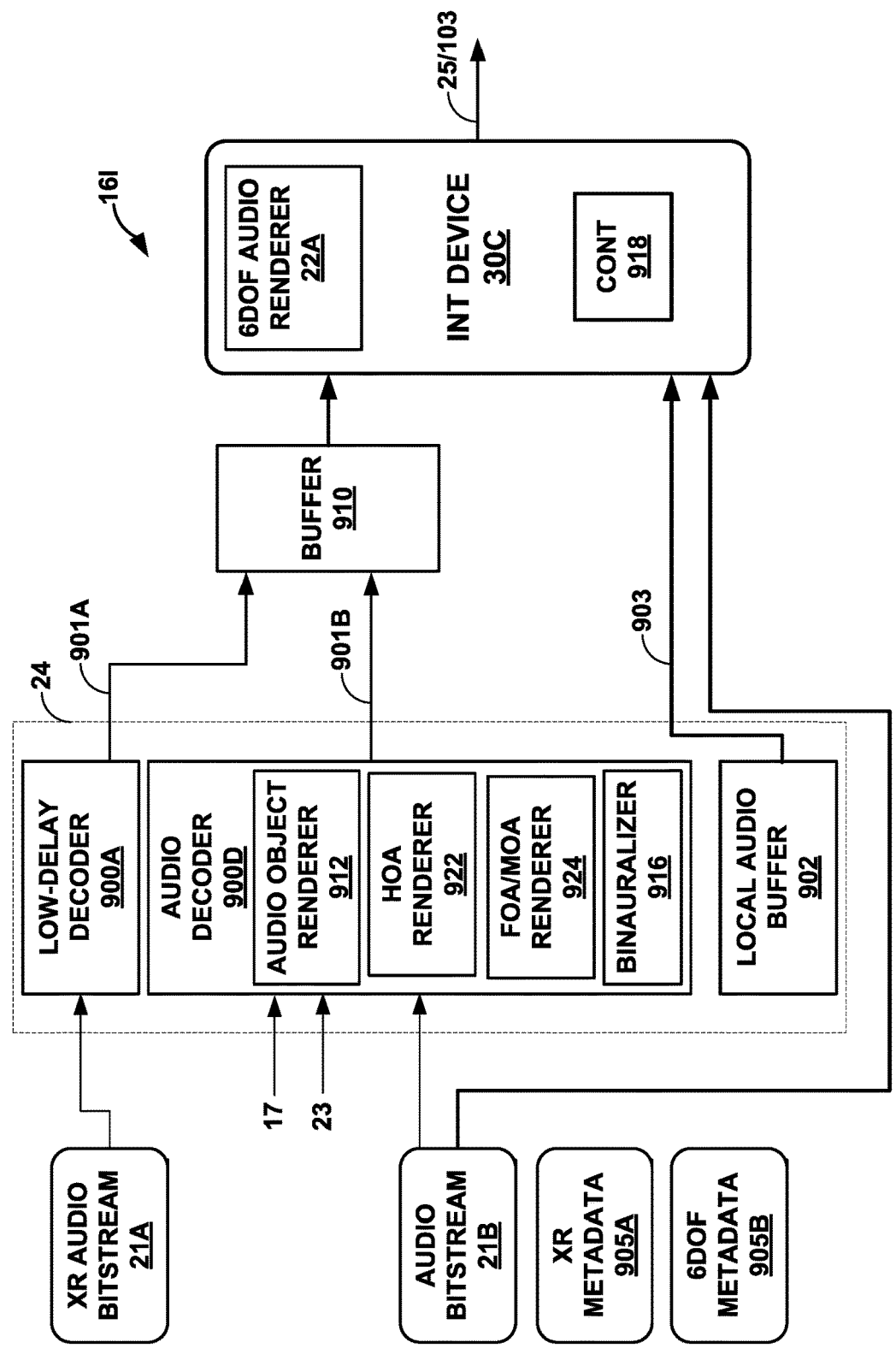

FIG. 6G is a block diagram of the audio playback system shown in the examples of FIGS. 1A and 1B in performing various aspects of the techniques described in this disclosure. The example audio playback system 16I of FIG. 6G is similar to audio playback system 16H of FIG. 6F, however audio decoder 900D includes FOA/MOA renderer 924. FOA/MOA renderer 924 may be an FOA renderer and/or an MOA renderer. In the example of FIG. 6G, interpolation device 30C may interpolate ambisonic coefficients from two or more sources in buffer 910 (e.g., an $4^{th}$ order ambisonic signal from HOA renderer 922 and a 1st order ambisonic signal from FOA/MOA renderer 924) or interpolate binauralized audio from binauralizer 916. In the example of FIG. 6G, the interpolation device 30C also includes controller 918 which may control the functions of interpolation device 30C. While shown as part of interpolation device 30C, in some examples, controller 918 may be located elsewhere in audio playback system 16I. While several examples of an audio playback system have been set forth in FIGS. 6A-6G, other examples, including other combinations of the various elements of FIGS. 6A-6G or the lack of various elements of FIGS. 6A-6G, may fall within the scope of this disclosure. In some examples, any of low-delay decoder 900A, audio decoder 900C, local audio buffer 902, buffer 910, and interpolation device 30B may be implemented in one or more processors.

HOA signals are currently utilized in 6DoF scenes for playback of ambience sound sources. The origin of the sound sources demarcate the spatial extent (also referred to herein as a boundary or an extent) of the HOA signal. Legacy HOA rendering is no longer valid when the listener moves beyond the spatial extent.

This disclosure describes a transition between HOA rendering inside the spatial extent and object-based rendering outside of the extent. In the EIF (N19211, MPEG-I 6DoF Audio Encoder Input Format, Online, 2020 (hereinafter N19211)), an HOA source declares a sound emitting source, using a higher-order ambisonics signal, with both orientation and position. Most, if not all, HOA renderers do not use the position of the HOA source for rendering. Therefore, it was unclear in the EIF how an HOA source would be defined to render an HOA signal such a 3DoF manner. In addition, it may be desirable to render an HOA signal in 3DoF within an extent and 6DoF outside of the extent. To enable this case and clarify legacy HOA rendering, a new attribute may be introduced to the HOA source definition for use as a flag indicative of a complexity of an audio signal to be rendered, such as an indication of 3DoF or 6DoF rendering of an HOA signal.

A shown in Table 1, the attribute is 6DoF may be introduced to indicate to an audio playback system, such as audio playback system 16E of FIG. 6C, to switch between 3DoF and 6DoF rendering of an HOA signal. In this example, the default value is "false" which means that audio playback system 16E should render the HOA signal using a traditional 3DoF HOA rendering (as in the MPEG-H decoder) in which only the listener's orientation is used, and position is disregarded. For example, audio playback system 16E may obtain, from a bitstream representative of the audio data (e.g., bitstream 27), an indication of a complexity of the current renderer (e.g., is6DoF). Audio playback system 16E may obtain the current renderer based on the boundary, the listener location, and the indication of the complexity. In the example where the indication of complexity is false, then audio playback system 16E may render the HOA signal inside the boundary (also referred to herein as the extent) and the renderer is free to choose how to render the signal outside of the extent.

When is6DoF is set to "true", then audio playback system 16E may render the HOA signal in 6DoF within the extent. If no extent is defined, then audio playback system 16E may render the HOA signal in 6DoF everywhere in the scene. Setting is6DoF to "true" also enables the group and refDistance attributes which are disregarded otherwise.

The extentTransform and transitionDistance attributes are dependent on the extent of the HOA source. Text denoting the dependency is added below in the description of those attributes for clarity in Table 1. Table 2 provides a summary of behaviors with different combinations of is6DoF and extent attributes. Table 3 provides a summary of behaviors with different combinations of extents and extent attributes. For example, audio playback system 16A may render audio signals based on the behaviors set forth in Tables 1-3.

Additions to the HOASource definition table in N19211 are shown below between <ADD> and </ADD>. It should be noted that the references to FIGS. in Table 1 are references to FIGS. in N19211 and not references to FIGS. of this disclosure.

TABLE 1

| <HOASource> |
| --- |
| Declares a source which emits sound into the virtual scene, that is described by higher-order Ambisonics (HOA). The HOASource has a position/orientation in space.<br>The HOASource can describe an incoming soundfield or an outgoing soundfield, as denoted by the representation attribute. An internal representation (representation = 0) describes a sound field resulting from sources located outside the spatial sampling area (see FIG. 7a). An external representation (representation = 1) describes a sound field resulting from sources located inside the spatial sampling area (see FIG. 7b). Thespatial sampling area is defined by the extent attribute. |

TABLE 1-continued

For an internal HOASource it is expected that the source is also rendered outside its extent and for an external source it is expected that the source is also rendered inside its extent. If such behavior is not desired, this is signaled through the extentTransform attribute. The transitionDistance attribute determines the area in which the listener transitions between external and internal representation.

| Attribute | Type | Flags | Default | Description |
|---|---|---|---|---|
| Id | ID | R | | Identifier |
| Position | Position | R, M | | Position |
| Orientation | Rotation | O, M | (0° 0° 0°) | Orientation |
| Cspace | Coordinate space | O, M | relative | Spatial frame of reference |
| Active | Boolean | O, M | true | If true, then render this source |
| GainDb | Gain | O, M | 0 | Gain (dB) |
| Signal | AudioStream ID | R, M | | Audio stream |
| Aparams | Authoring parameters | O | none | Authoring parameters (see 4.12) |
| Mode | Playback mode | O | continuous | Playback mode {"continuous", "event"} |
| Play | Boolean | O, M | False | Playback enabled? |
| Extent | Geometry ID | O, M | none | Region of validity, spatial extent |
| extentTransform | Boolean | O | True | <ADD> When an extent is defined, turns </ADD> on/off the external rendering of an interior source or the internal rendering of an exterior source. |
| transitionDistance | Value | O | 0 | <ADD> When an extent is defined, </ADD> determines the distance buffer between external and internal representation (m) (see FIG. 8). |
| representation | Integer | R | | Interior or exterior HOA expansion 0 = interior, 1 = exterior |
| <ADD> | <ADD> | <ADD> | <ADD> | <ADD> Enables the following attributes when True: group </ADD> |
| is6DoF | Boolean | O, M | False | |
| </ADD> | </ADD> | </ADD> | </ADD> | |
| Group | ID | O, M | none | Parent HOAGroup |
| RefDistance | Float >= 0 | O | Dependent on Representation attribute | Reference distance (m) (see comment below should add section #) Clarify these implicit assumptions: Internal: center of extent External: relative to the boundary of extent? |

TABLE 2

| is6DoF | extent | extentTransform | HOA Rendering |
|---|---|---|---|
| False | None | N/A | 3DoF anywhere in the scene |
| False | Defined | True | 3DoF inside the extent and renderer dependent outside the extent |
| False | Defined | False | 3DoF inside the extent and no rendering outside the extent |
| True | None | N/A | 6DoF everywhere in the scene |
| True | Defined | True | 6DoF inside the extent and renderer dependent outside the extent |
| True | Defined | False | 6DoF inside the extent and no rendering outside the extent |

TABLE 3

| extent | extentTransform | transitionDistance | HOA Rendering |
|---|---|---|---|
| None | N/A | N/A | 3DoF anywhere in the scene |
| Defined | True | 0 | 3DoF inside the extent and object rendering outside the extent |
| Defined | True | >0 | 3DoF HOA rendering inside the extent, crossfade to object outside the extent |
| Defined | False | N/A | 3DoF HOA inside the extent and no rendeing outside the extent |

TABLE 3-continued

| extent | extentTransform | transitionDistance | HOA Rendering |
|---|---|---|---|
| None | N/A | N/A | 6DoF HOA rendering everywhere in the scene |
| Defined | True | 0 or >0 | 6DoF HOA rendering inside the extent and 6DoF HOA rendering outside the extent |
| Defined | False | N/A | 6DoF HOA rendering inside the extent and no rendering outside the extent |

An example of legacy HOA sources rendered in 3DOF follows. In this example, the HOA signal includes premixed ambience content. With is6DoF set to "False", it is assumed that the origins of the sounds in the HOA signal are sufficiently far away (or intangible like the wind) such that only 3DoF rendering is required. Note that cspace is "relative" so that the HOA rendering is fixed to the scene.

```
<AudioStream id="signal:ambienceHOA"
        aepInputChannels="1:16"
        file="ambienceHOA.wav"/>
<HOASource id="src:ambience"
        signal="signal:ambienceHOA"
        position="0, 0, 0"
        orientation="30, 0, 0"
        cspace="relative"
        mode="continuous"
        play="true"
        representation="0"
        is6DoF="False"/>
```

If the HOA signal is music content to be used as background music following the listener, then cspace would be set to "user". In this case the HOA source's orientation is always aligned with the listener.

```
<AudioStream id="signal:musicHOA"
        aepInputChannels="1:16"
        file="musicHOA.wav"/>
<HOASource id="src:backgroundmusic"
        signal="signal:musicHOA"
        orientation="0, 0, 0"
        cspace="user"
        mode="continuous"
        play="true"
        representation="0"
        is6DoF="false"/>
```

An example of 3DOF HOA with an extent follows. In this example the listener can explore the inside and outside of an aviary. The HOASource includes an HOA signal with bird sounds and an extent with the same geometry as that of the aviary. The HOASource will be rendered as a legacy 3DoF HOA signal when the listener is inside the aviary. It will be up to the renderer to transition from 3DoF to an unspecified rendering as the listener travels the 2 meters of transitionDistance beyond the extent. When the listener is outside the aviary (outside the extent), it is expected that the listener hears the bird sounds as originating from inside the aviary.

```
<AudioStream id="signal:aviaryHOA"
        aepInputChannels="1:16"
        file="aviaryHOA.wav"/>
<HOASource id="src:aviary"
        signal="signal:aviaryHOA"
        orientation="30, 0, 0"
        position="0, 0, 0"
        cspace="relative"
```

-continued

```
        mode="continuous"
        play="true"
        extent="geom:aviary_extent"
        extentTransform="True"
        transitionDistance="2"
        representation="0"
        is6DoF="False"/>
```

With the addition of the is6DoF attribute to HOASource, HOA content can be clearly specified to be rendered as a legacy 3DoF HOA source or as a 6DoF source. The examples provided also show how 3DoF HOA can be rendered with and without an extent.

For purposes of discussion with respect to the remaining FIGS, any of source devices 12A (FIGS. 1A-1B) or 12B (FIGS. 5A-5B) may be referred to as source device 12, any of content consumer devices 14A (FIGS. 1A and 5A) or 14B (FIGS. 1B and 5B) may be referred to as content consumer device 14, and any of audio playback systems 16A (FIGS. 1A and 5A), 16B (FIGS. 1B and 5B), 16C (FIG. 6A), 16D (FIG. 6B), 16E (FIG. 6C), 16F (FIG. 6D), 16G (FIG. 6E), or 16H (FIG. 6F) may be referred to as audio playback system 16.

Figure 7:
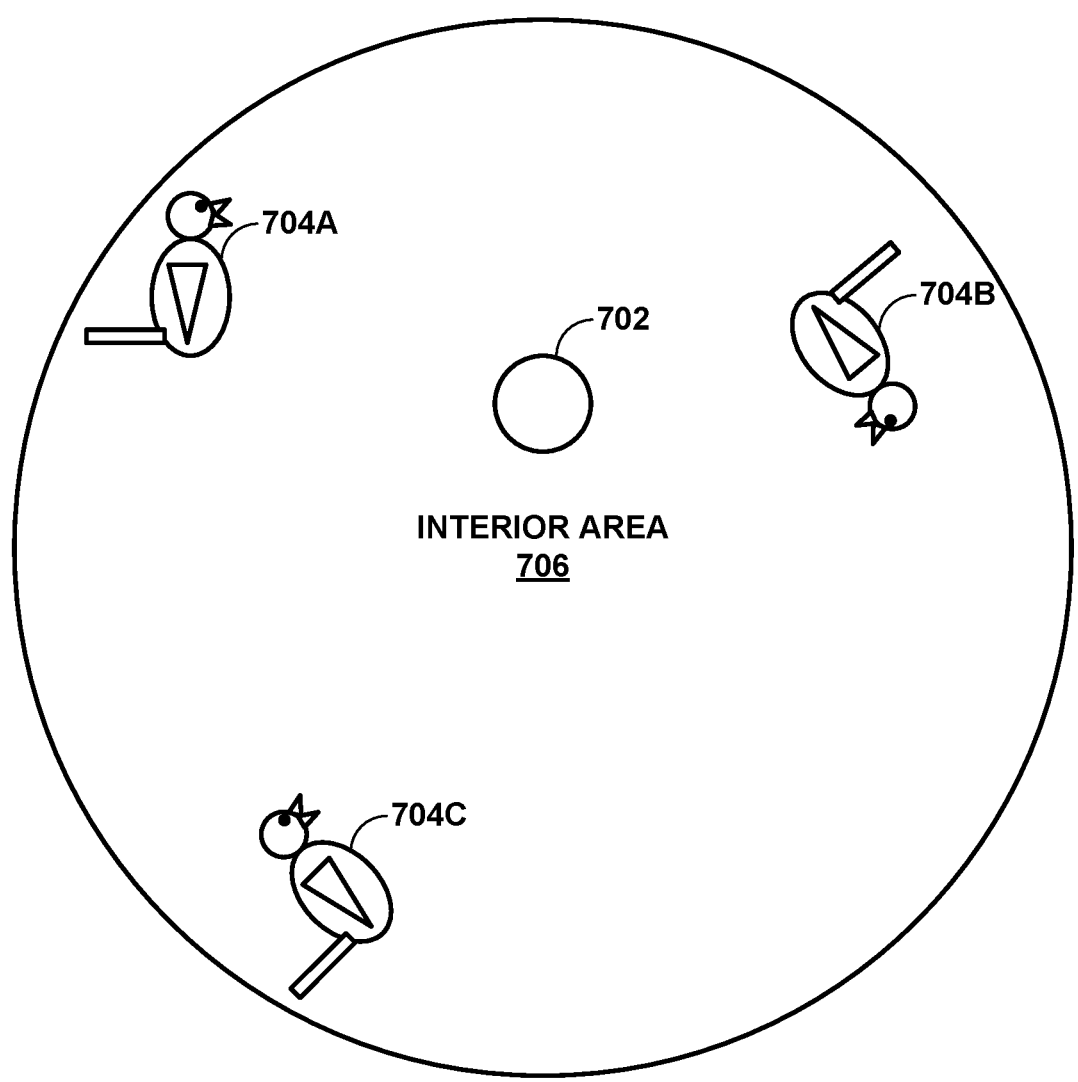
FIG. 7 is a diagram illustrating an example of rendering for an extended reality (XR) scene in accordance with various aspects of the techniques described in this disclosure.

FIG. 7 is a diagram illustrating an example of rendering for an extended reality (XR) scene in accordance with various aspects of the techniques described in this disclosure. In this example, internal area 706 represents the aviary. For example, HOA content may be recorded using microphones on a wearable device (or other source device, such as source device 12) by a person in the aviary, such as within interior area 706. There may be birds 704A-704C inside the aviary which the person hears as coming from all around them. Another person (the "listener"), for example, wants to listen to the content captured by the person in the aviary. The listener 702 may receive the HOA stream and has a wearable device with a 3DoF HOA renderer, such as audio playback system 16. In this example, listener 702 hears the 3DoF HOA rendering when they are inside the boundary defining interior area 706 (also referred to herein as a spatial extent or an extent). In this case the spatial extent may be defined by a sphere, but the spatial extent may be of any three-dimensional shape.

Figure 8:
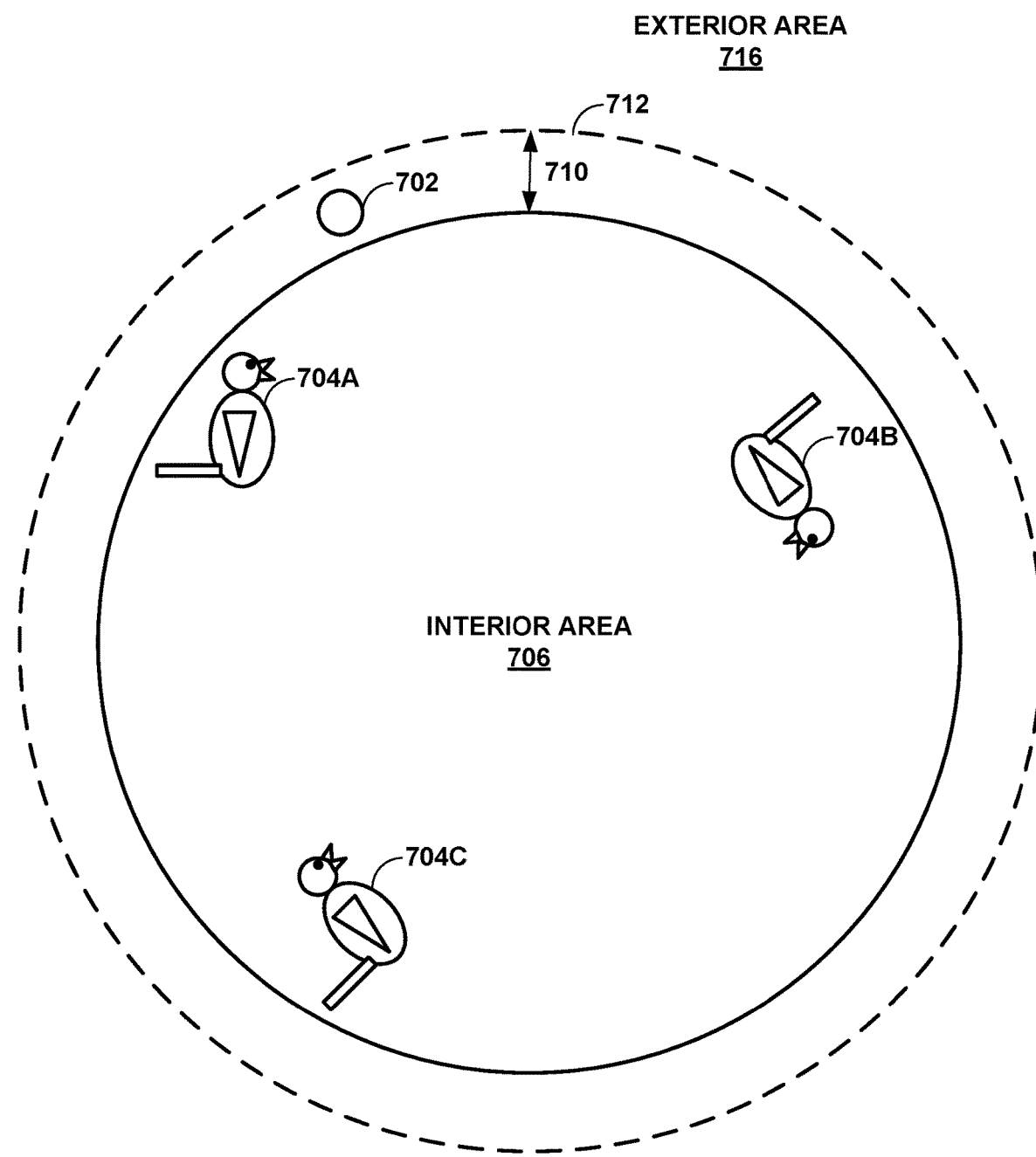
FIG. 8 is a diagram illustrating another example of rendering for an extended reality (XR) scene in accordance with various aspects of the techniques described in this disclosure.

FIG. 8 is a diagram illustrating another example of rendering for an extended reality (XR) scene in accordance with various aspects of the techniques described in this disclosure. If a transition distance 710 is defined, then there is an enveloping sphere 712 (or other three-dimensional shape) which encompasses the spatial extent or interior area 706. When listener 702 is within the transition zone defined by the border of the interior area 706 (e.g., the spatial extent) and the transition distance 710, an audio playback system (such as audio playback system 16) may interpolate or crossfade between the interior renderer (e.g., 3DoF audio renderer 914 or 6DoF audio renderer 22A) and the exterior renderer (e.g., object-based audio renderer 912) or may interpolate or crossfade between different order ambisonics (e.g., using HOA renderer 922) as discussed above with respect to FIG. 3. In some examples, the transition distance 710 may be a configurable threshold or may be defined as small value relative to the exterior area 716 or the interior area 706, such as 20% of percentage of the distance to the center of interior area 706.

Figure 9:
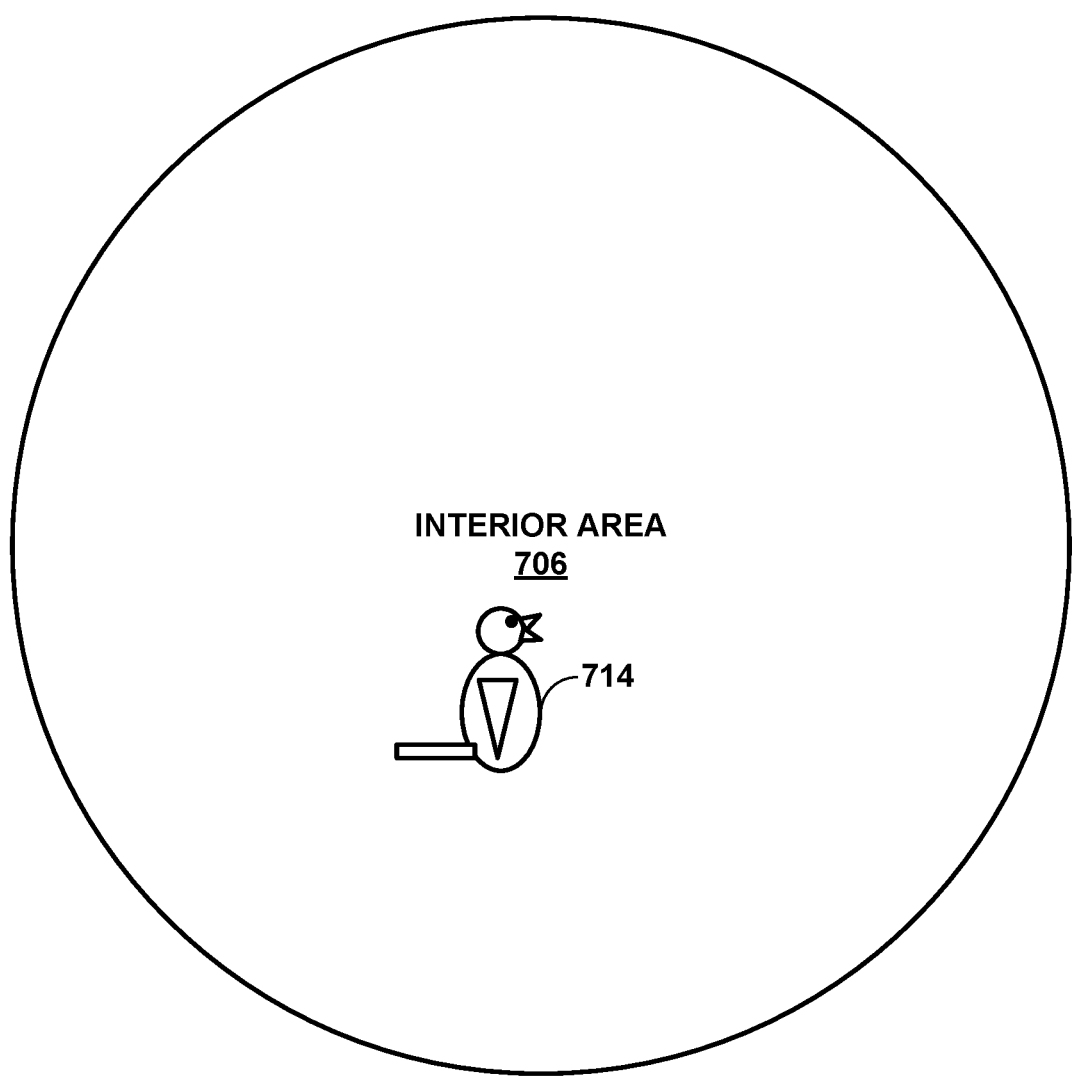
FIG. 9 is a diagram illustrating another example of rendering for an extended reality (XR) scene in accordance with various aspects of the techniques described in this disclosure.

FIG. 9 is a diagram illustrating another example of rendering for an extended reality (XR) scene in accordance with various aspects of the techniques described in this disclosure. In some examples, there may be two options for object-based rendering of an HOA signal which may occur when listener 702 is outside the spatial extent (e.g., interior area 706). In one option, audio playback system 16 may take the first HOA channel of the HOA signal and use this as the audio for the object rendering via audio object renderer 912. In the case where the HOA signal includes a defined position, audio playback system 16 may use that particular position as the audio object's position, for example, the bird at position 714. In the case where the HOA signal does not include a defined position, audio playback system 16 may calculate the geometric center of the spatial extent (e.g., interior area 706) and use the geometric center as the audio object's position.

Figure 10:
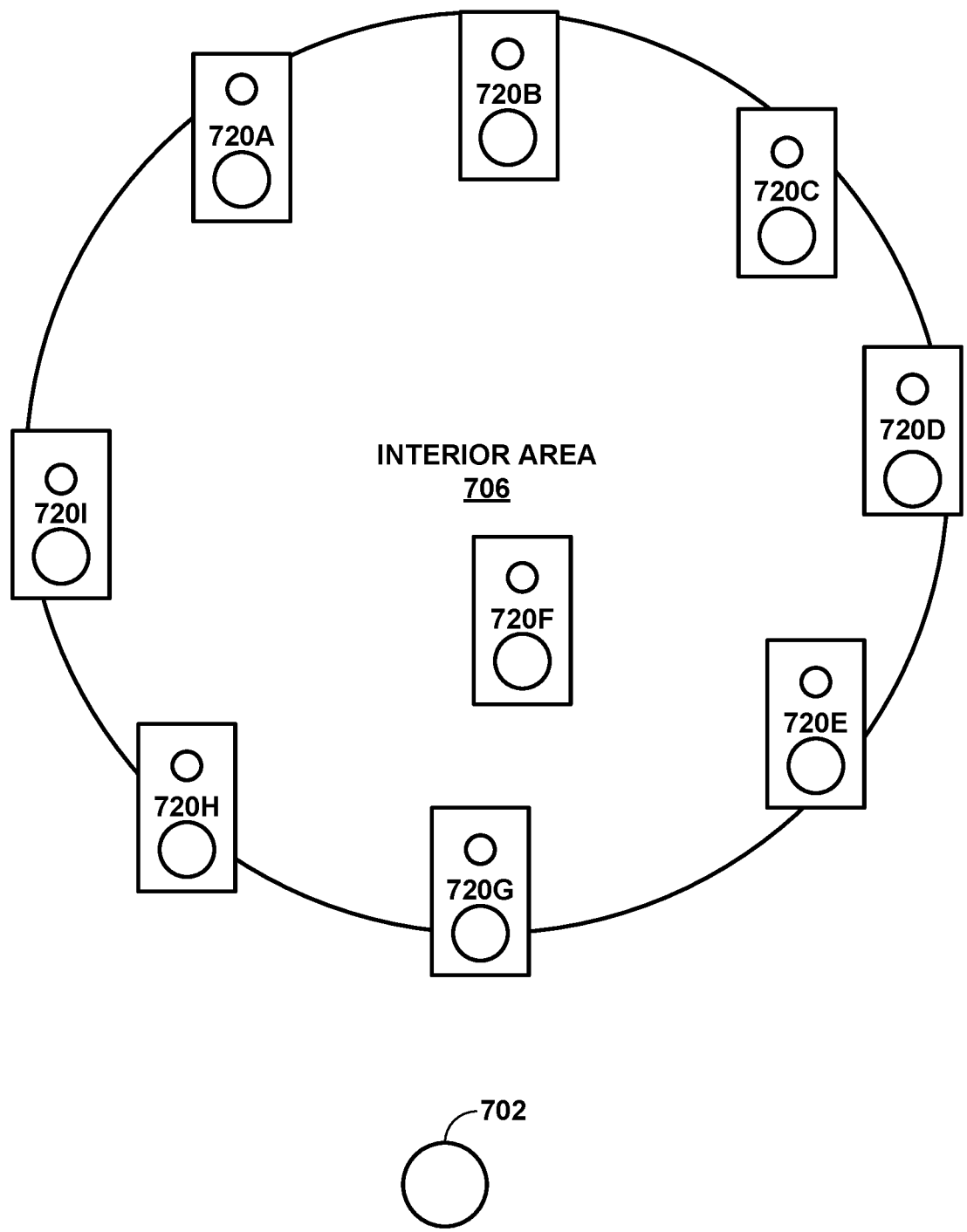
FIG. 10 is a diagram illustrating another example of rendering for an extended reality (XR) scene in accordance with various aspects of the techniques described in this disclosure.

FIG. 10 is a diagram illustrating another example of rendering for an extended reality (XR) scene in accordance with various aspects of the techniques described in this disclosure. In this example, audio playback system 16 may render the HOA signal into virtual loudspeakers 720A-720I which may be located at points around the sphere (or other three-dimensional shape represented by the spatial extent (e.g., interior area 706). Audio playback system 16 may use these virtual loudspeakers 720A-720I as multiple objects which audio object renderer 912 may render. In some examples, the HOA rendering to virtual loudspeakers may be pre-rendered and encoded, for example, by source device 12, to facilitate object rendering. For example, if listener 702 is outside the extent, only the virtual loudspeakers may be transmitted. This may reduce the need for bother HOA rendering and object rendering when the listener is outside the extent.

Figure 11:
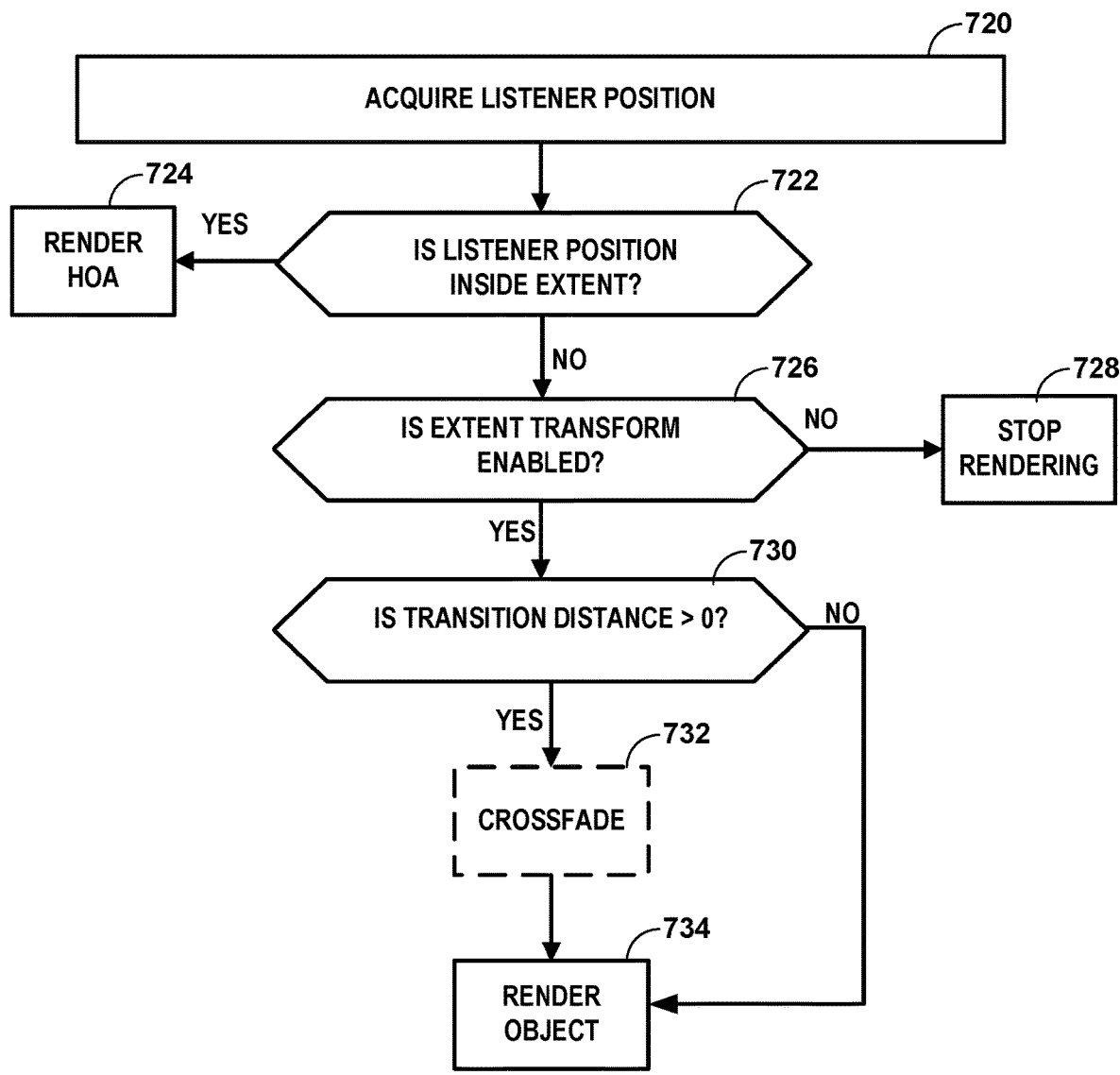
FIG. 11 is a flowchart of example rendering techniques according to this disclosure.

FIG. 11 is a flowchart of example rendering techniques according to this disclosure. Audio playback system 16 may acquire a listener location (720). For example, audio playback system 16 may receive listener location 17 such as through tracking device 306. Audio playback system 16 may determine whether listener location 17 is inside the extent, such as interior area 706 (722). If listener location 17 is inside the extent (the "YES" path from box 722), audio playback system 16 may render the HOA in 3DoF or 6DoF, such as through 3DoF renderer 914 or 6DoF renderer 22A (724). In some example, whether audio playback system 16 renders in 3DoF or 6DoF may be based on an indication of the complexity of the rendering, such as a 6DoF flag.

If listener location 17 is not inside the extent (the "NO" path from box 722), audio playback system 16 may determine whether extent transform is enabled (726). For example, audio playback system 16 may parse a flag in bitstream 27 to determine whether extent transform is enabled. If extent transform is not enabled (the "NO" path from box 726), audio playback system 16 may stop rendering (728). For example, audio playback system 16 may obtain as the exterior renderer no renderer at all. If extent transform is enabled (the "YES" path from box 726), audio playback system 16 may determine if the transition distance is greater than zero (730). For example, audio playback system 16 may determine a value of transition distance in bitstream 27. If the transition distance is greater than zero (the "YES" path from box 730), audio playback system 16 may, optionally, crossfade the interior renderer and the exterior renderer (if listener location 17 is within the transition distance from the extent) (732). As the crossfading is optional, the box is shown with dashed lines. For example, audio playback system 16 may render both an object, such as through the techniques of FIG. 9 or 10, and HOA, as in box 724, and interpolate or crossfade the rendered signals as in the example of FIG. 3. In some examples, audio playback system 16 may render multiple ambisonics orders (e.g., using HOA renderer 724) and interpolate or crossfade between different ambisonics orders. For example, an updated current renderer of audio playback system 16 may crossfade between different ambisonic orders of the exterior renderer and the interior renderer. In some examples, the updated current renderer crossfades from a higher ambisonic order to a lower ambisonic order as a listener location moves from the interior area through the transition zone towards the exterior area. If the transition distance is zero (the "NO" path from box 730) (or if listener location 17 is outside of the transition distance from the extent), audio playback system 16 may render the object (734), such as through the techniques of FIG. 9 or 10.

Figure 12:
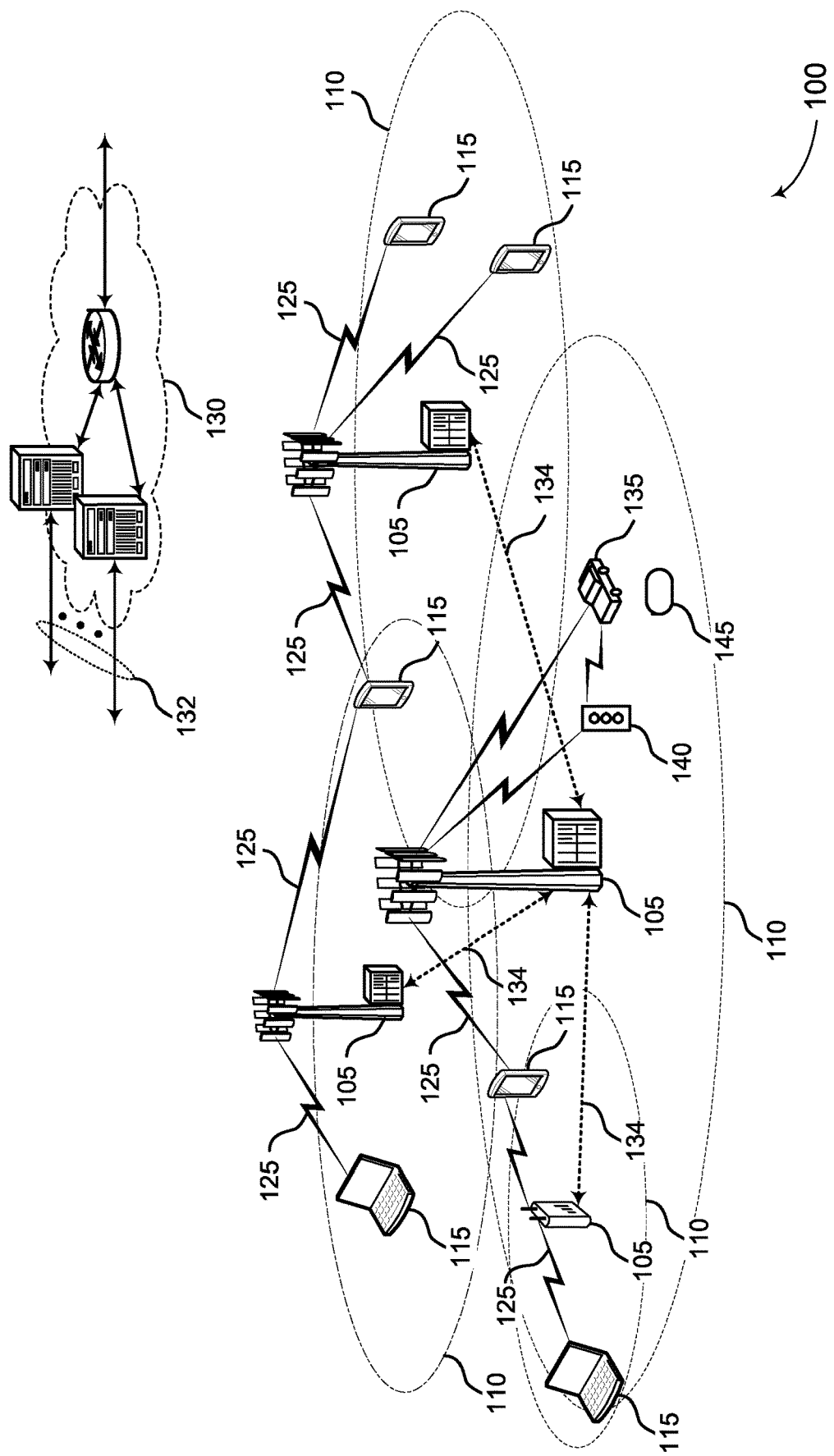
FIG. 12 illustrates an example of a wireless communications system that supports audio streaming in accordance with aspects of the present disclosure.

FIG. 12 illustrates an example of a wireless communications system 100 that supports audio streaming in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio metadata indicating privacy restrictions and/or password-based privacy data to toggle, mask, and/or null various audio streams and/or audio sources as will be described in more detail below.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Figure 13:
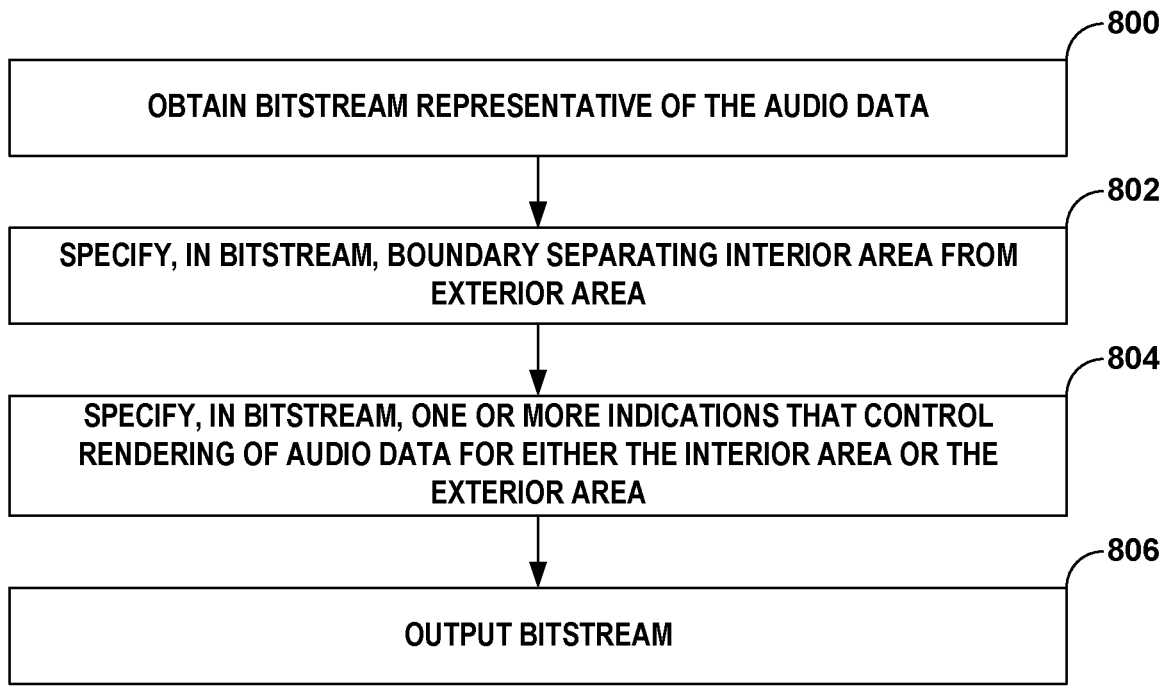
FIG. 13 is a flowchart illustrating example operation of the source device shown in FIG. 1A in performing various aspects of the techniques described in this disclosure.

FIG. 13 is a flowchart illustrating example operation of the source device shown in FIG. 1A in performing various aspects of the techniques described in this disclosure. The source device 12 may obtain bitstream 21 representative of scene-based audio data 11 (800) in the manner described above. The soundfield representation generator 302 of the source device 12 may specify, in the bitstream 21, a boundary separating the interior area from the exterior area (802).

The soundfield representation generator 302 may, as noted above, also specify the one or more indications 31 that control rendering of the ambisonic coefficients 11 for either the interior area and the exterior area (804). The soundfield representation generator 302 may output the bitstream 21 for delivery (either in near-real time via network streaming, etc. or for later delivery as noted above) (806).

Figure 14:
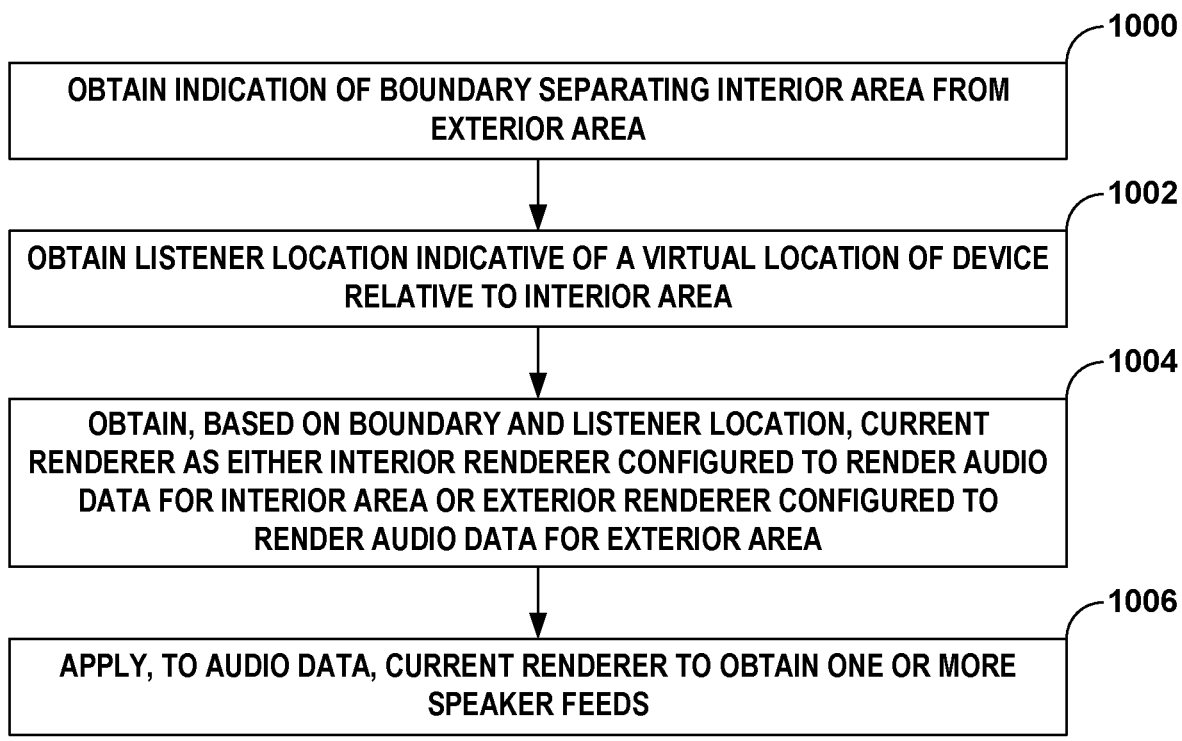
FIG. 14 is a flowchart illustrating example operation of the content consumer device shown in FIG. 1A in performing various aspects of the techniques described in this disclosure.

FIG. 14 is a flowchart illustrating example operation of the content consumer device shown in FIG. 1A in performing various aspects of the techniques described in this disclosure. The audio playback system 16 may obtain the bitstream 21 and invoke the audio decoding device 24 to decompress the bitstream to obtain the ambisonic audio coefficients 11' along with parsing the indications 31 from the bitstream 21. The audio decoding device 24 may output the indications 31 to the renderer generation unit 32 along with the indication of the boundary. The audio playback system 16 may also interface with the tracking device 306 to obtain the listener location 17, where the boundary, the listener location 17, and the indications 31 are provided to the renderer generation unit 32.

As such, the renderer generation unit 32 may obtain the indication of a boundary separating an interior area from an exterior area (1000). The renderer generation unit 32 may also obtain the listener location 17 indicating of a virtual location of the content consumer device 14 relative to the interior area (1002).

The renderer generation unit 32 may then obtain, based on the boundary and the listener location 17, a current renderer to be used when rendering the ambisonic audio data 15 to the one or more speaker feeds 25. The current renderer may be configured to render the ambisonic audio data 25 for the interior area (and thereby operate as an interior renderer) or configured to render the audio data for the exterior area (and thereby operate as an exterior render) (1004). The renderer generation unit 32 may output the current renderer, where the audio playback system 16 may apply, to the ambisonic audio data 15, the current renderer to obtain the speaker feeds 25 (1006).

Figure 15:
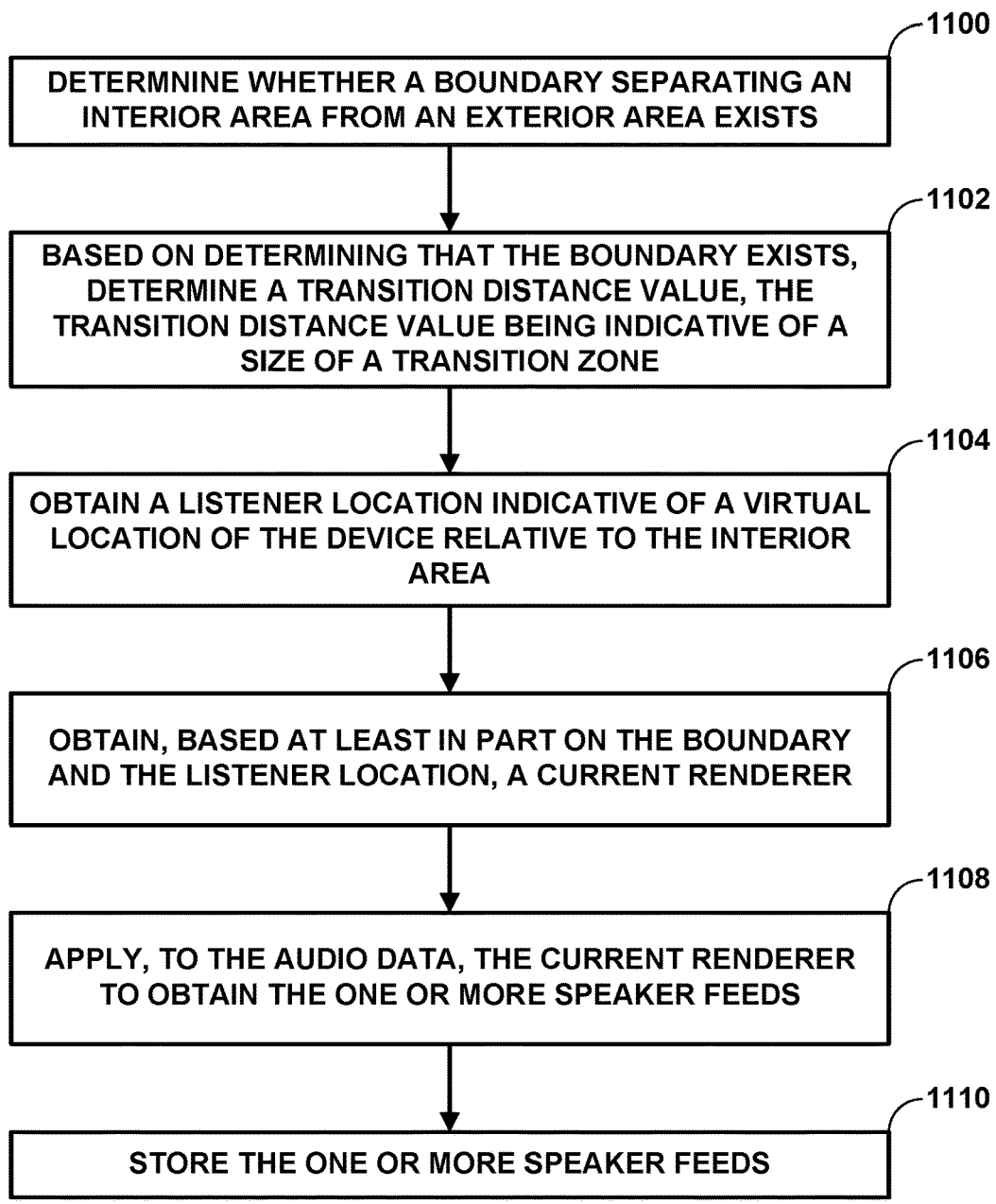
FIG. 15 is a flowchart illustrating example audio processing techniques of according to various aspects of this disclosure.

FIG. 15 is a flowchart illustrating example audio processing techniques of according to various aspects of this disclosure. The audio playback system 16 may determine whether a boundary separating an interior area from an exterior area exists (1100). For example, the audio playback system 16 may obtain an indication of a boundary separating the interior area from the exterior area from the bitstream 21. Based on determining that the boundary exists, the audio playback system 16 may determine a transition distance value, the transition distance value being indicative of a size of a transition zone (1102). For example, the audio playback system 16 may obtain an indication of the transition distance value from the bitstream 21.

The renderer generation unit 32 may obtain a listener location indicative of a virtual location of the device (e.g., content consumer device 14) relative to the interior area (1104). For example, the audio playback system 16 may interface with the tracking device 306 to obtain the listener location 17 and provide the listener location 17 to the renderer generation unit 32. The renderer generation unit 32 may obtaining, based at least in part on the boundary and the listener location, a current renderer (1106). For example, the renderer generation unit may generate the current renderer based at least in part on the boundary and the listener location. The one or more audio renderers 22 may apply, to the audio data, the current renderer to obtain one or more speaker feeds 25 (1108). For example, the one or more audio renderers 22 may apply the current renderer to the ambisonic audio data 15 to obtain the one or more speaker feeds 25. Content consumer device 14 may store the one or more speaker feeds 25 (1110). For example, content consumer device 14 may store the one or more speaker feeds 25 in memory.

In some examples, the transition distance value is 0, the current renderer includes either an interior renderer configured to render audio data for the interior area or an exterior renderer configured to render the audio data for the exterior area, and wherein the obtaining of the current render is further based on the transition distance value being 0.

In some examples, the transition distance value is greater than 0, the current renderer comprises either an interior renderer configured to render audio data for the interior area, an exterior renderer configured to render the audio data for the exterior area, or both the interior renderer and the exterior renderer, and wherein the obtaining of the current renderer is further based on the transition distance being greater than 0.

In this respect, various aspects of the techniques described in this disclosure may enable the following clauses.

Clause 1A. A device configured to process one or more audio streams, the device comprising: one or more processors configured to: obtain an indication of a boundary separating an interior area from an exterior area; obtain a listener location indicative of a location of the device relative to the interior area; obtain, based on the boundary and the listener location, a current renderer as either an interior renderer configured to render audio data for the interior area or an exterior renderer configured to render the audio data for the exterior area; apply, to the audio data, the current renderer to obtain one or more speaker feeds; and a memory coupled to the one or more processors, and configured to store the one or more speaker feeds.

Clause 2A. The device of clause 1A, wherein the one or more processors are configured to: determine a first distance between the listener location and a center of the interior area; determine a second distance between the boundary and the center of the interior area; and obtain, based on the first distance and the second distance, the current renderer.

Clause 3A. The device of any combination of clauses 1A and 2A, wherein the audio data comprises ambisonic audio data associated with a spherical basis function having an order of zero, and wherein the exterior renderer is configured to render the ambisonic audio data such that a soundfield represented by the ambisonic audio data originates from a center of the interior area.

Clause 4A. The device of any combination of clauses 1A and 2A, wherein the audio data comprises ambisonic audio data associated with a spherical basis function having an order of zero, and wherein the interior renderer is configured to render the ambisonic audio data such that a soundfield represented by the ambisonic audio data occurs throughout the interior area.

Clause 5A. The device of any combination of clauses 1A and 2A, wherein the audio data comprises ambisonic audio data representative of primary audio sources and secondary audio sources, wherein the one or more processors are further configured to obtain an indication of an opacity of the secondary audio sources, and wherein the one or more processors are configured to obtain, based on the listener location, the boundary, and the indication, the current renderer.

Clause 6A. The device of clause 5A, wherein the one or more processors are configured to obtain, from a bitstream representative of the audio data, the indication of the opacity of the secondary sources.

Clause 7A. The device of any combination of clauses 5A and 6A, wherein the one or more processors are further configured to obtain, when the indication of the opacity is enabled, and based on the listener location and the boundary, the current renderer that excludes addition of the secondary sources to which the listener location indicates as not being directly in the line of sight.

Clause 8A. The device of any combination of clauses 5A-7A, wherein the exterior renderer is configured to render the audio data such that a soundfield represented by the audio data is spread out depending on a distance between the listener location and the boundary.

Clause 9A. The device of any combination of clauses 5A-8A, wherein the one or more processors are further configured to: update, responsive to determining that the listener location is within a buffer distance from the boundary, the current renderer to interpolate between the exterior renderer and the interior renderer so as to obtain an updated current renderer; and apply, to the audio data, the current renderer to obtain one or more updated speaker feeds.

Clause 10A. The device of clause 9A, wherein the one or more processors are further configured to obtain, from a bitstream representative of the audio data, an indication of the buffer distance.

Clause 11A. The device of any combination of clauses 1A-10A, wherein the one or more processors are further configured to obtain, from a bitstream representative of the audio data, an indication of a complexity of the current renderer, and wherein the one or more processors are configured to obtain, based on the boundary, the listener location, and the indication of the complexity, the current renderer.

Clause 12A. The device of clause 11A, wherein the audio data comprises ambisonic audio data associated with a spherical basis function having an order of zero, and wherein the one or more processors are configured to obtain, when the listener location is outside of the boundary, and when the indication of the complexity indicates low complexity, the exterior renderer such that the exterior renderer is configured to render the ambisonic audio data so that a soundfield represented by the ambisonic audio data originates from a center of the interior area.

Clause 13A. The device of clause 11A, wherein the audio data comprises ambisonic audio data associated with a spherical basis function having an order of zero, and wherein the one or more processors are configured to obtain, when the listener location is outside of the boundary, and when the indication of the complexity indicates low complexity, the exterior renderer such that the exterior renderer is configured to render the audio data such that a soundfield represented by the audio data is spread out depending on a distance between the listener location and the boundary.

Clause 14A. A method of processing one or more audio streams, the method comprising: obtaining, by one or more processors, an indication of a boundary separating an interior area from an exterior area; obtaining, by the one or more processors, a listener location indicative of a location of the device relative to the interior area; obtaining, by the one or more processors, based on the boundary and the listener location, a current renderer as either an interior renderer configured to render audio data for the interior area or an exterior renderer configured to render the audio data for the exterior area; and applying, by the one or more processors, and to the audio data, the current renderer to obtain one or more speaker feeds.

Clause 15A. The method of clause 14A, wherein obtaining the current renderer comprises: determining a first distance between the listener location and a center of the interior area; determining a second distance between the boundary and the center of the interior area; and obtaining, based on the first distance and the second distance, the current renderer.

Clause 16A. The method of any combination of clauses 14A and 15A, wherein the audio data comprises ambisonic audio data associated with a spherical basis function having an order of zero, and wherein the exterior renderer is configured to render the ambisonic audio data such that a soundfield represented by the ambisonic audio data originates from a center of the interior area.

Clause 17A. The method of any combination of clauses 14A and 15A, wherein the audio data comprises ambisonic audio data associated with a spherical basis function having an order of zero, and wherein the interior renderer is configured to render the ambisonic audio data such that a soundfield represented by the ambisonic audio data occurs throughout the interior area.

Clause 18A. The method of any combination of clauses 14A and 15A, wherein the audio data comprises ambisonic audio data representative of primary audio sources and secondary audio sources, wherein the method further comprises obtaining an indication of an opacity of the secondary audio sources, and wherein obtaining the current renderer comprises obtaining, based on the listener location, the boundary, and the indication, the current renderer.

Clause 19A. The method of clause 18A, wherein obtaining the indication of the opacity comprises obtaining, from a bitstream representative of the audio data, the indication of the opacity of the secondary sources.

Clause 20A. The method of any combination of clauses 18A and 19A, further comprising obtaining, when the indication of the opacity is enabled, and based on the listener location and the boundary, the current renderer that excludes addition of the secondary sources to which the listener location indicates as not being directly in the line of sight.

Clause 21A. The method of any combination of clauses 18A-20A, wherein the exterior renderer is configured to render the audio data such that a soundfield represented by the audio data is spread out depending on a distance between the listener location and the boundary.

Clause 22A. The method of any combination of clauses 18A-21A, further comprising: updating, responsive to determining that the listener location is within a buffer distance from the boundary, the current renderer to interpolate between the exterior renderer and the interior renderer so as to obtain an updated current renderer; and applying, to the audio data, the current renderer to obtain one or more updated speaker feeds.

Clause 23A. The method of clause 22A, further comprising obtaining, from a bitstream representative of the audio data, an indication of the buffer distance.

Clause 24A. The method of any combination of clauses 14A-23A, further comprising obtaining, from a bitstream representative of the audio data, an indication of a complexity of the current renderer, and wherein obtaining the current renderer comprises obtaining, based on the boundary, the listener location, and the indication of the complexity, the current renderer.

Clause 25A. The method of clause 24A, wherein the audio data comprises ambisonic audio data associated with a spherical basis function having an order of zero, and wherein obtaining the current renderer comprises obtaining, when the listener location is outside of the boundary, and when the indication of the complexity indicates low complexity, the exterior renderer such that the exterior renderer is configured to render the ambisonic audio data so that a soundfield represented by the ambisonic audio data originates from a center of the interior area.

Clause 26A. The method of clause 24A, wherein the audio data comprises ambisonic audio data associated with a spherical basis function having an order of zero, and wherein obtaining the current renderer comprises obtaining, when the listener location is outside of the boundary, and when the indication of the complexity indicates low complexity, the exterior renderer such that the exterior renderer is configured to render the audio data such that a soundfield represented by the audio data is spread out depending on a distance between the listener location and the boundary.

Clause 27A. A device configured to process one or more audio streams, the device comprising: means for obtaining an indication of a boundary separating an interior area from an exterior area; means for obtaining a listener location indicative of a location of the device relative to the interior area; means for obtaining, based on the boundary and the listener location, a current renderer as either an interior renderer configured to render audio data for the interior area or an exterior renderer configured to render the audio data for the exterior area; and means for applying, to the audio data, the current renderer to obtain one or more speaker feeds.

Clause 28A. The device of clause 27A, wherein the means for obtaining the current renderer comprises: means for determining a first distance between the listener location and a center of the interior area; means for determining a second distance between the boundary and the center of the interior area; and means for obtaining, based on the first distance and the second distance, the current renderer.

Clause 29A. The device of any combination of clauses 27A and 28A, wherein the audio data comprises ambisonic audio data associated with a spherical basis function having an order of zero, and wherein the exterior renderer is configured to render the ambisonic audio data such that a soundfield represented by the ambisonic audio data originates from a center of the interior area.

Clause 30A. The device of any combination of clauses 27A and 28A, wherein the audio data comprises ambisonic audio data associated with a spherical basis function having an order of zero, and wherein the interior renderer is configured to render the ambisonic audio data such that a soundfield represented by the ambisonic audio data occurs throughout the interior area.

Clause 31A. The device of any combination of clauses 27A and 28A, wherein the audio data comprises ambisonic audio data representative of primary audio sources and secondary audio sources, wherein the device further comprises means for obtaining an indication of an opacity of the secondary audio sources, and wherein the means for obtaining the current renderer comprises means for obtaining, based on the listener location, the boundary, and the indication, the current renderer.

Clause 32A. The device of clause 31A, wherein the means for obtaining the indication of the opacity comprises means for obtaining, from a bitstream representative of the audio data, the indication of the opacity of the secondary sources.

Clause 33A. The device of any combination of clauses 31A and 32A, further comprising means for obtaining, when the indication of the opacity is enabled, and based on the listener location and the boundary, the current renderer that excludes addition of the secondary sources to which the listener location indicates as not being directly in the line of sight.

Clause 34A. The device of any combination of clauses 31A-33A, wherein the exterior renderer is configured to render the audio data such that a soundfield represented by the audio data is spread out depending on a distance between the listener location and the boundary.

Clause 35A. The device of any combination of clauses 31A-34A, further comprising: means for updating, responsive to determining that the listener location is within a buffer distance from the boundary, the current renderer to interpolate between the exterior renderer and the interior renderer so as to obtain an updated current renderer; and means for applying, to the audio data, the current renderer to obtain one or more updated speaker feeds.

Clause 36A. The device of clause 35A, further comprising means for obtaining, from a bitstream representative of the audio data, an indication of the buffer distance.

Clause 37A. The device of any combination of clauses 27A-36A, further comprising means for obtaining, from a bitstream representative of the audio data, an indication of a complexity of the current renderer, and wherein the means for obtaining the current renderer comprises means for obtaining, based on the boundary, the listener location, and the indication of the complexity, the current renderer.

Clause 38A. The device of clause 37A, wherein the audio data comprises ambisonic audio data associated with a spherical basis function having an order of zero, and wherein the means for obtaining the current renderer comprises means for obtaining, when the listener location is outside of the boundary, and when the indication of the complexity indicates low complexity, the exterior renderer such that the exterior renderer is configured to render the ambisonic audio data so that a soundfield represented by the ambisonic audio data originates from a center of the interior area.

Clause 39A. The device of clause 37A, wherein the audio data comprises ambisonic audio data associated with a spherical basis function having an order of zero, and wherein the means for obtaining the current renderer comprises means for obtaining, when the listener location is outside of the boundary, and when the indication of the complexity indicates low complexity, the exterior renderer such that the exterior renderer is configured to render the audio data such that a soundfield represented by the audio data is spread out depending on a distance between the listener location and the boundary.

Clause 40A. A non-transitory computer-readable storage medium having stored thereon instructions that, when executed, cause one or more processors to: obtain an indication of a boundary separating an interior area from an exterior area; obtain a listener location indicative of a location of the device relative to the interior area; obtain, based on the boundary and the listener location, a current renderer as either an interior renderer configured to render audio data for the interior area or an exterior renderer configured to render the audio data for the exterior area; and apply, to the audio data, the current renderer to obtain one or more speaker feeds.

Clause 1B. A device configured to generate a bitstream representative of audio data, the device comprising: a memory configured to store the audio data; and one or more processors coupled to the memory, and configured to: obtain, based on the audio data, the bitstream representative of the audio data; specify, in the bitstream, a boundary separating an interior area from an exterior area; specify, in the bitstream, one or more indications that control rendering of the audio data for either the interior area or the exterior area; and output the bitstream.

Clause 2B. The device of clause 1B, wherein the one or more indications include an indication indicating a complexity of the rendering.

Clause 3B. The device of clause 2B, wherein the indication indicating the complexity indicates either a low complexity or a high complexity.

Clause 4B. The device of any combination of clauses 1B-3B, wherein the one or more indications include an indication indicating opacity for rendering of secondary sources present in the audio data.

Clause 5B. The device of clause 4B, wherein the indication indicating opaqueness indicates the opacity as either opaque or not opaque.

Clause 6B. The device of any combination of clauses 1B-5B, wherein the one or more indications include an indication indicating a buffer distance around the interior area in which rendering is interpolated between interior rendering and exterior rendering.

Clause 7B. The device of any combination of clauses 1B-6B, wherein the audio data includes ambisonic audio data.

Clause 8B. A method of generating a bitstream representative of audio data, the device comprising: obtaining, based on the audio data, the bitstream representative of the audio data; specifying, in the bitstream, a boundary separating an interior area from an exterior area; specifying, in the bitstream, one or more indications that control rendering of the audio data for either the interior area or the exterior area; and outputting the bitstream.

Clause 9B. The method of clause 8B, wherein the one or more indications include an indication indicating a complexity of the rendering.

Clause 10B. The method of clause 9B, wherein the indication indicating the complexity indicates either a low complexity or a high complexity.

Clause 11B. The method of any combination of clauses 8B-10B, wherein the one or more indications include an indication indicating opacity for rendering of secondary sources present in the audio data.

Clause 12B. The method of clause 11B, wherein the indication indicating opaqueness indicates the opacity as either opaque or not opaque.

Clause 13B. The device of any combination of clauses 8B-12B, wherein the one or more indications include an indication indicating a buffer distance around the interior area in which rendering is interpolated between interior rendering and exterior rendering.

Clause 14B. The method of any combination of clauses 8B-13B, wherein the audio data includes ambisonic audio data.

Clause 15B. A device configured to generate a bitstream representative of audio data, the device comprising: means for obtaining, based on the audio data, the bitstream representative of the audio data; means for specifying, in the bitstream, a boundary separating an interior area from an exterior area; means for specifying, in the bitstream, one or more indications that control rendering of the audio data for either the interior area or the exterior area; and means for outputting the bitstream.

Clause 16B. The device of clause 15B, wherein the one or more indications include an indication indicating a complexity of the rendering.

Clause 17B. The device of clause 16B, wherein the indication indicating the complexity indicates either a low complexity or a high complexity.

Clause 18B. The device of any combination of clauses 15B-17B, wherein the one or more indications include an indication indicating opacity for rendering of secondary sources present in the audio data.

Clause 19B. The device of clause 18B, wherein the indication indicating opaqueness indicates the opacity as either opaque or not opaque.

Clause 20B. The device of any combination of clauses 15B-19B, wherein the one or more indications include an indication indicating a buffer distance around the interior area in which rendering is interpolated between interior rendering and exterior rendering.

Clause 21B. The device of any combination of clauses 15B-20B, wherein the audio data includes ambisonic audio data.

Clause 22B. A non-transitory computer-readable storage medium having stored thereon instructions that, when executed, cause one or more processors to: obtain, based on audio data, a bitstream representative of the audio data; specify, in the bitstream, a boundary separating an interior area from an exterior area; and specify, in the bitstream, one or more indications that control rendering of the audio data for either the interior area or the exterior area; and output the bitstream.

Clause 1C. A device configured to process one or more audio streams, the device comprising: one or more processors configured to: determine whether a boundary separating an interior area from an exterior area exists; based on the boundary existing, determine a transition distance value, the transition distance value being indicative of a size of a transition zone, wherein the transition distance value is 0; obtain a listener location indicative of a location of the device relative to the interior area; obtain, based on the boundary, the listener location and the transition distance value being 0, a current renderer as either an interior renderer configured to render audio data for the interior area or an exterior renderer configured to render the audio data for the exterior area; apply, to the audio data, the current renderer to obtain one or more speaker feeds; and a memory coupled to the one or more processors, and configured to store the one or more speaker feeds.

Clause 2C. The device of clause 1C, wherein the one or more processors are configured to: determine a first distance between the listener location and a center of the interior area; determine a second distance between the boundary and the center of the interior area; and obtain, based on the first distance and the second distance, the current renderer.

Clause 3C. The device of clause 1C or clause 2C, wherein the audio data comprises ambisonic audio data associated with a spherical basis function, and wherein the exterior renderer is configured to render an audio object comprising only the first channel of the ambisonic audio data.

Clause 4C. The device of clause 1C or clause 2C, wherein the audio data comprises ambisonic audio data associated with a spherical basis function, and wherein the exterior renderer is configured to render HOA to a plurality of virtual loudspeakers.

Clause 5C. The device of any of clauses 1C-4C, wherein the audio data comprises ambisonic audio data associated with a spherical basis function, and wherein the interior renderer is configured to render the ambisonic audio data such that a soundfield represented by the ambisonic audio data occurs throughout the interior area.

Clause 6C. The device of any of clauses 1C-5C, wherein the audio data comprises ambisonic audio data representative of primary audio sources and secondary audio sources, wherein the one or more processors are further configured to obtain an indication of an opacity of the secondary audio sources, and wherein the one or more processors are configured to obtain, based on the listener location, the boundary, and the indication, the current renderer.

Clause 7C. The device of clause 6C, wherein the one or more processors are configured to obtain, from a bitstream representative of the audio data, the indication of the opacity of the secondary sources.

Clause 8C. The device of clause 6C or clause 7C, wherein the one or more processors are further configured to obtain, when the indication of the opacity is enabled, and based on the listener location and the boundary, the current renderer that excludes addition of the secondary sources to which the listener location indicates as not being directly in the line of sight.

Clause 9C. The device of clause 6C, wherein the exterior renderer is configured to render the audio data such that a soundfield represented by the audio data is spread out depending on a distance between the listener location and the boundary.

Clause 10C. The device of any of clauses 1C-9C, wherein the one or more processors are further configured to obtain, from a bitstream representative of the audio data, an indication of the transition distance.

Clause 11C. The device of any of clauses 1C-10C, wherein the one or more processors are further configured to obtain, from a bitstream representative of the audio data, an indication of a complexity of the current renderer, and wherein the one or more processors are configured to obtain, based on the boundary, the listener location, and the indication of the complexity, the current renderer.

Clause 12C. The device of clause 11C, wherein the indication of complexity comprises a 6DOF flag.

Clause 13C. The device of clause 12C, wherein the 6DOF flag is false.

Clause 14C. The device of clause 13C, wherein one or more processors are configured to obtain the interior renderer as a 3DOF renderer based at least in part on the 6DOF flag being false.

Clause 15C. The device of clause 14C, wherein the one or more processors are further configured to: determine an extent transform, the extent transform being indicative of whether the device renders audio sources outside the boundary.

Clause 16C. The device of clause 15C, wherein the extent transform is true and the listener location is outside the boundary, wherein the one or more processors are configured to: obtain the exterior renderer as the current renderer based on the extent transform being true and the listener location being outside the boundary.

Clause 17C. The device of clause 15C, wherein the extent transform is false and the listener location is outside the boundary, wherein the one or more processors are configured to: obtain the exterior renderer as the current renderer based on the extent transform being false and the listener location being outside the boundary, wherein the exterior renderer is no renderer.

Clause 18C. The device of clause 12C, wherein the 6DOF flag is true.

Clause 19C. The device of clause 18C, wherein one or more processors are configured to obtain the interior renderer as a 6DOF renderer based at least in part on the 6DOF flag being true.

Clause 20C. The device of clause 19C, wherein the one or more processors are further configured to: determine an extent transform, the extent transform being indicative of whether the device renders audio sources outside the boundary.

Clause 21C. The device of clause 20C, wherein the extent transform is true and the listener location is outside the boundary, wherein the one or more processors are configured to: obtain the exterior renderer as the current renderer based on the extent transform being true and the listener location being outside the boundary.

Clause 22C. The device of clause 20C, wherein the extent transform is false and the listener location is outside the boundary, wherein the one or more processors are configured to: obtain the exterior renderer as the current renderer based on the extent transform being false and the listener location being outside the boundary, wherein the exterior renderer is no renderer.

Clause 23C. A device configured to process one or more audio streams, the device comprising: one or more processors configured to: determine whether a boundary separating an interior area from an exterior area exists; based on the boundary existing, determine a transition distance value, the transition distance value being indicative of a size of a transition zone, wherein the transition distance value is greater than 0; obtain a listener location indicative of a location of the device relative to the interior area; obtain, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; apply, to the audio data, the current renderer to obtain one or more speaker feeds; and a memory coupled to the one or more processors, and configured to store the one or more speaker feeds.

Clause 24C. The device of clause 23C, wherein the one or more processors are configured to: determine a first distance between the listener location and a center of the interior area; determine a second distance between the boundary and the center of the interior area; and obtain, based on the first distance and the second distance, the current renderer.

Clause 25C. The device of clause 23C or clause 24C, wherein the audio data comprises ambisonic audio data associated with a spherical basis function, and wherein the exterior renderer is configured to render an audio object comprising only the first channel of the ambisonic audio data.

Clause 26C. The device of clause 23C or clause 24C, wherein the audio data comprises ambisonic audio data associated with a spherical basis function, and wherein the exterior renderer is configured to render HOA to a plurality of virtual loudspeakers.

Clause 27C. The device of any of clauses 23C-26C, wherein the audio data comprises ambisonic audio data associated with a spherical basis function, and wherein the interior renderer is configured to render the ambisonic audio data such that a soundfield represented by the ambisonic audio data occurs throughout the interior area.

Clause 28C. The device of any of clauses 23C-27C, wherein the audio data comprises ambisonic audio data representative of primary audio sources and secondary audio sources, wherein the one or more processors are further configured to obtain an indication of an opacity of the secondary audio sources, and wherein the one or more processors are configured to obtain, based on the listener location, the boundary, and the indication, the current renderer.

Clause 29C. The device of clause 28C, wherein the one or more processors are configured to obtain, from a bitstream representative of the audio data, the indication of the opacity of the secondary sources.

Clause 30C. The device of clause 28C or 29C, wherein the one or more processors are further configured to obtain, when the indication of the opacity is enabled, and based on the listener location and the boundary, the current renderer that excludes addition of the secondary sources to which the listener location indicates as not being directly in the line of sight.

Clause 31C. The device of clause 28C, wherein the exterior renderer is configured to render the audio data such that a soundfield represented by the audio data is spread out depending on a distance between the listener location and the boundary.

Clause 32C. The device of any of clauses 23C-31C, wherein the one or more processors are further configured to obtain, from a bitstream representative of the audio data, an indication of the transition distance.

Clause 33C. The device of clause 32C, wherein the one or more processors are further configured to: update, responsive to determining that the listener location is within the transition distance from the boundary, the current renderer to interpolate between the exterior renderer and the interior renderer so as to obtain an updated current renderer; and apply, to the audio data, the current renderer to obtain one or more updated speaker feeds.

Clause 34C. The device of any of clauses 23C-33C, wherein the one or more processors are further configured to obtain, from a bitstream representative of the audio data, an indication of a complexity of the current renderer, and wherein the one or more processors are configured to obtain, based on the boundary, the listener location, and the indication of the complexity, the current renderer.

Clause 35C. The device of clause 34C, wherein the indication of complexity comprises a 6DOF flag.

Clause 36C. The device of clause 35C, wherein the 6DOF flag is false.

Clause 37C. The device of clause 36C, wherein one or more processors are configured to obtain the interior renderer as a 3DOF renderer based at least in part on the 6DOF flag being false.

Clause 38C. The device of clause 37C, wherein the one or more processors are further configured to: determine an extent transform, the extent transform being indicative of whether the device renders audio sources outside the boundary.

Clause 39C. The device of clause 38C, wherein the extent transform is true and the listener location is outside the boundary, wherein the one or more processors are configured to: obtain the exterior renderer as the current renderer based on the extent transform being true and the listener location being outside the boundary.

Clause 40C. The device of clause 38C, wherein the extent transform is false and the listener location is outside the boundary, wherein the one or more processors are configured to: obtain the exterior renderer as the current renderer based on the extent transform being false and the listener location being outside the boundary, wherein the exterior renderer is no renderer.

Clause 41C. The device of clause 35C, wherein the 6DOF flag is true.

Clause 42C. The device of clause 41C, wherein one or more processors are configured to obtain the interior renderer as a 6DOF renderer based at least in part on the 6DOF flag being true.

Clause 43C. The device of clause 42C, wherein the one or more processors are further configured to: determine an extent transform, the extent transform being indicative of whether the device renders audio sources outside the boundary.

Clause 44C. The device of clause 43C, wherein the extent transform is true and the listener location is outside the boundary, wherein the one or more processors are configured to: obtain the exterior renderer as the current renderer based on the extent transform being true and the listener location being outside the boundary.

Clause 45C. The device of clause 43C, wherein the extent transform is false and the listener location is outside the boundary, wherein the one or more processors are configured to: obtain the exterior renderer as the current renderer based on the extent transform being false and the listener location being outside the boundary, wherein the exterior renderer is no renderer.

Clause 46C. A method of processing one or more audio streams, the method comprising: determining whether a boundary separating an interior area from an exterior area exists; based on the boundary existing, determining a transition distance value, the transition distance value being indicative of a size of a transition zone, wherein the transition distance value is 0; obtaining a listener location indicative of a location of the device relative to the interior area; obtaining, based on the boundary, the listener location and the transition distance value being 0, a current renderer as either an interior renderer configured to render audio data for the interior area or an exterior renderer configured to render the audio data for the exterior area; applying, to the audio data, the current renderer to obtain one or more speaker feeds; and storing the one or more speaker feeds.

Clause 47C. The method of clause 46C, further comprising: determining a first distance between the listener location and a center of the interior area; determining a second distance between the boundary and the center of the interior area; and obtaining, based on the first distance and the second distance, the current renderer.

Clause 48C. The method of clause 46C or clause 47C, wherein the audio data comprises ambisonic audio data associated with a spherical basis function, and wherein the exterior renderer is configured to render an audio object comprising only the first channel of the ambisonic audio data.

Clause 49C. The method of clause 46C or clause 47C, wherein the audio data comprises ambisonic audio data associated with a spherical basis function, and wherein the exterior renderer is configured to render HOA to a plurality of virtual loudspeakers.

Clause 50C. The method of any of clauses 46C-49C, wherein the audio data comprises ambisonic audio data associated with a spherical basis function, and wherein the interior renderer is configured to render the ambisonic audio data such that a soundfield represented by the ambisonic audio data occurs throughout the interior area.

Clause 51C. The method of any of clauses 46C-50C, wherein the audio data comprises ambisonic audio data representative of primary audio sources and secondary audio sources, further comprising: obtaining an indication of an opacity of the secondary audio sources, and wherein obtaining the current renderer is based on the listener location, the boundary, and the indication.

Clause 52C. The method of clause 51C, wherein the indication of the opacity is within a bitstream.

Clause 53C. The method of clause 51C or 52C, further comprising: obtaining, when the indication of the opacity is enabled, and based on the listener location and the boundary, the current renderer that excludes addition of the secondary sources to which the listener location indicates as not being directly in the line of sight.

Clause 54C. The method of clause 51C, wherein the exterior renderer is configured to render the audio data such that a soundfield represented by the audio data is spread out depending on a distance between the listener location and the boundary.

Clause 55C. The method of any of clauses 46C-51C, further comprising obtaining, from a bitstream representative of the audio data, an indication of the transition distance.

Clause 56C. The method of any of clauses 46C-52C, further comprising: obtaining, from a bitstream representative of the audio data, an indication of a complexity of the current renderer, and wherein obtaining the current renderer is based on the boundary, the listener location, and the indication of the complexity.

Clause 57C. The method of clause 56C, wherein the indication of complexity comprises a 6DOF flag.

Clause 58C. The method of clause 57C, wherein the 6DOF flag is false.

Clause 59C. The method of clause 58C, further comprising obtaining the interior renderer as a 3DOF renderer based at least in part on the 6DOF flag being false.

Clause 60C. The method of clause 59C, further comprising: determining an extent transform, the extent transform being indicative of whether the device renders audio sources outside the boundary.

Clause 61C. The method of clause 60C, wherein the extent transform is true and the listener location is outside the boundary, further comprising: obtaining the exterior renderer as the current renderer based on the extent transform being true and the listener location being outside the boundary.

Clause 62C. The method of clause 60C, wherein the extent transform is false and the listener location is outside the boundary, further comprising: obtaining the exterior renderer as the current renderer based on the extent transform being true and the listener location being outside the boundary, wherein the exterior renderer is no renderer.

Clause 63C. The method of clause 57C, wherein the 6DOF flag is true.

Clause 64C. The method of clause 63C, further comprising obtaining the interior renderer as a 6DOF renderer based at least in part on the 6DOF flag being true.

Clause 65C. The method of clause 64C, further comprising: determining an extent transform, the extent transform being indicative of whether the device renders audio sources outside the boundary.

Clause 66C. The method of clause 65C, wherein the extent transform is true and the listener location is outside the boundary, further comprising: obtaining the exterior renderer as the current renderer based on the extent transform being true and the listener location being outside the boundary.

Clause 67C. The method of clause 65C, wherein the extent transform is false and the listener location is outside the boundary, further comprising: obtaining the exterior renderer as the current renderer based on the extent transform being false and the listener location being outside the boundary, wherein the exterior renderer is no renderer.

Clause 68C. A method of processing one or more audio streams, the method comprising: determining whether a boundary separating an interior area from an exterior area exists; based on the boundary existing, determining a transition distance value, the transition distance value being indicative of a size of a transition zone, wherein the transition distance value is greater than 0; obtaining a listener location indicative of a location of the device relative to the interior area; obtaining, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; applying, to the audio data, the current renderer to obtain one or more speaker feeds; and storing the one or more speaker feeds.

Clause 69C. The method of clause 68C, further comprising: determining a first distance between the listener location and a center of the interior area; determining a second distance between the boundary and the center of the interior area; and obtaining, based on the first distance and the second distance, the current renderer.

Clause 70C. The method of clause 68C or clause 69C, wherein the audio data comprises ambisonic audio data associated with a spherical basis function, and wherein the exterior renderer is configured to render an audio object comprising only the first channel of the ambisonic audio data.

Clause 71C. The method of clause 68C or clause 69C, wherein the audio data comprises ambisonic audio data associated with a spherical basis function, and wherein the exterior renderer is configured to render HOA to a plurality of virtual loudspeakers.

Clause 72C. The method of any of clauses 68C-71C, wherein the audio data comprises ambisonic audio data associated with a spherical basis function, and wherein the interior renderer is configured to render the ambisonic audio data such that a soundfield represented by the ambisonic audio data occurs throughout the interior area.

Clause 73C. The method of any of clauses 68C-72C, wherein the audio data comprises ambisonic audio data representative of primary audio sources and secondary audio sources, further comprising: obtaining an indication of an opacity of the secondary audio sources, and wherein obtaining the current renderer is based on the listener location, the boundary, and the indication.

Clause 74C. The method of clause 73C, further comprising: obtaining, from a bitstream representative of the audio data, the indication of the opacity of the secondary sources.

Clause 75C. The method of clause 73C or clause 74C, further comprising: obtaining, when the indication of the opacity is enabled, and based on the listener location and the boundary, the current renderer that excludes addition of the secondary sources to which the listener location indicates as not being directly in the line of sight.

Clause 76C. The method of clause 73C, wherein the exterior renderer is configured to render the audio data such that a soundfield represented by the audio data is spread out depending on a distance between the listener location and the boundary.

Clause 77C. The method of any of clause 68C-76C, further comprising: obtaining, from a bitstream representative of the audio data, an indication of the transition distance.

Clause 78C. The method of clause 77C, further comprising: updating, responsive to determining that the listener location is within the transition distance from the boundary, the current renderer to interpolate between the exterior renderer and the interior renderer so as to obtain an updated current renderer; and applying, to the audio data, the current renderer to obtain one or more updated speaker feeds.

Clause 79C. The method of any of clauses 68C-78C, further comprising: obtaining, from a bitstream representative of the audio data, an indication of a complexity of the current renderer, and the obtaining the current renderer is based on the boundary, the listener location, and the indication of the complexity.

Clause 80C. The method of clause 79C, wherein the indication of complexity comprises a 6DOF flag.

Clause 81C. The method of clause 80C, wherein the 6DOF flag is false.

Clause 82C. The method of clause 81C, further comprising: obtaining the interior renderer as a 3DOF renderer based at least in part on the 6DOF flag being false.

Clause 83C. The method of clause 82C, further comprising: determining an extent transform, the extent transform being indicative of whether the device renders audio sources outside the boundary.

Clause 84C. The method of clause 83C, wherein the extent transform is true and the listener location is outside the boundary, further comprising: obtaining the exterior renderer as the current renderer based on the extent transform being true and the listener location being outside the boundary.

Clause 85C. The method of clause 83C, wherein the extent transform is false and the listener location is outside the boundary, further comprising: obtaining the exterior renderer as the current renderer based on the extent transform being false and the listener location being outside the boundary, wherein the exterior renderer is no renderer.

Clause 86C. The method of clause 80C, wherein the 6DOF flag is true.

Clause 87C. The method of clause 86C, further comprising: obtaining the interior renderer as a 6DOF renderer based at least in part on the 6DOF flag being true.

Clause 88C. The method of clause 87C, further comprising: determining an extent transform, the extent transform being indicative of whether the device renders audio sources outside the boundary.

Clause 89C. The method of clause 88C, wherein the extent transform is true and the listener location is outside the boundary, further comprising: obtaining the exterior renderer as the current renderer based on the extent transform being true and the listener location being outside the boundary.

Clause 90C. The method of clause 88C, wherein the extent transform is false and the listener location is outside the boundary, further comprising: obtaining the exterior renderer as the current renderer based on the extent transform being false and the listener location being outside the boundary, wherein the exterior renderer is no renderer.

Clause 91C. A computer-readable storage medium having stored thereon instructions that, when executed, cause one or more processors to: determine whether a boundary separating an interior area from an exterior area exists; based on the boundary existing, determine a transition distance value, the transition distance value being indicative of a size of a transition zone, wherein the transition distance value is 0; obtain a listener location indicative of a location of the device relative to the interior area; obtain, based on the boundary, the listener location and the transition distance value being 0, a current renderer as either an interior renderer configured to render audio data for the interior area or an exterior renderer configured to render the audio data for the exterior area; apply, to the audio data, the current renderer to obtain one or more speaker feeds; and store the one or more speaker feeds.

Clause 92C. A computer-readable storage medium having stored thereon instructions that, when executed, cause one or more processors to: determine whether a boundary separating an interior area from an exterior area exists; based on the boundary existing, determine a transition distance value, the transition distance value being indicative of a size of a transition zone, wherein the transition distance value is greater than 0; obtain a listener location indicative of a location of the device relative to the interior area; obtain, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; apply, to the audio data, the current renderer to obtain one or more speaker feeds; and store the one or more speaker feeds.

Clause 93C. A device for processing one or more audio streams, the device comprising: means for determining whether a boundary separating an interior area from an exterior area exists; means for determining a transition distance value, based on the boundary existing, the transition distance value being indicative of a size of a transition zone, wherein the transition distance value is 0; means for obtaining a listener location indicative of a location of the device relative to the interior area; means for obtaining, based on the boundary, the listener location and the transition distance value being 0, a current renderer as either an interior renderer configured to render audio data for the interior area or an exterior renderer configured to render the audio data for the exterior area; means for applying, to the audio data, the current renderer to obtain one or more speaker feeds; and means for storing the one or more speaker feeds.

Clause 94C. A device for processing one or more audio streams, the device comprising: means for determining whether a boundary separating an interior area from an exterior area exists; means for determining a transition distance value based on the boundary existing, the transition distance value being indicative of a size of a transition zone, wherein the transition distance value is greater than 0; means for obtaining a listener location indicative of a location of the device relative to the interior area; means for obtaining, based on the boundary, the listener location and the transition distance value being greater than 0, a current renderer as either an interior renderer configured to render audio data for the interior area, an exterior renderer configured to render the audio data for the exterior area, or both the interior renderer and the exterior renderer; means for applying, to the audio data, the current renderer to obtain one or more speaker feeds; and means for storing the one or more speaker feeds.

Clause 1D. A device configured to process audio data, the device comprising: a memory configured to store one or more speaker feeds; and one or more processors implemented in circuitry and communicatively coupled to the memory, the one or more processors being configured to: determine whether a boundary separating an interior area from an exterior area exists; based on determining that the boundary exists, determine a transition distance value, the transition distance value being indicative of a size of a transition zone; obtain a listener location indicative of a virtual location of the device relative to the interior area; obtain, based at least in part on the boundary and the listener location, a current renderer; and apply, to the audio data, the current renderer to obtain the one or more speaker feeds.

Clause 2D. The device of clause 1D, wherein the one or more processors are further configured to: determine a first distance between the listener location and a center of the interior area; determine a second distance between the boundary and the center of the interior area; and obtain, based on the first distance and the second distance, the current renderer.

Clause 3D. The device of clause 1D or clause 2D, wherein the audio data comprises ambisonic audio data associated with a spherical basis function, and wherein an exterior renderer is configured to render an audio object comprising only a first channel of the ambisonic audio data.

Clause 4D. The device of clause 1D or clause 2D, wherein the audio data comprises ambisonic audio data associated with a spherical basis function, and wherein an exterior renderer is configured to render HOA to a plurality of virtual loudspeakers.

Clause 5D. The device of any of clauses 1D-4D, wherein the audio data comprises ambisonic audio data associated with a spherical basis function, and wherein an interior renderer is configured to render the ambisonic audio data such that a soundfield represented by the ambisonic audio data occurs throughout the interior area.

Clause 6D. The device of any of clauses 1D-5D, wherein the audio data comprises ambisonic audio data representative of primary audio sources and secondary audio sources, wherein the one or more processors are further configured to: obtain an indication of an opacity of the secondary audio sources, and obtain, based on the listener location, the boundary, and the indication, the current renderer.

Clause 7D. The device of clause 6D, wherein the one or more processors are configured to obtain, from a bitstream representative of the audio data, the indication of the opacity of the secondary sources.

Clause 8D. The device of clause 6D or clause 7D, wherein the one or more processors are further configured to obtain, when the indication of the opacity is enabled, and based on the listener location and the boundary, the current renderer that excludes addition of the secondary sources to which the listener location indicates as not being directly in the line of sight.

Clause 9D. The device of clause 6D, wherein an exterior renderer is configured to render the audio data such that a soundfield represented by the audio data is spread out depending on a distance between the listener location and the boundary.

Clause 10D. The device of any of clauses 1D-9D, wherein the one or more processors are further configured to obtain, from a bitstream representative of the audio data, an indication of the transition distance value.

Clause 11D. The device of any of clauses 1D-10D, wherein the one or more processors are further configured to: obtain, from a bitstream representative of the audio data, an indication of a complexity of the current renderer; and obtain, based on the boundary, the listener location, and the indication of the complexity, the current renderer.

Clause 12D. The device of clause 11D, wherein the indication of complexity comprises a 6DOF flag.

Clause 13D. The device of clause 12D, wherein the 6DOF flag is false.

Clause 14D. The device of clause 13D, wherein one or more processors are configured to obtain an interior renderer as a 3DOF renderer based at least in part on the 6DOF flag being false.

Clause 15D. The device of clause 14D, wherein the one or more processors are further configured to determine an extent transform, the extent transform being indicative of whether the device renders audio sources outside the boundary.

Clause 16D. The device of clause 15D, wherein the extent transform is true and the listener location is outside the boundary, wherein the one or more processors are further configured to obtain an exterior renderer as the current renderer based on the extent transform being true and the listener location being outside the boundary.

Clause 17D. The device of clause 15D, wherein the extent transform is false and the listener location is outside the boundary, wherein the one or more processors are configured to obtain an exterior renderer as the current renderer based on the extent transform being false and the listener location being outside the boundary, wherein the exterior renderer is no renderer.

Clause 18D. The device of clause 12D, wherein the 6DOF flag is true.

Clause 19D. The device of clause 18D, wherein one or more processors are configured to obtain an interior renderer as a 6DOF renderer based at least in part on the 6DOF flag being true.

Clause 20D. The device of clause 19D, wherein the one or more processors are further configured to determine an extent transform, the extent transform being indicative of whether the device renders audio sources outside the boundary.

Clause 21D. The device of clause 20D, wherein the extent transform is true and the listener location is outside the boundary, wherein the one or more processors are further configured to obtain an exterior renderer as the current renderer based on the extent transform being true and the listener location being outside the boundary.

Clause 22D. The device of clause 20D, wherein the extent transform is false and the listener location is outside the boundary, wherein the one or more processors are configured to obtain an exterior renderer as the current renderer based on the extent transform being false and the listener location being outside the boundary, wherein the exterior renderer is no renderer.

Clause 23D. The device of any of clauses 1D-22D, wherein the transition distance value is 0, wherein the current renderer comprises either an interior renderer configured to render audio data for the interior area or an exterior renderer configured to render the audio data for the exterior area, and wherein the one or more processors are configured to obtain the current render further based on the transition distance value being 0.

Clause 24D. The device of any of clauses 1D-22D, wherein the transition distance value is greater than 0, wherein the current renderer comprises either an interior renderer configured to render audio data for the interior area, an exterior renderer configured to render the audio data for the exterior area, or both the interior renderer and the exterior renderer, and wherein the one or more processors are configured to obtain the current renderer further based on the transition distance value being greater than 0.

Clause 25D. The device of clause 24D, wherein the one or more processors are further configured to: update, responsive to determining that the listener location is within the transition distance value from the boundary, the current renderer to interpolate between the exterior renderer and the interior renderer so as to obtain an updated current renderer; and apply, to the audio data, the updated current renderer to obtain one or more updated speaker feeds.

Clause 26D. The device of clause 25D, wherein the updated current renderer crossfades between the exterior renderer and the interior renderer.

Clause 27D. The device of clause 26D, wherein the updated current renderer crossfades between different ambisonic orders of the exterior renderer and the interior renderer.

Clause 28D. The device of claim 27D, wherein the updated current renderer crossfades from a higher ambisonic order to a lower ambisonic order as the listener location moves from the interior area through the transition zone towards the exterior area.

Clause 29D. A method of processing audio data, the method comprising: determining whether a boundary separating an interior area from an exterior area exists; based on determining that the boundary exists, determining a transition distance value, the transition distance value being indicative of a size of a transition zone; obtaining a listener location indicative of a virtual location of the device relative to the interior area; obtaining, based at least in part on the boundary and the listener location, a current renderer; applying, to the audio data, the current renderer to obtain one or more speaker feeds; and storing the one or more speaker feeds.

Clause 30D. The method of clause 29D, wherein the transition distance value is 0, wherein the current renderer comprises either an interior renderer configured to render audio data for the interior area or an exterior renderer configured to render the audio data for the exterior area, and wherein the obtaining the current render is further based on the transition distance value being 0.

Clause 31D. The method of clause 29D, wherein the transition distance value is greater than 0; wherein the current renderer comprises either an interior renderer configured to render audio data for the interior area, an exterior renderer configured to render the audio data for the exterior area, or both the interior renderer and the exterior renderer, and wherein the obtaining the current renderer is further based on the transition distance being greater than 0.

Clause 32D. A computer-readable storage medium having stored thereon instructions that, when executed, cause one or more processors to: determine whether a boundary separating an interior area from an exterior area exists; based on determining that the boundary exists, determine a transition distance value, the transition distance value being indicative of a size of a transition zone; obtain a listener location indicative of a virtual location of a device relative to the interior area; obtain, based at least in part on the boundary and the listener location, a current renderer; apply, to the audio data, the current renderer to obtain one or more speaker feeds; and store the one or more speaker feeds.

Clause 33D. A device configured to process one or more audio streams, the device comprising: means for determining whether a boundary separating an interior area from an exterior area exists; means for determining a transition distance value based on the determination that the boundary exists, the transition distance value being indicative of a size of a transition zone; means for obtaining a listener location indicative of a virtual location of the device relative to the interior area; means for obtaining, based at least in part on the boundary and the listener location, a current renderer; means for applying, to the audio data, the current renderer to obtain one or more speaker feeds; and means for storing the one or more speaker feeds.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video packets, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, including fixed function processing circuitry and/or programmable processing circuitry, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to process audio data, the device comprising:
   a memory configured to store one or more speaker feeds; and
   one or more processors implemented in circuitry and communicatively coupled to the memory, the one or more processors being configured to:
      determine whether a boundary separating an interior area from an exterior area exists;
      based on determining that the boundary exists, determine a transition distance value, the transition distance value being indicative of a size of a transition zone;
      obtain a listener location indicative of a virtual location of the device relative to the interior area;
      determine a first distance between the listener location and a center of the interior area;
      determine a second distance between the boundary and the center of the interior area; and
      obtain, based at least in part on the first distance and the second distance, a current renderer; and
      apply, to the audio data, the current renderer to obtain the one or more speaker feeds.

2. The device of claim 1,
   wherein the audio data comprises ambisonic audio data associated with a spherical basis function, and
   wherein an exterior renderer is configured to render an audio object comprising only a first channel of the ambisonic audio data.

3. The device of claim 1,
   wherein the audio data comprises ambisonic audio data associated with a spherical basis function, and
   wherein an exterior renderer is configured to render HOA to a plurality of virtual loudspeakers.

4. The device of claim 1,
   wherein the audio data comprises ambisonic audio data associated with a spherical basis function, and
   wherein an interior renderer is configured to render the ambisonic audio data such that a soundfield represented by the ambisonic audio data occurs throughout the interior area.

5. The device of claim 1,
   wherein the audio data comprises ambisonic audio data representative of primary audio sources and secondary audio sources,
   wherein the one or more processors are further configured to:
      obtain an indication of an opacity of the secondary audio sources, and
      obtain, based on the listener location, the boundary, and the indication, the current renderer.

6. The device of claim 5, wherein the one or more processors are configured to obtain, from a bitstream representative of the audio data, the indication of the opacity of the secondary sources.

7. The device of claim 5, wherein the one or more processors are further configured to obtain, when the indication of the opacity is enabled, and based on the listener location and the boundary, the current renderer that excludes addition of the secondary sources to which the listener location indicates as not being directly in a line of sight.

8. The device of claim 5, wherein an exterior renderer is configured to render the audio data such that a soundfield represented by the audio data is spread out depending on a distance between the listener location and the boundary.

9. The device of claim 1, wherein the one or more processors are further configured to obtain, from a bitstream representative of the audio data, an indication of the transition distance value.

10. The device of claim 1, wherein the one or more processors are further configured to:
    obtain, from a bitstream representative of the audio data, an indication of a complexity of the current renderer; and
    obtain, based on the boundary, the listener location, and the indication of the complexity, the current renderer.

11. The device of claim 10, wherein the indication of complexity comprises a 6DOF flag.

12. The device of claim 11, wherein the 6DOF flag is false.

13. The device of claim 12, wherein one or more processors are configured to obtain an interior renderer as a 3DOF renderer based at least in part on the 6DOF flag being false.

14. The device of claim 13, wherein the one or more processors are further configured to determine an extent transform, the extent transform being indicative of whether the device renders audio sources outside the boundary.

15. The device of claim 14, wherein the extent transform is true and the listener location is outside the boundary, wherein the one or more processors are further configured to obtain an exterior renderer as the current renderer based on the extent transform being true and the listener location being outside the boundary.

16. The device of claim 14, wherein the extent transform is false and the listener location is outside the boundary, wherein the one or more processors are configured to obtain an exterior renderer as the current renderer based on the extent transform being false and the listener location being outside the boundary, wherein the exterior renderer is no renderer.

17. The device of claim 11, wherein the 6DOF flag is true.

18. The device of claim 17, wherein one or more processors are configured to obtain an interior renderer as a 6DOF renderer based at least in part on the 6DOF flag being true.

19. The device of claim 18, wherein the one or more processors are further configured to determine an extent transform, the extent transform being indicative of whether the device renders audio sources outside the boundary.

20. The device of claim 19, wherein the extent transform is true and the listener location is outside the boundary, wherein the one or more processors are further configured to obtain an exterior renderer as the current renderer based on the extent transform being true and the listener location being outside the boundary.

21. The device of claim 19, wherein the extent transform is false and the listener location is outside the boundary, wherein the one or more processors are configured to obtain an exterior renderer as the current renderer based on the extent transform being false and the listener location being outside the boundary, wherein the exterior renderer is no renderer.

22. The device of claim 1, wherein the transition distance value is 0, wherein the current renderer comprises either an interior renderer configured to render audio data for the interior area or an exterior renderer configured to render the audio data for the exterior area, and wherein the one or more processors are configured to obtain the current render further based on the transition distance value being 0.

23. The device of claim 1, wherein the transition distance value is greater than 0, wherein the current renderer comprises either an interior renderer configured to render audio data for the interior area, an exterior renderer configured to render the audio data for the exterior area, or both the interior renderer and the exterior renderer, and wherein the one or more processors are configured to obtain the current renderer further based on the transition distance value being greater than 0.

24. The device of claim 23, wherein the one or more processors are further configured to:
  update, responsive to determining that the listener location is within the transition distance value from the boundary, the current renderer to interpolate between the exterior renderer and the interior renderer so as to obtain an updated current renderer; and
  apply, to the audio data, the updated current renderer to obtain one or more updated speaker feeds.

25. The device of claim 24, wherein the updated current renderer crossfades between the exterior renderer and the interior renderer.

26. The device of claim 25, wherein the updated current renderer crossfades between different ambisonic orders of the exterior renderer and the interior renderer.

27. The device of claim 26, wherein the updated current renderer crossfades from a higher ambisonic order to a lower ambisonic order as the listener location moves from the interior area through the transition zone towards the exterior area.

28. The device of claim 1, wherein the current renderer is based at least in part on the boundary and the listener location.

29. A method of processing audio data, the method comprising:
  determining whether a boundary separating an interior area from an exterior area exists;
  based on determining that the boundary exists, determining a transition distance value, the transition distance value being indicative of a size of a transition zone;
  obtaining a listener location indicative of a virtual location of a device relative to the interior area;
  determining a first distance between the listener location and a center of the interior area;
  determining a second distance between the boundary and the center of the interior area;
  obtaining, based at least in part on the first distance and the second distance, a current renderer;
  applying, to the audio data, the current renderer to obtain one or more speaker feeds; and
  storing the one or more speaker feeds.

30. The method of claim 29, wherein the current renderer is based at least in part on the boundary and the listener location.

31. A computer-readable storage medium having stored thereon instructions that, when executed, cause one or more processors to:
  determine whether a boundary separating an interior area from an exterior area exists;
  based on determining that the boundary exists, determine a transition distance value, the transition distance value being indicative of a size of a transition zone;
  obtain a listener location indicative of a virtual location of a device relative to the interior area;
  determine a first distance between the listener location and a center of the interior area;
  determine a second distance between the boundary and the center of the interior area;
  obtain, based at least in part on the first distance and the second distance, a current renderer;
  apply, to audio data, the current renderer to obtain one or more speaker feeds; and
  store the one or more speaker feeds.

* * * * *